(12) United States Patent
Nakamigawa et al.

(10) Patent No.: US 11,810,603 B2
(45) Date of Patent: Nov. 7, 2023

(54) MAGNETIC TAPE CARTRIDGE, INFORMATION ACQUISITION METHOD, AND PROGRAM

(71) Applicant: FUJIFILM CORPORATION, Tokyo (JP)

(72) Inventors: Junichi Nakamigawa, Kanagawa (JP); Yasushi Komori, Kanagawa (JP); Yusuke Kaneko, Kanagawa (JP); Tadashi Kira, Kanagawa (JP); Norihito Kasada, Kanagawa (JP); Toru Nakao, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/822,803

(22) Filed: Aug. 29, 2022

(65) Prior Publication Data

US 2023/0065359 A1 Mar. 2, 2023

(30) Foreign Application Priority Data

Aug. 31, 2021 (JP) ................................. 2021-141807
May 20, 2022 (JP) ................................. 2022-083384

(51) Int. Cl.
*G11B 5/584* (2006.01)
*G11B 5/008* (2006.01)

(52) U.S. Cl.
CPC .......... *G11B 5/584* (2013.01); *G11B 5/00817* (2013.01)

(58) Field of Classification Search
None
See application file for complete search history.

(56) References Cited

U.S. PATENT DOCUMENTS

| | | | | |
|---|---|---|---|---|
| 10,832,703 B1* | 11/2020 | Masuda | ................. | G11B 20/10 |
| 2008/0252357 A1* | 10/2008 | Biskeborn | ............. | G11B 5/4893 |
| | | | | 327/419 |
| 2010/0202083 A1* | 8/2010 | Bui | .................... | G11B 5/00813 |
| | | | | 360/78.02 |
| 2011/0292531 A1* | 12/2011 | Sato | ....................... | G11B 27/36 |
| 2019/0362743 A1* | 11/2019 | Kaneko | .............. | G11B 5/00813 |
| 2020/0273489 A1* | 8/2020 | Kaneko | .............. | G11B 5/59638 |
| 2021/0065741 A1 | 3/2021 | Nakao | | |
| 2023/0065359 A1* | 3/2023 | Nakamigawa | ......... | G11B 5/584 |

FOREIGN PATENT DOCUMENTS

| | | |
|---|---|---|
| JP | 2020-170582 A | 10/2020 |
| JP | 2021-039814 A | 3/2021 |

* cited by examiner

*Primary Examiner* — Peter Vincent Agustin
(74) *Attorney, Agent, or Firm* — SOLARIS Intellectual Property Group, PLLC

(57) ABSTRACT

A magnetic tape cartridge includes a case that accommodates a magnetic tape on which a plurality of servo bands and a plurality of data bands are formed, servo patterns being recorded in the servo bands, and a memory provided in the case. The memory stores servo pattern interval-related information related to a servo pattern interval determined for each of the plurality of data bands included in the magnetic tape. The servo pattern interval is commonly used for a plurality of division areas obtained by dividing the data band in a width direction of the magnetic tape, and is a representative interval between a first servo pattern and a second servo pattern.

8 Claims, 29 Drawing Sheets

[EXAMPLE OF IDEAL SERVO PATTERN]

FIG. 17
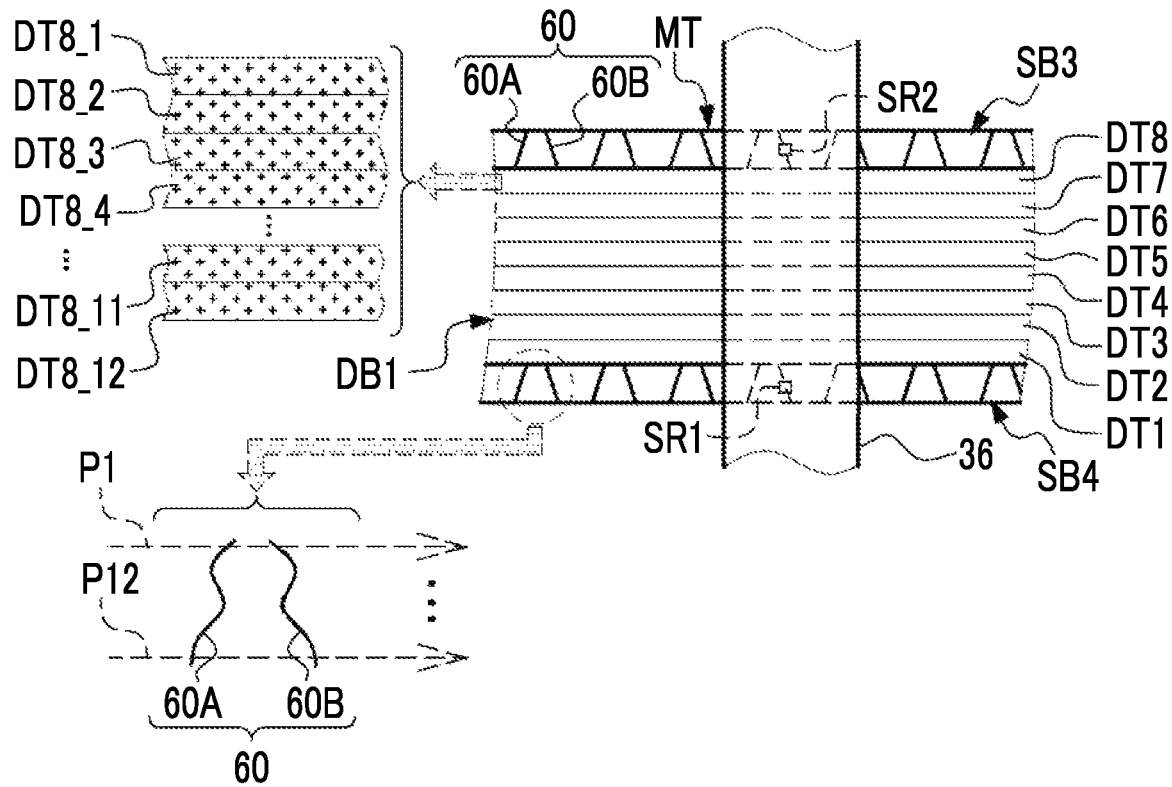
[FIRST EXAMPLE OF ACTUAL SERVO PATTERN]
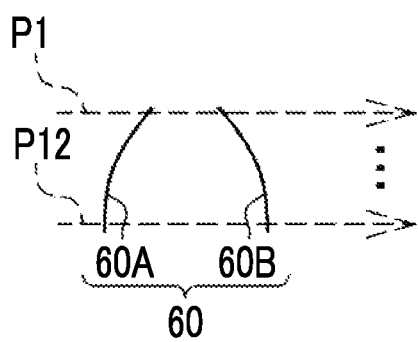
[SECOND EXAMPLE OF ACTUAL SERVO PATTERN]

MAGNETIC TAPE CARTRIDGE, INFORMATION ACQUISITION METHOD, AND PROGRAM

CROSS REFERENCE TO RELATED APPLICATIONS

This application claims priority under 35 USC 119 from Japanese Patent Application No. 2021-141807 filed on Aug. 31, 2021, and Japanese Patent Application No. 2022-083384 filed on May 20, 2022, the disclosures of which are incorporated herein by reference in their entireties.

BACKGROUND

1. Technical Field

The technology of the present disclosure relates to a magnetic tape cartridge, an information acquisition method, and a program.

2. Related Art

JP2020-170582A discloses a magnetic tape cartridge comprising a magnetic tape including a plurality of servo bands on which servo patterns are recorded, and a data band which is provided between the servo bands and on which data is recorded, and a recording medium in which servo band interval-related information including an interval of adjacent servo recording elements, among a plurality of servo recording elements that record each servo pattern in each of the plurality of servo bands, in a width direction of the magnetic tape is recorded.

JP2021-039814A discloses a recording reproduction device comprising a magnetic head that is used in a magnetic tape in which servo bands in which servo patterns are recorded and data bands having a plurality of data tracks in which data is recorded are alternately arranged along a width direction, the magnetic head including a recording reproduction element that performs recording or reproduction of the data in the data track, and at least two servo reproduction elements that read each of servo patterns adjacent in the width direction of the magnetic tape, a selection unit that selects one or two servo reproduction elements from among the servo reproduction elements of the magnetic head in accordance with a position of the data track, which is a target of recording or reproduction of data in the data band, along the width direction, and a controller that performs a control of positioning the magnetic head along the width direction by using a result of reading the servo pattern by the servo reproduction element selected by the selection unit.

SUMMARY

One embodiment according to the technology of the present disclosure provides a magnetic tape cartridge, an information acquisition method, and a program capable of accurately positioning a magnetic element with respect to a data band even in a case in which a servo pattern varies.

A first aspect according to the technology of the present disclosure relates to a magnetic tape cartridge comprising a case that accommodates a magnetic tape on which a plurality of servo bands and a plurality of data bands are formed, the servo bands being disposed at positions with the data band therebetween in a width direction of the magnetic tape, and servo patterns being recorded in the servo bands along a traveling direction of the magnetic tape, and a memory provided in the case, in which the memory stores servo pattern interval-related information related to a servo pattern interval determined for each of the plurality of data bands included in the magnetic tape, and the servo pattern interval is commonly used for a plurality of division areas obtained by dividing the data band in the width direction of the magnetic tape, and is a representative interval between a first servo pattern, which is the servo pattern in a first servo band of a pair of the servo bands adjacent to each other via the data band, and a second servo pattern, which is the servo pattern in a second servo band of the pair of the servo bands.

A second aspect according to the technology of the present disclosure relates to the magnetic tape cartridge according to the first aspect, in which the representative interval is obtained by statistics of results of measuring an interval between the first servo pattern and the second servo pattern for each division area in a case in which the magnetic tape to which first reference tension is applied is made to travel.

A third aspect according to the technology of the present disclosure relates to the magnetic tape cartridge according to the first or second aspect, in which the representative interval is obtained by statistics of results of measuring an interval between the first servo pattern and the second servo pattern in a part of sections of the division area along the traveling direction for each division area in a case in which the magnetic tape to which second reference tension is applied is made to travel.

A fourth aspect according to the technology of the present disclosure relates to the magnetic tape cartridge according to the first or second aspect, in which the representative interval is obtained by statistics of results of measuring an interval between the first servo pattern and the second servo pattern in all sections of the division area along the traveling direction for each division area in a case in which the magnetic tape to which second reference tension is applied is made to travel.

A fifth aspect according to the technology of the present disclosure relates to the magnetic tape cartridge according to any one of the first to fourth aspects, in which the representative interval is an average value of results of measuring an interval between the first servo pattern and the second servo pattern for each division area in a case in which the magnetic tape to which third reference tension is applied is made to travel.

A sixth aspect according to the technology of the present disclosure relates to the magnetic tape cartridge according to any one of the first to fifth aspects, in which the magnetic tape cartridge is used by being loaded into a magnetic tape drive including a tension application mechanism and a magnetic element, in the magnetic tape drive, in a case in which magnetic processing is performed by the magnetic element for each data band, the tension application mechanism applies tension for each data band to the magnetic tape in accordance with the servo pattern interval, in the memory, tension information used by the magnetic tape drive is stored in advance, the tension information corresponding to the tension for each data band in a stage before the tension for each data band is applied to the magnetic tape by the tension application mechanism, and the tension information is information derived from a result of regression analysis using a first value based on a result of measuring an interval between the first servo pattern and the second servo pattern for each division area in a case in which the magnetic tape to which fourth reference tension is applied is made to travel, and a second value based on a result of measuring an interval between the first servo pattern and the second servo pattern for each division area in a case in which the magnetic tape to which fifth reference tension is applied is made to travel.

A seventh aspect according to the technology of the present disclosure relates to the magnetic tape cartridge according to the sixth aspect, in which the first value is a value corresponding to a statistical value of results of measuring the interval between the first servo pattern and the second servo pattern for each division area in a case in which the magnetic tape to which the fourth reference tension is applied is made to travel, and the second value is a value corresponding to a statistical value of results of measuring the interval between the first servo pattern and the second servo pattern for each division area in a case in which the magnetic tape to which the fifth reference tension is applied is made to travel.

An eighth aspect according to the technology of the present disclosure relates to the magnetic tape cartridge according to the seventh aspect, in which the first value is a value corresponding to an average value of the results of measuring the interval between the first servo pattern and the second servo pattern for each division area in a case in which the magnetic tape to which the fourth reference tension is applied is made to travel, and the second value is a value corresponding to an average value of results of measuring the interval between the first servo pattern and the second servo pattern for each division area in a case in which the magnetic tape to which the fifth reference tension is applied is made to travel.

A ninth aspect according to the technology of the present disclosure relates to the magnetic tape cartridge according to the first aspect, in which the servo pattern interval-related information is an offset value, and the offset value is a difference between the representative interval and a reference value.

A tenth nine aspect according to the technology of the present disclosure relates to the magnetic tape cartridge according to the ninth aspect, in which the offset value is a value within a range of from −500 nm to 500 nm.

A eleventh aspect according to the technology of the present disclosure relates to the magnetic tape cartridge according to the tenth aspect, in which the offset value is a value within a range of from −300 nm to 300 nm.

A twelfth aspect according to the technology of the present disclosure relates to an information acquisition method comprising an acquisition step of, based on a detection result obtained by detecting a servo pattern from a magnetic tape on which a plurality of servo bands and a plurality of data bands are formed, the servo bands being disposed at positions with the data band therebetween in a width direction of the magnetic tape, and the servo patterns being recorded in the servo bands along a traveling direction of the magnetic tape, acquiring servo pattern interval-related information related to a servo pattern interval determined for each of the plurality of data bands included in the magnetic tape, and a storage step of storing the servo pattern interval-related information acquired in the acquisition step in a storage device, in which the servo pattern interval is commonly used for a plurality of division areas obtained by dividing the data band in the width direction of the magnetic tape, and is a representative interval between a first servo pattern, which is the servo pattern in a first servo band of a pair of the servo bands adjacent to each other via the data band, and a second servo pattern, which is the servo pattern in a second servo band of the pair of the servo bands.

A thirteenth aspect according to the technology of the present disclosure relates to a program causing a computer to execute an information acquisition process comprising an acquisition process of, based on a detection result obtained by detecting a servo pattern from a magnetic tape on which a plurality of servo bands and a plurality of data bands are formed, the servo bands being disposed at positions with the data band therebetween in a width direction of the magnetic tape, and the servo patterns being recorded in the servo bands along a traveling direction of the magnetic tape, acquiring servo pattern interval-related information related to a servo pattern interval determined for each of the plurality of data bands included in the magnetic tape, and a storage process of storing the servo pattern interval-related information acquired in the acquisition process in a storage device, in which the servo pattern interval is commonly used for a plurality of division areas obtained by dividing the data band in the width direction of the magnetic tape, and is a representative interval between a first servo pattern, which is the servo pattern in a first servo band of a pair of the servo bands adjacent to each other via the data band, and a second servo pattern, which is the servo pattern in a second servo band of the pair of the servo bands.

BRIEF DESCRIPTION OF THE DRAWINGS

Exemplary embodiments of the technology of the disclosure will be described in detail based on the following figures, wherein:

FIG. 17 is a conceptual diagram showing an example of an aspect in which an actual servo pattern is read;

DETAILED DESCRIPTION

In the following, an example of an embodiment of a magnetic tape drive, an information processing apparatus, an operation method of a magnetic tape drive, and a program according to the technology of the present disclosure will be described with reference to the accompanying drawings.

First, the terms used in the following description will be described.

CPU refers to an abbreviation of "central processing unit". RAM refers to an abbreviation of "random access memory". DRAM refers to an abbreviation of "dynamic random access memory". SRAM refers to an abbreviation of "static random access memory". NVM refers to an abbreviation of "non-volatile memory". EEPROM refers to an abbreviation of "electrically erasable and programmable read only memory". SSD refers to an abbreviation of "solid state drive". HDD refers to an abbreviation of "hard disk drive". USB refers to an abbreviation of "universal serial bus". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". I/F refers to an abbreviation of "interface". UI refers to an abbreviation of "user interface". IC refers to an abbreviation of "integrated circuit". RFID refers to an abbreviation of "radio frequency identifier". LTO refers to an abbreviation of "linear tape-open". IBM refers to an abbreviation of "international business machines corporation". BOT refers to an abbreviation of "beginning of tape". EOT refers to an abbreviation of "end of tape". LAN refers to an abbreviation of "local area network". QR refers to an abbreviation of "quick response". PES refers to an abbreviation of "position error signal".

Figure 1:
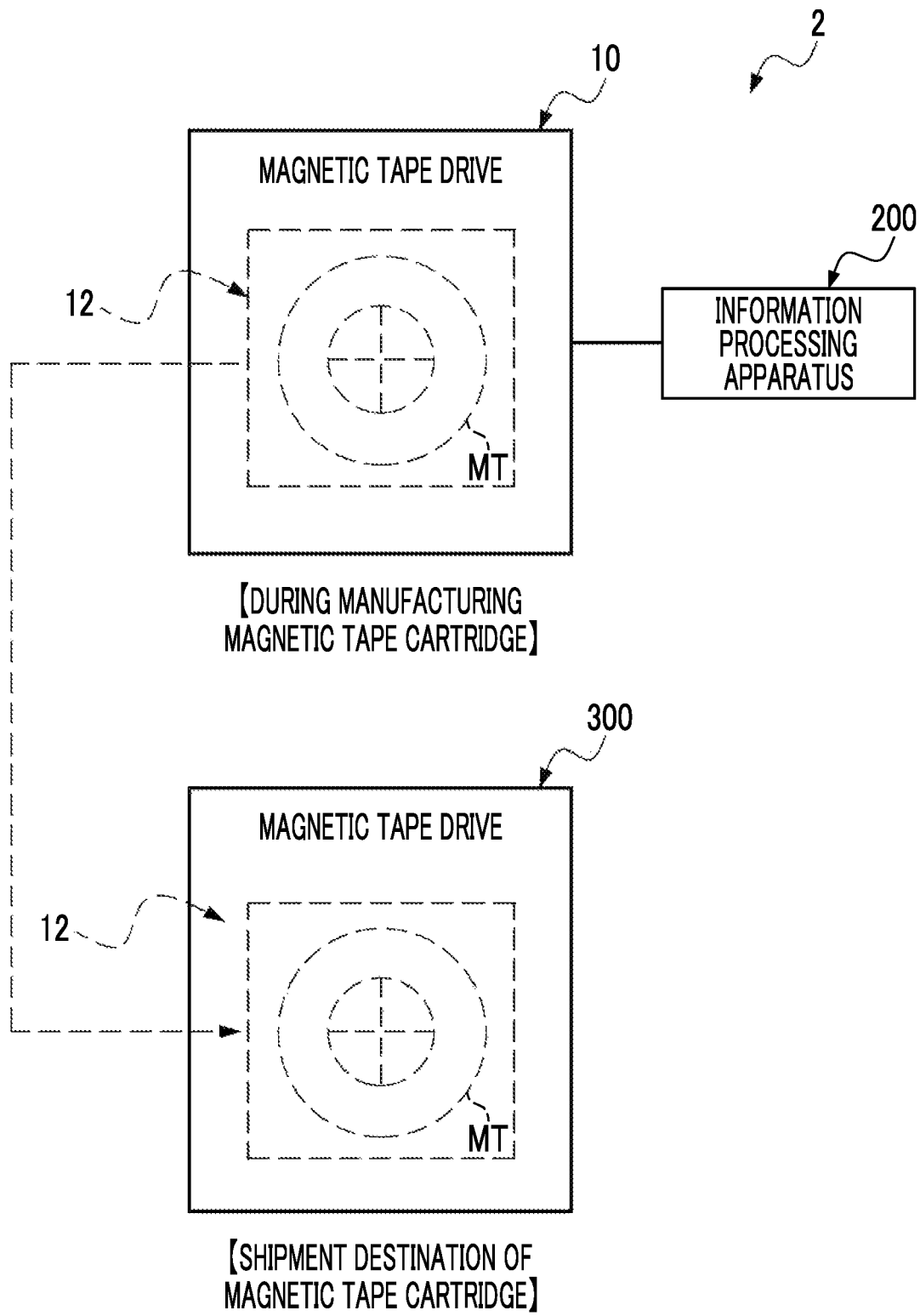
FIG. 1 is a conceptual diagram showing an example of a configuration of an information processing system.

As an example, as shown in FIG. 1, an information processing system 2 comprises magnetic tape drives 10 and 300, and an information processing apparatus 200. A magnetic tape cartridge 12 is loaded into the magnetic tape drive 10. The magnetic tape cartridge 12 accommodates a magnetic tape MT. The magnetic tape drive 10 is a device that pulls out the magnetic tape MT from the loaded magnetic tape cartridge 12, and records data in the magnetic tape MT and reads data from the magnetic tape MT while causing the pulled out magnetic tape MT to travel. The magnetic tape drives 10 and 300 are examples of a "magnetic tape drive" according to the technology of the present disclosure, and the magnetic tape cartridge 12 is an example of a "magnetic tape cartridge" according to the technology of the present disclosure.

The information processing apparatus 200 is connected to the magnetic tape drive 10. Examples of the information processing apparatus 200 include a personal computer and a mainframe. The information processing apparatus 200 acquires information from the magnetic tape drive 10, executes a process in accordance with the acquired information, and controls the magnetic tape drive 10 based on a processing result. The information processing apparatus 200 controls the magnetic tape drive 10 to adjust the magnetic tape cartridge 12 (for example, a storage content of a cartridge memory 22 (see FIGS. 3 to 6) described below) such that the magnetic tape cartridge 12 is a product for shipment. The magnetic tape cartridge 12 adjusted for shipment is used by being removed from the magnetic tape drive 10 and loaded into the magnetic tape drive 300 of a shipment destination. In the example shown in FIG. 1, the magnetic tape drive 10 is a device used during manufacturing of the magnetic tape cartridge 12, and the magnetic tape drive 300 is a device used at the shipment destination. It should be noted that, here, the magnetic tape cartridge 12 adjusted for shipment (hereinafter, also referred to as a "representative cartridge" without a reference numeral) is described, but this is merely an example, and a representative cartridge may be actually shipped or may not be shipped. In any case, the magnetic tape cartridge 12 other than the representative cartridge is shipped together with the representative cartridge or excluding the representative cartridge. In this case, at least a part of the storage content of the cartridge memory 22 (see FIGS. 3 to 6) of the representative cartridge is stored in the cartridge memory 22 (see FIGS. 3 to 6) of the magnetic tape cartridge 12 other than the representative cartridge. Examples of the storage content stored in the cartridge memory 22 (see FIGS. 3 to 6) of the magnetic tape cartridge 12 other than the representative cartridge include an offset value (see FIG. 21) described below and/or an approximate straight line 92 described below (see FIG. 24). In addition, examples of the storage content stored in the cartridge memory 22 (see FIGS. 3 to 6) of the magnetic tape cartridge 12 other than the representative cartridge include information obtained by correcting at least representative information of information, such as the offset value (see FIG. 21) described below and/or the approximate straight line 92 described below (see FIG. 24), from production information.

It should be noted that, in the following, for convenience of description, the magnetic tape drive 300 will be described on the premise that it is a device having the same configuration as the magnetic tape drive 10. Therefore, in the following, with respect to the components overlapping between the magnetic tape drive 300 and the magnetic tape drive 10, the components of the magnetic tape drive 10 will be described, and the components of the magnetic tape drive 300 will be partially omitted.

Figure 2:
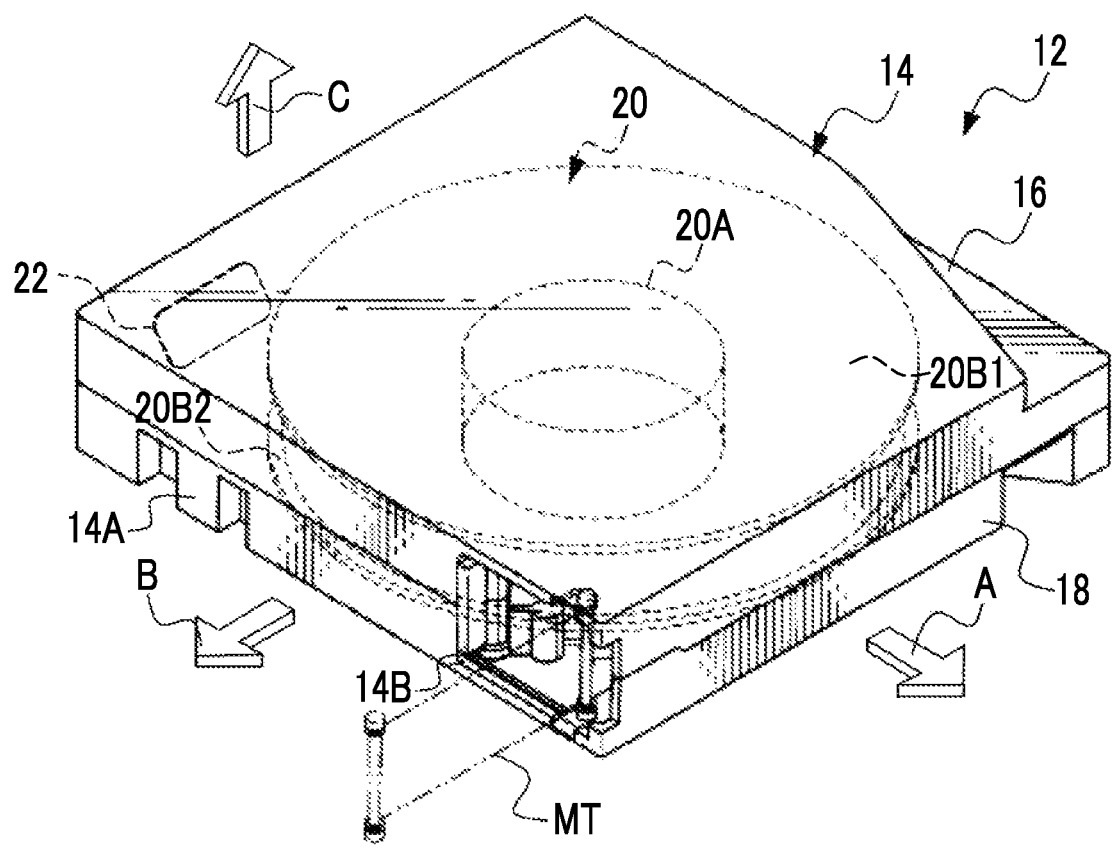
FIG. 2 is a schematic perspective view of an example of an appearance of a magnetic tape cartridge.

FIG. 2 schematically shows an example of a configuration of the magnetic tape cartridge 12.

In the following, for convenience of description, in FIG. 2, a loading direction of the magnetic tape cartridge 12 into the magnetic tape drive 10 (see FIGS. 1 and 3) is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the following description of the structure, "front" refers to the front side of the magnetic tape cartridge 12.

In addition, in the following, for convenience of description, in FIG. 2, a direction of an arrow B orthogonal to the direction of the arrow A is defined as a right direction, and a side of the magnetic tape cartridge 12 in the right direction is defined as a right side of the magnetic tape cartridge 12. In the following description of the structure, "right" refers to the right side of the magnetic tape cartridge 12.

In addition, in the following, for convenience of description, in FIG. 2, a direction opposite to the direction of the arrow B is defined as a left direction, and a side of the magnetic tape cartridge 12 in the left direction is defined as a left side of the magnetic tape cartridge 12. In the following description of the structure, "left" refers to the left side of the magnetic tape cartridge 12.

In addition, in the following, for convenience of description, in FIG. 2, a direction orthogonal to the direction of the arrow A and the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the following description of the structure, "upper" refers to the upper side of the magnetic tape cartridge 12.

In addition, in the following description, for convenience of description, in FIG. 2, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the following description of the structure, "rear" refers to the rear side of the magnetic tape cartridge 12.

In addition, in the following description, for convenience of description, in FIG. 2, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the following description of the structure, "lower" refers to the lower side of the magnetic tape cartridge 12.

In addition, in the following, for convenience of description, LTO is described as an example of the specification of the magnetic tape cartridge 12, but this is merely an example, and the specification of the magnetic tape cartridge 12 may conform to the specification of the magnetic tape cartridge of IBM 3592.

As an example, as shown in FIG. 2, the magnetic tape cartridge 12 has a substantially rectangular shape in a plan view, and comprises a box-shaped case 14. The magnetic tape MT is accommodated in the case 14. The case 14 is formed of resin, such as polycarbonate, and comprises an upper case 16 and a lower case 18. The upper case 16 and the lower case 18 are bonded by welding (for example, ultrasound welding) and screwing in a state in which a lower peripheral edge surface of the upper case 16 and an upper peripheral edge surface of the lower case 18 are brought into contact with each other. The bonding method is not limited to welding and screwing, and other bonding methods may be used.

Inside the case 14, a cartridge reel 20 is rotatably accommodated. The cartridge reel 20 comprises a reel hub 20A, an upper flange 20B1, and a lower flange 20B2. The reel hub 20A is formed in a cylindrical shape. The reel hub 20A is a shaft center portion of the cartridge reel 20, has a shaft center direction along an up-down direction of the case 14, and is disposed in a center portion of the case 14. Each of the upper flange 20B1 and the lower flange 20B2 is formed in an annular shape. A center portion of the upper flange 20B1 in a plan view is fixed to an upper end portion of the reel hub 20A, and a center portion of the lower flange 20B2 in a plan view is fixed to a lower end portion of the reel hub 20A. It should be noted that the reel hub 20A and the lower flange 20B2 may be integrally molded.

The magnetic tape MT is wound around an outer peripheral surface of the reel hub 20A, and an end portion of the magnetic tape MT in a width direction is held by the upper flange 20B1 and the lower flange 20B2.

An opening 14B is formed on a front side of a right wall 14A of the case 14. The magnetic tape MT is pulled out from the opening 14B.

The cartridge memory 22 is provided in the magnetic tape cartridge 12. As shown in FIG. 2 as an example, the cartridge memory 22 is accommodated in a right rear end portion of the lower case 18. The cartridge memory 22 is a noncontact communication medium. In the present embodiment, a so-called passive type RFID tag is adopted as the cartridge memory 22. It should be noted that the cartridge memory 22 is an example of a "memory" according to the technology of the present disclosure.

Information on the magnetic tape MT is stored in the cartridge memory 22. The information on the magnetic tape MT refers to, for example, management information for managing the magnetic tape cartridge 12. Examples of the management information include information on the cartridge memory 22, information for specifying the magnetic tape cartridge 12, recording capacity of the magnetic tape MT, summary of the data recorded in the magnetic tape MT, an item of the data, and information indicating a recording format of the data.

Figure 3:
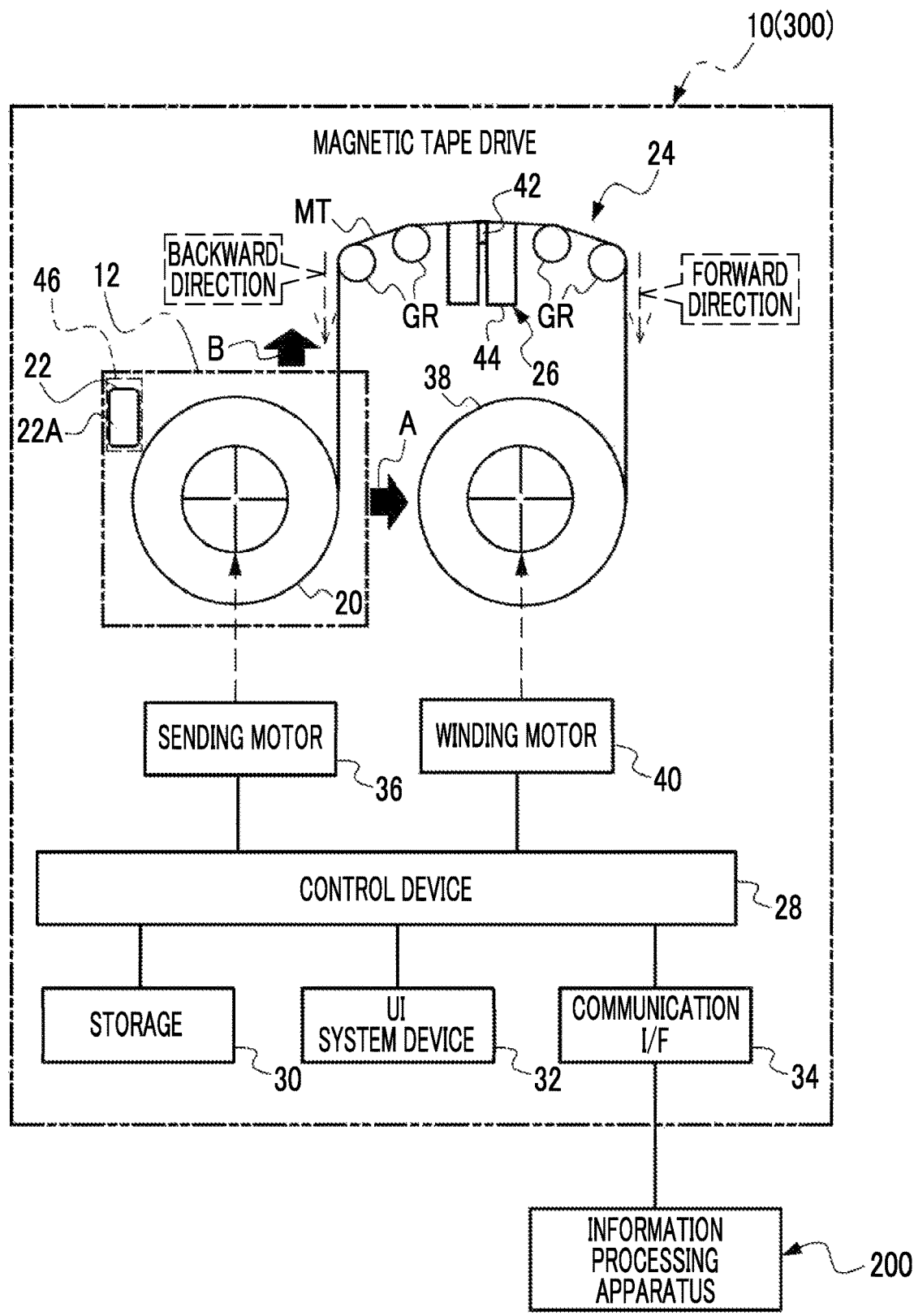
FIG. 3 is a schematic configuration diagram showing an example of a hardware configuration of a magnetic tape drive.

As an example, as shown in FIG. 3, the magnetic tape drive 10 comprises a transport device 24, a magnetic head 26, a control device 28, a storage 30, a UI system device 32, and a communication I/F 34. The magnetic tape drive 10 is loaded into the magnetic tape cartridge 12 along the direction of the arrow A. The magnetic tape drive 10 is a device that pulls out the magnetic tape MT from the magnetic tape cartridge 12, records the data in the pulled out magnetic tape MT by using the magnetic head 26, and read the data by using the magnetic head 26 from the pulled out magnetic tape MT by a linear serpentine method. It should be noted that, in the present embodiment, reading the data from the magnetic tape MT refers to the reproduction of the data, in other words.

The control device 28 controls the entire magnetic tape drive 10. In the present embodiment, although the control device 28 is realized by an ASIC, the technology of the present disclosure is not limited to this. For example, the control device 28 may be realized by an FPGA. In addition, the control device 28 may be realized by the computer including a CPU, a flash memory (for example, an EEPROM and/or an SSD), and a RAM. In addition, the control device 28 may be realized by combining two or more of an ASIC, an FPGA, and a computer. That is, the control device 28 may be realized by a combination of a hardware configuration and a software configuration.

The storage 30 is connected to the control device 28, and the control device 28 writes various pieces of information to the storage 30 and reads out various pieces of information from the storage 30. Examples of the storage 30 include a flash memory and/or an HDD. The flash memory and the HDD are merely examples, and any memory may be used as long as the memory is a non-volatile memory that can be mounted on the magnetic tape drive 10.

The UI system device 32 is a device having a reception function of receiving a command signal indicating a command from a user and a presentation function of presenting the information to the user. The reception function is realized by a touch panel, a hard key (for example, a keyboard), and/or a mouse, for example. The presentation function is realized by a display, a printer, and/or a speaker, for example. The UI system device 32 is connected to the control device 28. The control device 28 acquires the command signal received by the UI system device 32. The UI system device 32 presents various pieces of information to the user under the control of the control device 28.

The communication I/F 34 is connected to the control device 28. In addition, the communication I/F 34 is connected to the information processing apparatus 200 via a communication network (not shown), such as a WAN and/or a LAN. The communication I/F 34 controls the exchange of various pieces of information between the control device 28 and the information processing apparatus 200.

The transport device 24 is a device that selectively transports the magnetic tape MT in a forward direction and a backward direction, and comprises a sending motor 36, a winding reel 38, a winding motor 40, and a plurality of guide rollers GR. It should be noted that, here, the forward direction refers to a feeding direction of the magnetic tape MT, and the backward direction refers to a rewinding direction of the magnetic tape MT.

The sending motor 36 rotates the cartridge reel 20 in the magnetic tape cartridge 12 under the control of the control device 28. The control device 28 controls the sending motor 36 to control a rotation direction, a rotation speed, a rotation torque, and the like of the cartridge reel 20.

The winding motor 40 rotates the winding reel 38 under the control of the control device 28. The control device 28 controls the winding motor 40 to control a rotation direction, a rotation speed, a rotation torque, and the like of the winding reel 38.

In a case in which the magnetic tape MT is wound by the winding reel 38 (that is, in a case in which the magnetic tape MT is loaded), the control device 28 rotates the sending motor 36 and the winding motor 40 such that the magnetic tape MT travels in the forward direction. The rotation speed, the rotation torque, and the like of the sending motor 36 and the winding motor 40 are adjusted in accordance with a speed at which the magnetic tape MT is wound around the winding reel 38. In addition, by adjusting the rotation speed, the rotation torque, and the like of each of the sending motor 36 and the winding motor 40 by the control device 28, the tension is applied to the magnetic tape MT. In addition, the tension applied to the magnetic tape MT is controlled by adjusting the rotation speed, the rotation torque, and the like of each of the sending motor 36 and the winding motor 40 by the control device 28. It should be noted that the sending motor 36 and the winding motor 40 are examples of a "tension application mechanism" according to the technology of the present disclosure.

It should be noted that, in a case in which the magnetic tape MT is rewound around the cartridge reel 20 (that is, in a case in which the magnetic tape MT is unloaded), the control device 28 rotates the sending motor 36 and the winding motor 40 such that the magnetic tape MT travels in the backward direction.

In the present embodiment, the tension applied to the magnetic tape MT is controlled by controlling the rotation speed, the rotation torque, and the like of the sending motor 36 and the winding motor 40, but the technology of the present disclosure is not limited to this. For example, the tension applied to the magnetic tape MT may be controlled by using a dancer roller, or may be controlled by drawing the magnetic tape MT into a vacuum chamber.

Each of the plurality of guide rollers GR is a roller which guides the magnetic tape MT. A traveling path of the magnetic tape MT is determined by separately disposing the plurality of guide rollers GR at positions straddling the magnetic head 26 between the magnetic tape cartridge 12 and the winding reel 38.

The magnetic head 26 comprises a magnetic element unit 42 and a holder 44. The magnetic element unit 42 is held by the holder 44 to come into contact with the traveling magnetic tape MT. The magnetic element unit 42 includes a plurality of magnetic elements (for example, a first data recording element group DWG1, a second data recording element group DWG2, and a data reading element group DRG which will be described below).

The magnetic element unit 42 records the data in the magnetic tape MT transported by the transport device 24, and reads the data (for example, a servo pattern 60 (see FIG. 7) and data other than the servo pattern 60) from the magnetic tape MT transported by the transport device 24. It should be noted that, in the present embodiment, recording the data in the magnetic tape MT means "writing the data to the magnetic tape MT".

The magnetic tape drive 10 comprises a noncontact read/write device 46. The noncontact read/write device 46 is disposed to face a back surface 22A of the cartridge memory 22 on the lower side of the magnetic tape cartridge 12 in a state in which the magnetic tape cartridge 12 is loaded. It should be noted that the state in which the magnetic tape cartridge 12 is loaded into the magnetic tape drive 10 refers to, for example, a state in which the magnetic tape cartridge 12 reaches a position which is predetermined as a position at which reading the data from the magnetic tape MT by the magnetic head 26 is started.

Figure 4:
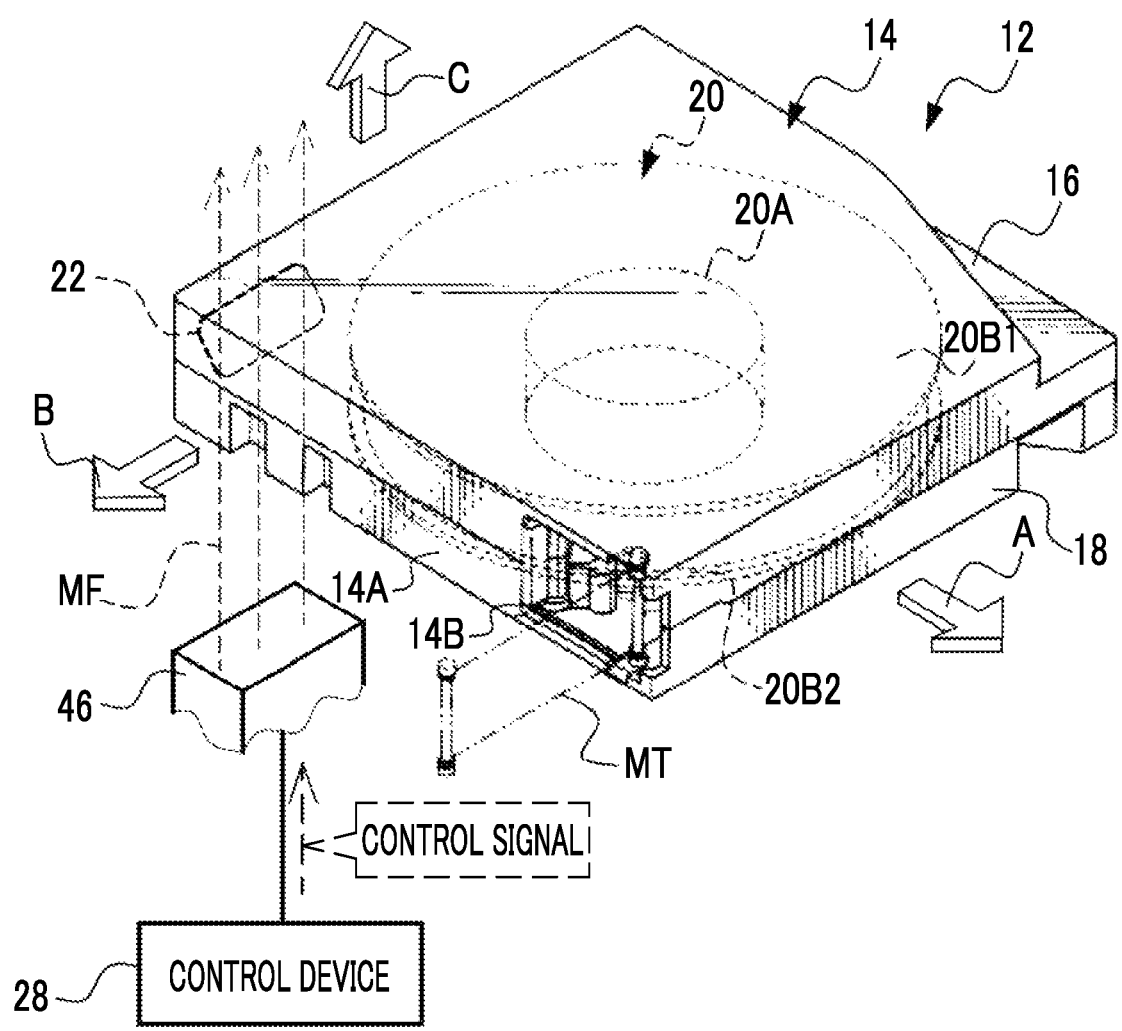
FIG. 4 is a schematic perspective view showing an example of an aspect in which a magnetic field is released by a noncontact read/write device from a lower side of the magnetic tape cartridge.

As an example, as shown in FIG. 4, the noncontact read/write device 46 releases a magnetic field MF from the lower side of the magnetic tape cartridge 12 toward the cartridge memory 22. The magnetic field MF passes through the cartridge memory 22.

The noncontact read/write device 46 is connected to the control device 28. The control device 28 outputs a control signal to the noncontact read/write device 46. The control signal is a signal for controlling the cartridge memory 22. The noncontact read/write device 46 releases the magnetic field MF toward the cartridge memory 22 in response to the control signal input from the control device 28.

The noncontact read/write device 46 performs noncontact communication with the cartridge memory 22 to give a command signal corresponding to the control signal to the cartridge memory 22. More specifically, the noncontact read/write device 46 spatially transmits the command signal to the cartridge memory 22 under the control of the control device 28. The command signal refers to a signal indicating a command to the cartridge memory 22.

In a case in which the command signal is spatially transmitted from the noncontact read/write device 46 to the cartridge memory 22, the command signal is included in the magnetic field MF in response to a command from the control device 28 by the noncontact read/write device 46. In other words, the command signal is superimposed on the magnetic field MF by the noncontact read/write device 46. That is, the noncontact read/write device 46 transmits the command signal to the cartridge memory 22 via the magnetic field MF under the control of the control device 28.

Figure 5:
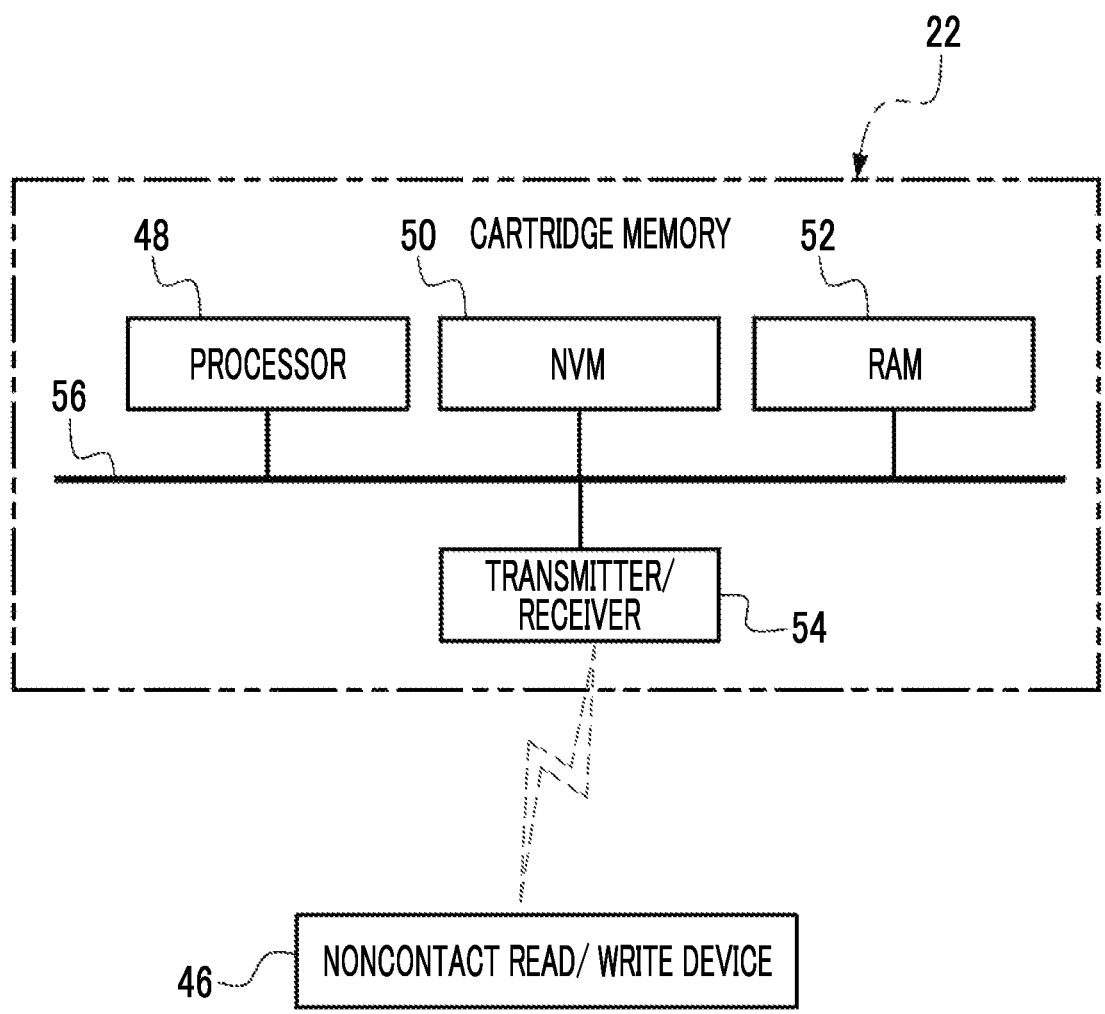
FIG. 5 is a schematic configuration diagram showing an example of a hardware configuration of an electric system of a cartridge memory.

As an example, as shown in FIG. 5, the cartridge memory 22 comprises a processor 48, an NVM 50, a RAM 52, and a transmitter/receiver 54. The processor 48, the NVM 50, the RAM 52, and the transmitter/receiver 54 are connected to a bus 56.

The processor 48 is, for example, a CPU, and controls the entire cartridge memory 22. A memory is connected to the processor 48. The memory includes the NVM 50 and the RAM 52. Examples of the NVM 50 include a ferroelectric memory. The ferroelectric memory is merely an example, and the NVM 50 need only be any non-volatile memory, such as a magnetoresistive memory.

The RAM 52 is a memory in which information is transitorily stored, and is used as a work memory by the processor 48. Examples of the RAM 52 include a DRAM and an SRAM.

The transmitter/receiver 54 is connected to the noncontact read/write device 46 in a wirelessly communicable manner. The transmitter/receiver 54 controls the exchange of various pieces of information between the processor 48 and the noncontact read/write device 46. That is, the processor 48 transmits and receives various pieces of information to and from the noncontact read/write device 46 via the transmitter/receiver 54.

The transmitter/receiver 54 receives the information (for example, the command signal) transmitted (that is, spatially transmitted) from the noncontact read/write device 46, and outputs the received information to the processor 48 via the bus 56. The transmitter/receiver 54 transmits (that is, spatially transmits) the information (for example, a result of processing executed by the processor 48 in response to the command signal) in response to a request from the processor 48 to the noncontact read/write device 46.

In the cartridge memory 22, the transmitter/receiver 54 receives the request from the noncontact read/write device 46, and the processor 48 writes the information to the NVM 50 in response to the request received by the transmitter/receiver 54, and reads out the information from the NVM 50.

Figure 6:
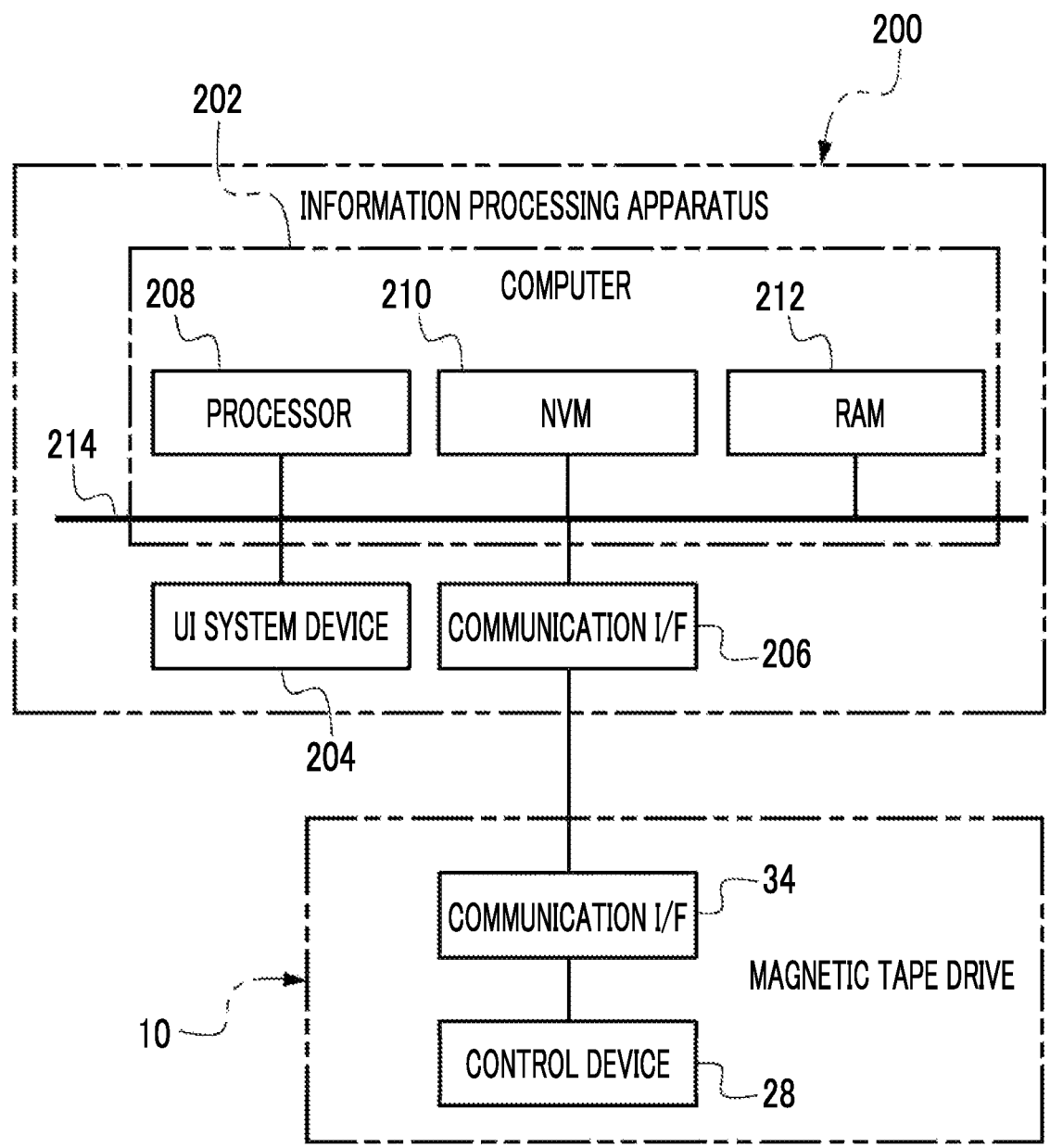
FIG. 6 is a schematic configuration diagram showing an example of a hardware configuration of an electric system of an information processing apparatus.

As an example, as shown in FIG. 6, the information processing apparatus 200 comprises a computer 202, a UI system device 204, and a communication I/F 206. The computer 202 is an example of a "computer" according to the technology of the present disclosure. The computer 202 comprises a processor 208, an NVM 210, and a RAM 212. The processor 208, the NVM 210, and the RAM 212 are connected to a bus 214. In addition, the UI system device 204 and the communication I/F 206 are also connected to the bus 214.

The processor 208 controls the entire information processing apparatus 200. The processor 208 is a CPU, for example. The NVM 210 is a non-volatile storage device that stores various programs, various parameters, and the like. Examples of the NVM 210 include a flash memory (for example, an EEPROM and an SSD). The RAM 212 is a memory in which the information is transitorily stored, and is used as a work memory by the processor 208. Examples of the RAM 212 include a DRAM and an SRAM.

The UI system device 204 is a device having the reception function of receiving the command signal indicating the command from the user and the presentation function of presenting the information to the user. The reception function is realized by a keyboard, a mouse, and a touch panel, for example. The presentation function is realized by a display and a speaker, for example. The processor 208 acquires the command signal received by the UI system device 204, and is operated in response to the acquired command signal. In addition, the UI system device 204 presents various pieces of information to the user under the control of the processor 208.

The communication I/F 206 is connected to the communication I/F 34 of the magnetic tape drive 10 via a communication network (not shown), such as a WAN and/or a LAN. The communication I/F 206 controls the exchange of various pieces of information between the processor 208 and the control device 28.

Figure 7:
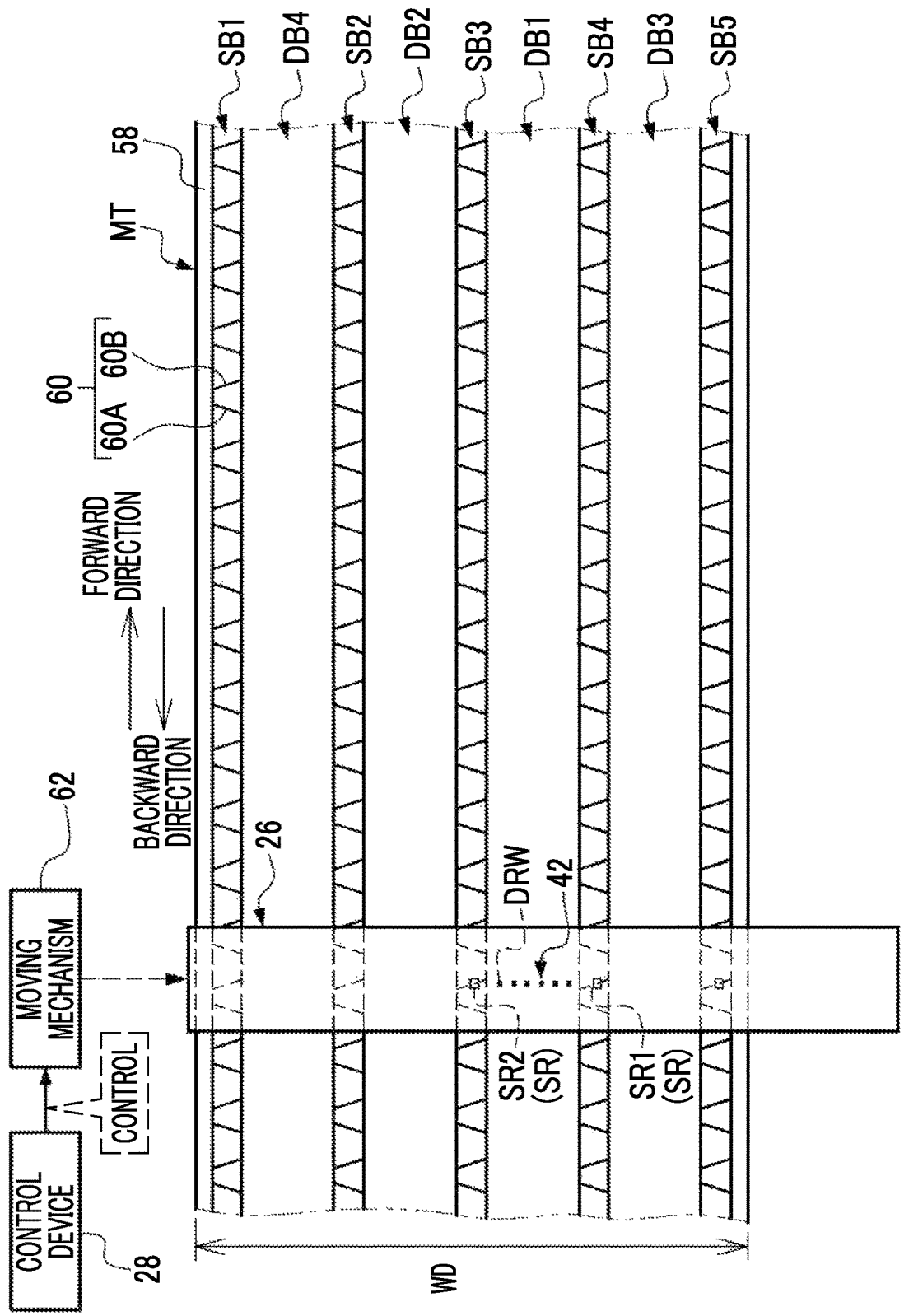
FIG. 7 is a conceptual diagram showing an example of an aspect in which a part of a surface of a magnetic tape is enlarged.

As an example, as shown in FIG. 7, in the magnetic tape MT, servo bands SB1, SB2, SB3, SB4, and SB5, and data bands DB1, DB2, DB3, and DB4 are formed. In the example shown in FIG. 7, the servo bands SB1, SB2, SB3, SB4, and SB5, and the data bands DB1, DB2, DB3, and DB4 are formed on a surface 58 of the magnetic tape MT. It should be noted that, in the following, for convenience of description, in a case in which the distinction is not specifically needed, the servo bands SB1 to SB5 are referred to as a "servo band SB", and the data bands DB1 to DB4 are referred to as a "data band DB".

The servo bands SB1 to SB5 and the data bands DB1 to DB4 are formed along a total length direction of the magnetic tape MT. Here, the total length direction of the magnetic tape MT refers to a traveling direction (that is, the forward direction and the backward direction) of the magnetic tape MT, in other words.

The servo bands SB1 to SB5 are arranged at positions separated from each other in a width direction WD of the magnetic tape MT. For example, the servo bands SB1 to SB5 are arranged at equal intervals along the width direction WD. It should be noted that, in the present embodiment, "equal interval" refers to the equal interval in the sense of including an error generally allowed in the technical field to which the technology of the present disclosure belongs, that is the error to the extent that it does not contradict the purpose of the technology of the present disclosure, in addition to the exact equal interval.

The data bands DB are disposed at positions with the servo band SB interposed therebetween in the width direction WD. In the width direction WD, the data band DB1 is disposed between the servo band SB3 and the servo band SB4. In the width direction WD, the data band DB2 is disposed between the servo band SB2 and the servo band SB3. In the width direction WD, the data band DB3 is disposed between the servo band SB4 and the servo band SB5. In the width direction WD, the data band DB4 is disposed between the servo band SB1 and the servo band SB2. That is, the servo bands SB and the data bands DB are arranged alternately along the width direction WD of the magnetic tape MT.

It should be noted that, in the example shown in FIG. 7, five servo bands SB and four data bands DB are shown, but this is merely an example, less than five servo bands SB and less than four data bands DB may be used, or six or more servo bands SB and five or more data bands DB may be used, and the servo bands SB and the data bands DB need only be arranged alternately along the width direction WD of the magnetic tape MT.

In the servo band SB, the servo pattern 60 is recorded at a predetermined interval along the total length direction of the magnetic tape MT (that is, the traveling direction of the magnetic tape MT). The servo pattern 60 includes magnetization regions 60A and 60B. The magnetization regions 60A and 60B are a pair of linear magnetization regions tilted line-symmetrically with respect to a virtual straight line along the width direction WD. The magnetization regions 60A and 60B are formed to be non-parallel to each other and tilted at a predetermined angle in opposite directions on the total length direction side of the magnetic tape MT.

The magnetic element unit 42 in the magnetic head 26 includes a plurality of magnetic elements. In the example shown in FIG. 7, a plurality of servo reading elements SR and a plurality of data magnetic elements DRW are shown as the plurality of magnetic elements. The plurality of servo reading elements SR and the plurality of data magnetic elements DRW are provided in a center portion of the magnetic head 26 in a plan view. The plurality of servo reading elements SR and the plurality of data magnetic elements DRW are linearly disposed at intervals along the width direction WD (for example, at equal intervals along the width direction WD). The plurality of data magnetic elements DRW are provided between a servo reading element SR1 and a servo reading element SR2 in the width direction WD. That is, the plurality of data magnetic elements DRW are provided between the servo reading elements SR adjacent to each other in the width direction WD.

Each of the plurality of servo reading elements SR is disposed and used on a pair of the servo bands SB adjacent to each other in the width direction WD via the data band DB. The plurality of data magnetic elements DRW are disposed and used on any one data band DB among the data bands DB1 to DB4.

In the example shown in FIG. 7, the servo reading elements SR1 and SR2 are shown as the plurality of servo reading elements SR. In the following, for convenience of description, in a case in which the distinction is not specifically needed, the servo reading elements SR1 and SR2 will be referred to as a servo reading element SR.

The magnetic head 26 is formed wider than the magnetic tape MT along a longitudinal direction. For example, a length of the magnetic head 26 in the longitudinal direction is a length that is at least enough to cover the magnetic tape MT along the width direction WD in a case in which reading and writing the data is performed on any data band DB of the magnetic tape MT by the magnetic element unit 42.

In the example shown in FIG. 7, the data band DB1 among the plurality of data bands DB is designated as a processing target data band, and the plurality of data magnetic elements DRW are positioned on the data band DB1. It should be noted that the processing target data band refers to the data band DB in which the magnetic processing (for example, reading the data and/or recording the data) by the plurality of data magnetic elements DRW is performed, among the plurality of data bands DB. In addition, in the example shown in FIG. 7, the servo reading element SR1 is positioned on the servo band SB4, and the servo reading element SR2 is positioned on the servo band SB3.

A moving mechanism 62 is mechanically connected to the magnetic head 26. The moving mechanism 62 comprises a drive source (not shown). Examples of the drive source include a voice coil motor and/or a piezo actuator. The control device 28 is connected to the drive source, and the power of the drive source is generated in accordance with the command of the control device 28.

Under the control of the control device 28, the moving mechanism 62 generates the power in accordance with the servo pattern 60 read by the servo band SB, and transmits the generated power to the magnetic head 26 to move the magnetic head 26 to the width direction WD. As a result, the registration of the data magnetic element DRW with respect to the designated area in the data band DB is realized.

In addition, in a case in which the processing target data band is changed, the moving mechanism 62 changes the position of the servo reading element SR by moving the magnetic head 26 in the width direction WD under the control of the control device 28. For example, in a case in which the processing target data band is changed, the moving mechanism 62 moves the magnetic head 26 under the control of the control device 28 to position the servo reading element SR1 on one servo band SB of the pair of the servo bands SB adjacent to each other in the width direction WD via the data band DB of the change destination and to position the servo reading element SR2 on the other servo band SB. As a result, the plurality of data magnetic elements DRW are positioned on the processing target data band.

As described above, in a state in which the plurality of data magnetic elements DRW are positioned on the processing target data band, the control device 28 causes the magnetic tape MT to travel in the forward direction or the backward direction at a fixed speed. Moreover, under this state, the control device 28 performs a tracking control by operating the moving mechanism 62 based on a result of reading the servo pattern 60 by the servo reading element SR, and causes the data magnetic element DWR to perform the magnetic processing on a designated portion in the data band DB (that is, the processing target data band which is the data band DB between the servo bands SB adjacent to each other).

For example, as shown in FIG. 7, in a case in which the position of the servo reading element SR1 corresponds to the position of the servo band SB4 and the position of the servo reading element SR2 corresponds to the position of the servo band SB3, the plurality of data magnetic elements DRW read the data from the data band DB1 and/or record the data in the data band DB1.

Figure 8:
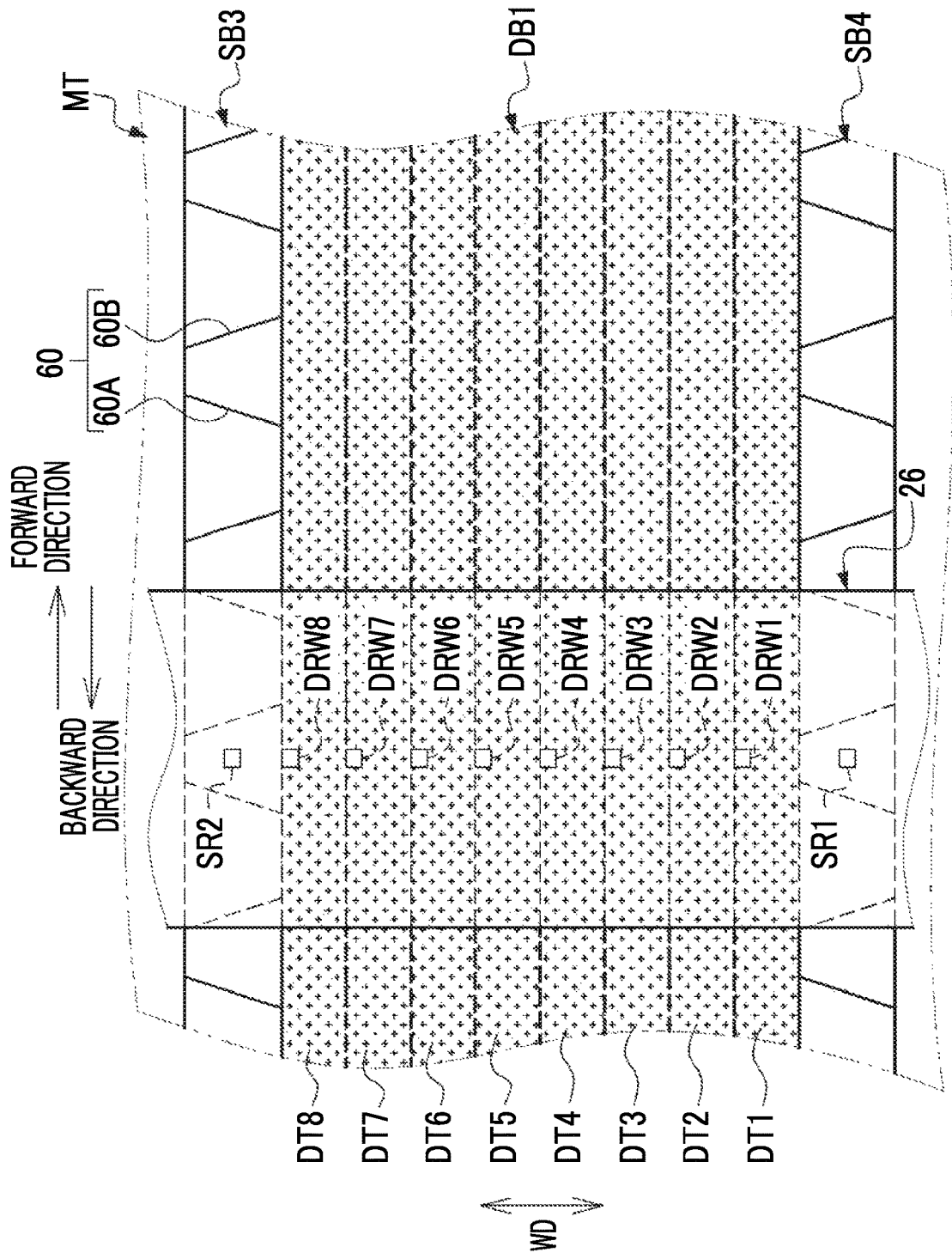
FIG. 8 is a conceptual diagram showing an example of a configuration of a data band formed on the surface of the magnetic tape.

As an example, as shown in FIG. 8, in the data band DB1, as a plurality of division areas obtained by dividing the data band DB1 in the width direction WD, data tracks DT1, DT2, DT3, DT4, DT5, DT6, DT7, and DT8 are formed from the servo band SB4 side to the servo band SB3 side. The data tracks DT1, DT2, DT3, DT4, DT5, DT6, DT7, and DT8 are examples of "plurality of division areas" according to the technology of the present disclosure.

The magnetic head 26 includes, as the plurality of data magnetic elements DRW, data magnetic elements DRW1, DRW2, DRW3, DRW4, DRW5, DRW6, DRW7, and DRW8 between the servo reading element SR1 and the servo reading element SR2 along the width direction WD. The data magnetic elements DRW1 to DRW8 have a one-to-one correspondence with the data tracks DT1 to DT8, and can read (that is, reproduce) data from the data tracks DT1 to DT8 and record (that is, write) the data in the data tracks DT1 to DT8.

In addition, although not shown, a plurality of data tracks DT corresponding to the data tracks DT1, DT2, DT3, DT4, DT5, DT6, DT7, and DT8 are formed in the data bands DB2 to DB4 (see FIG. 7).

It should be noted that, in the following, in a case in which the distinction is not specifically needed, the data tracks DT1, DT2, DT3, DT4, DT5, DT6, DT7, and DT8 are referred to as a "data track DT". In addition, in the following, in a case in which the distinction is not specifically needed, the data magnetic elements DRW1, DRW2, DRW3, DRW4, DRW5, DRW6, DRW7, and DRW8 are referred to as the "data magnetic element DRW".

Figure 9:
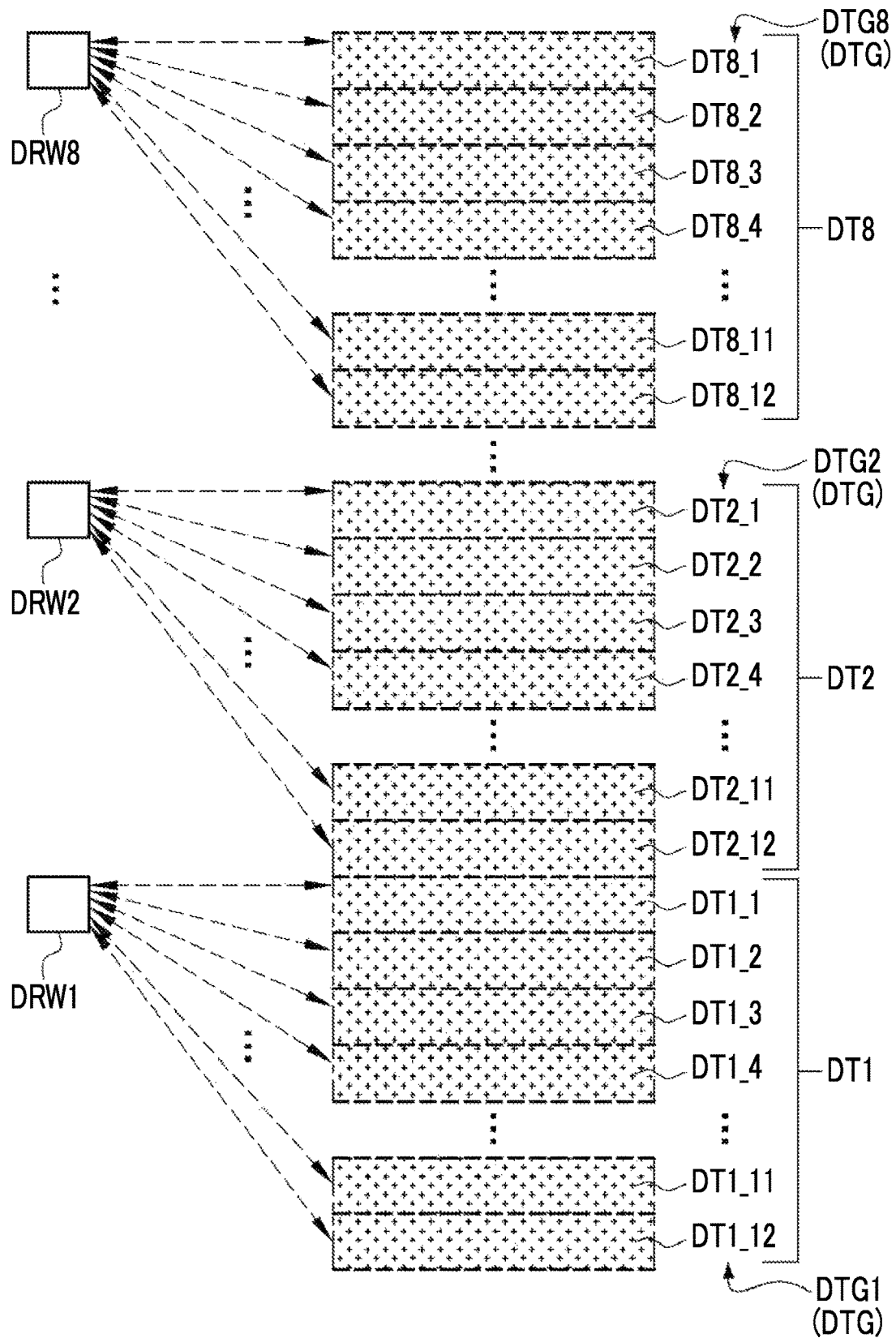
FIG. 9 is a conceptual diagram showing an example of a correspondence relationship between a data magnetic element and a data track.

As shown in FIG. 9 as an example, the data track DT includes a division data track group DTG The data tracks DT1 to DT8 correspond to the division data track groups DTG1 to DTG8. In the following, in a case in which the distinction is not specifically needed, the division data track groups DTG1 to DTG8 are referred to as the "division data track group DTG".

The data track group DTG1 is a set of a plurality of division data tracks obtained by dividing the data track DT in the width direction WD. In the example shown in FIG. 9, as an example of the data track group DTG1, the division data tracks DT1_1, DT1_2, DT1_3, DT1_4, . . . , DT1_11, and DT1_12 obtained by dividing the data track DT into 12 equal parts in the width direction WD are shown. The data magnetic element DRW1 is responsible for the magnetic processing of the data track group DTG1. That is, the data magnetic element DRW1 is responsible for recording the data in the division data tracks DT1_1, DT1_2, DT1_3, DT1_4, . . . , DT1_11, and DT1_12, and reading the data from the division data tracks DT1_1, DT1_2, DT1_3, DT1_4, . . . , DT1_11, and DT1_12.

Each of the data magnetic elements DRW2 to DRW8 is also responsible for the magnetic processing of the data track group DTG of the data track DT corresponding to each data magnetic element DRW, similarly to the data magnetic element DRW1.

The data magnetic element DRW is moved to a position corresponding to one designated data track DT among the plurality of data tracks DT with the movement of the magnetic head 26 by the moving mechanism 62 (FIG. 7) in the width direction WD. The data magnetic element DRW is fixed at a position corresponding to one designated data track DT by a servo control using the servo pattern 60.

Figure 10:
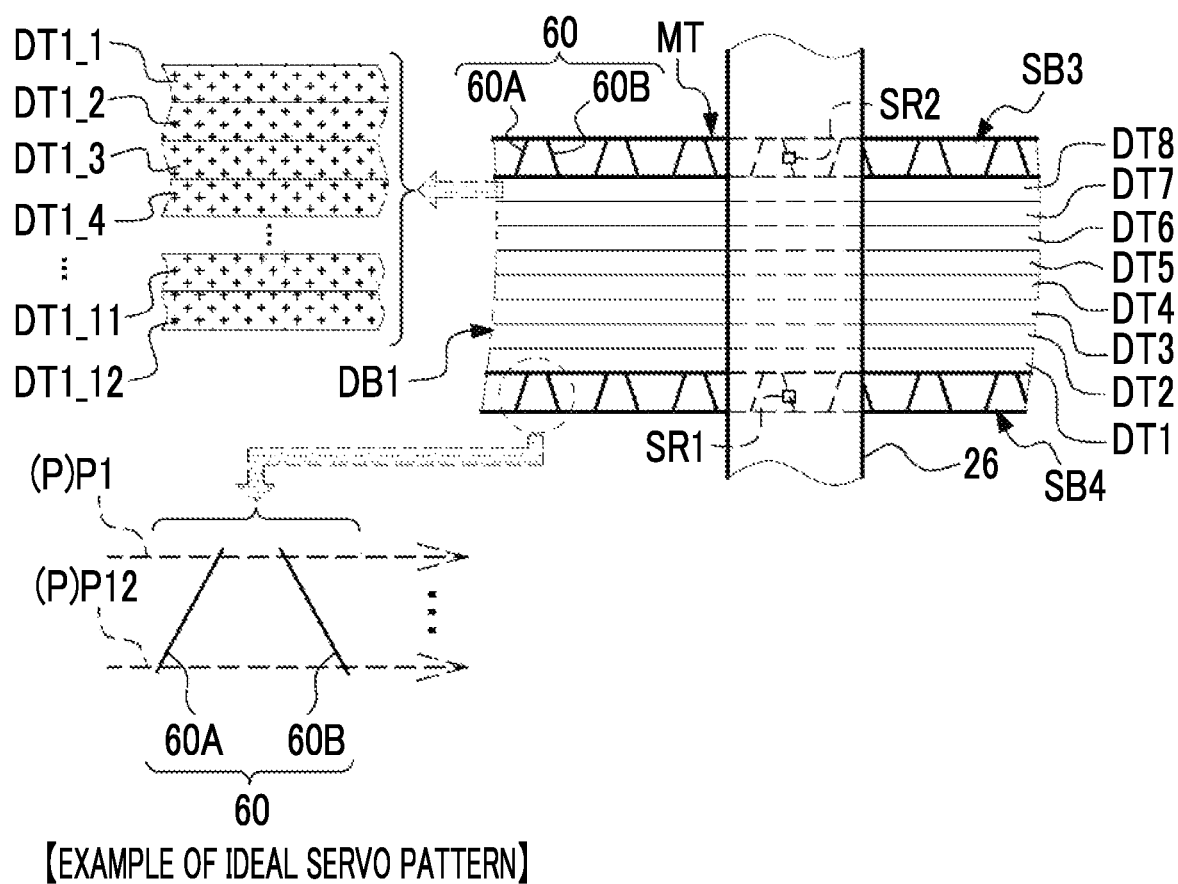
FIG. 10 is a conceptual diagram showing an example of an aspect in which an ideal servo pattern is read.

FIG. 10 shows an example of the ideal servo pattern 60. As an example, as shown in FIG. 10, paths P1 to P12 are assigned to the servo pattern 60 at equal intervals along the width direction WD. The paths P1 to P12 correspond to the plurality of division data tracks (12 division data tracks in the examples shown in FIGS. 9 and 10) included in the division data track group DTG In the following, in a case in which the distinction is not needed, the paths P1 to P12 are referred to as a "path P".

In a case in which the data magnetic element DRW performs the magnetic processing on a processing target division data track, which is the division data track designated as the target of the magnetic processing, the moving mechanism 62 moves the magnetic head 26 in the width direction WD such that the servo reading element SR passes through the path P corresponding to the processing target division data track. For example, in a case in which the data magnetic element DRW performs the magnetic processing on the data track DT1_1, the moving mechanism 62 moves the magnetic head 26 in the width direction WD such that the servo reading element SR passes through the path P1. In addition, for example, in a case in which the data magnetic element DRW performs the magnetic processing on the data track DT1_12, the moving mechanism 62 moves the magnetic head 26 in the width direction WD such that the servo reading element SR passes through the path P12. As a result, the data magnetic element DRW1 faces the processing target division data track and can perform the magnetic processing on the processing target division data track.

Figure 11:
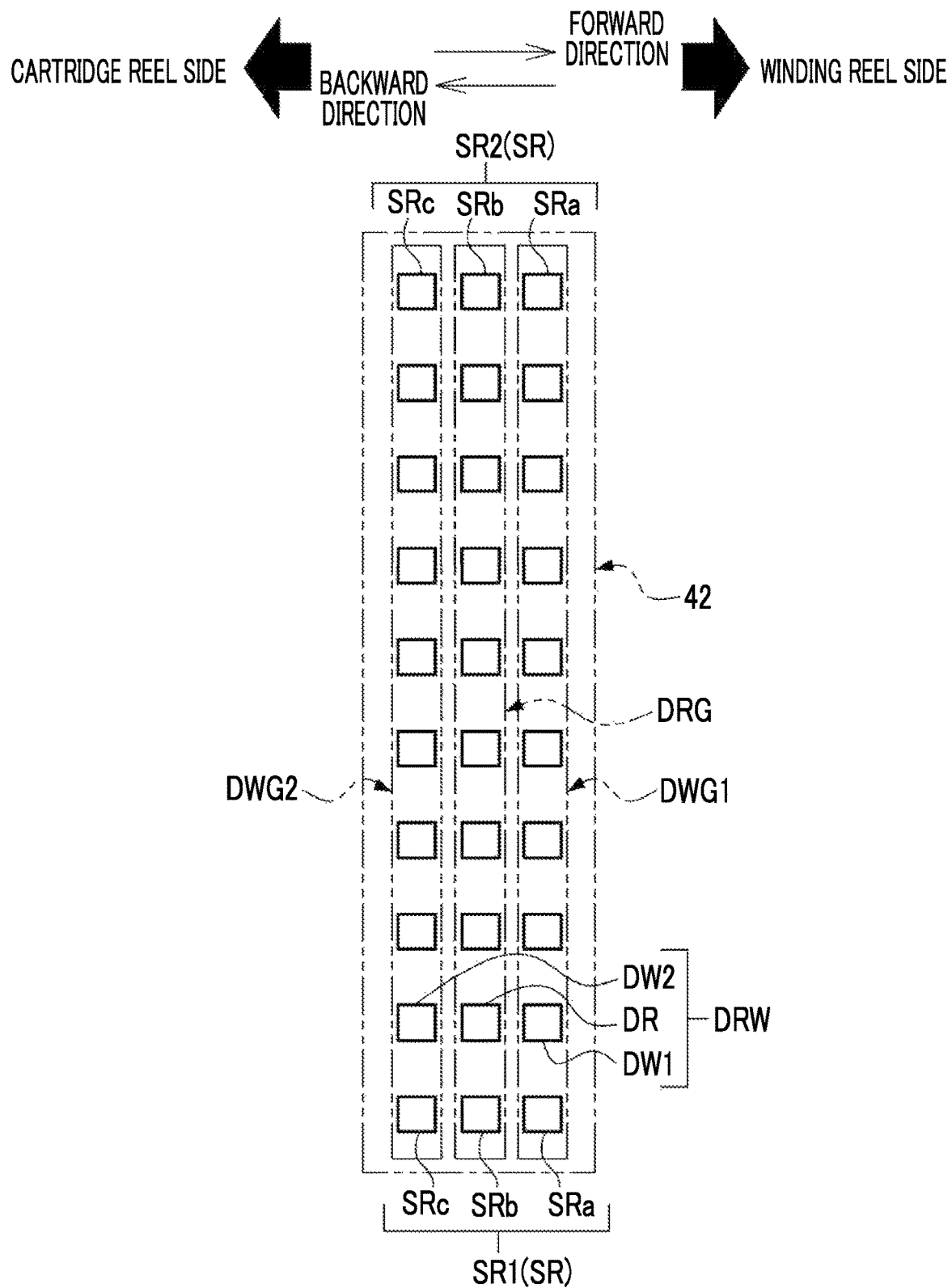
FIG. 11 is a conceptual diagram showing an example of a configuration of a magnetic element unit.

As an example, as shown in FIG. 11, the magnetic element unit 42 consists of the first data recording element group DWG1, the second data recording element group DWG2, and the data reading element group DRG The servo reading element SR1 is positioned at one end of the magnetic element unit 42, and the servo reading element SR2 is positioned at the other end of the magnetic element unit 42.

The data magnetic element DRW includes a first data recording element DW1, a second data recording element DW2, and a data reading element DR. The first data recording element group DWG1 includes a plurality of first data recording elements DW1. The second data recording element group DWG2 includes a plurality of second data recording elements DW2. The data reading element group DRG includes a plurality of data reading elements DR.

The first data recording element DW1 and the second data recording element DW2 record the data in the data track DT. The data reading element DR reads the data from the data track DT. It should be noted that, in the following, in a case in which the distinction is not specifically needed, the first data recording element DW1 and the second data recording element DW2 are referred to as a "data recording element DW".

The first data recording element group DWG1, the second data recording element group DWG2, and the data reading element group DRG are arranged at fixed intervals in order of the first data recording element group DWG1, the data reading element group DRG and the second data recording element group DWG2 from the winding reel 38 side to the cartridge reel 20 side along the total length direction of the magnetic tape MT. Here, the fixed interval refers to, for example, an interval predetermined by a test using an actual machine and/or a computer simulation as an interval at which crosstalk does not occur between the data reading element DR and the data recording element DW. It should be noted that, in the present embodiment, "fixed" refers to the fixed manner in the sense of including an error generally allowed in the technical field to which the technology of the present disclosure belongs, that is the error to the extent that it does not contradict the purpose of the technology of the present disclosure, in addition to the exact fixed manner.

The servo reading element SR includes a first servo reading element SRa, a second servo reading element SRb, and a third servo reading element SRc. The first servo reading element SRa, the second servo reading element SRb, and the third servo reading element SRc are provided in order of the first servo reading element SRa, the second servo reading element SRb, and the third servo reading element SRc from the winding reel 38 (see FIG. 3) side to the cartridge reel 20 (see FIG. 3) side in the total length direction of the magnetic tape MT.

It should be noted that, here, the first servo reading element SRa, the second servo reading element SRb, and the third servo reading element SRc are described, but the technology of the present disclosure is not limited to this, and one or two of the first servo reading element SRa, the second servo reading element SRb, and the third servo reading element SRc may be used.

The first data recording element group DWG1 includes the first servo reading element SRa of the servo reading element SR1, the first servo reading element SRa of the servo reading element SR2, and the plurality of first data recording elements DW1. The plurality of first data recording elements DW1 are linearly arranged at equal intervals from the first servo reading element SRa side of the servo reading element SR1 to the first servo reading element SRa side of the servo reading element SR2. The number of the plurality of first data recording elements DW1 included in the first data recording element group DWG1 is the same as the number of data tracks DT included in the data band DB. In the example shown in FIG. 11, eight first data recording elements DW1 are shown as the plurality of first data recording elements DW1, and the positions of these first data recording elements DW1 correspond to the positions of the data magnetic elements DRW1, DRW2, DRW3, DRW4, DRW5, DRW6, DRW7, and DRW8 (see FIGS. 8 and 9).

The second data recording element group DWG2 includes the third servo reading element SRc of the servo reading element SR1, the third servo reading element SRc of the servo reading element SR2, and the plurality of second data recording elements DW2. The plurality of second data recording elements DW2 are linearly arranged at equal intervals from the third servo reading element SRc side of the servo reading element SR1 to the third servo reading element SRc side of the servo reading element SR2. The number of the plurality of second data recording elements DW2 included in the second data recording element group DWG2 is the same as the number of data tracks DT included in the data band DB. In the example shown in FIG. 11, eight second data recording elements DW2 are shown as the plurality of second data recording elements DW2, and the positions of these second data recording elements DW2 correspond to the positions of the data magnetic elements DRW1, DRW2, DRW3, DRW4, DRW5, DRW6, DRW7, and DRW8 (see FIGS. 8 and 9).

The first data recording element DW1 and the second data recording element DW2 record (that is, write) the data in the corresponding data track DT among all the data tracks DT included in the data band DB.

The data reading element group DRG includes the second servo reading element SRb of the servo reading element SR1, the second servo reading element SRb of the servo reading element SR2, and the plurality of data reading elements DR. The plurality of data reading elements DR are linearly arranged at equal intervals from the second servo reading element SRb side of the servo reading element SR1 to the second servo reading element SRb side of the servo reading element SR2. The number of the plurality of data reading elements DR included in the data reading element group DRG is the same as the number of data tracks DT included in the data band DB. In the example shown in FIG. 11, eight data reading elements DR are shown as the plurality of data reading elements DR, and the positions of these data reading elements DR correspond to the positions of the data magnetic elements DRW1, DRW2, DRW3, DRW4, DRW5, DRW6, DRW7, and DRW8 (see FIGS. 8 and 9).

The data reading element DR reads (that is, reproduces) the data from the corresponding data track DT among all the data tracks DT included in the data band DB.

In the magnetic element unit 42, the reason of the structure in which the data reading element DR is interposed between the first data recording element DW1 and the second data recording element DW2 along the total length direction of the magnetic tape MT is to realize verification in addition to simply causing the data reading element DR to read the data from the data track DT. For example, in a case in which the magnetic tape MT is pulled out from the magnetic tape cartridge 12 (in a case in which the traveling direction of the magnetic tape MT is in the forward direction), after the second data recording element DW2 records the data in the data track DT, the data reading element DR is caused to read the data recorded in the data track DT by the second data recording element DW2 for error checking. In addition, in a case in which the magnetic tape MT is returned to the magnetic tape cartridge 12 (in a case in which the traveling direction of the magnetic tape MT is in the backward direction), after the first data recording element DW1 records the data in the data track DT, the data reading element DR is caused to read the data recorded in the data track DT by the first data recording element DW1 for error checking.

Figure 12:
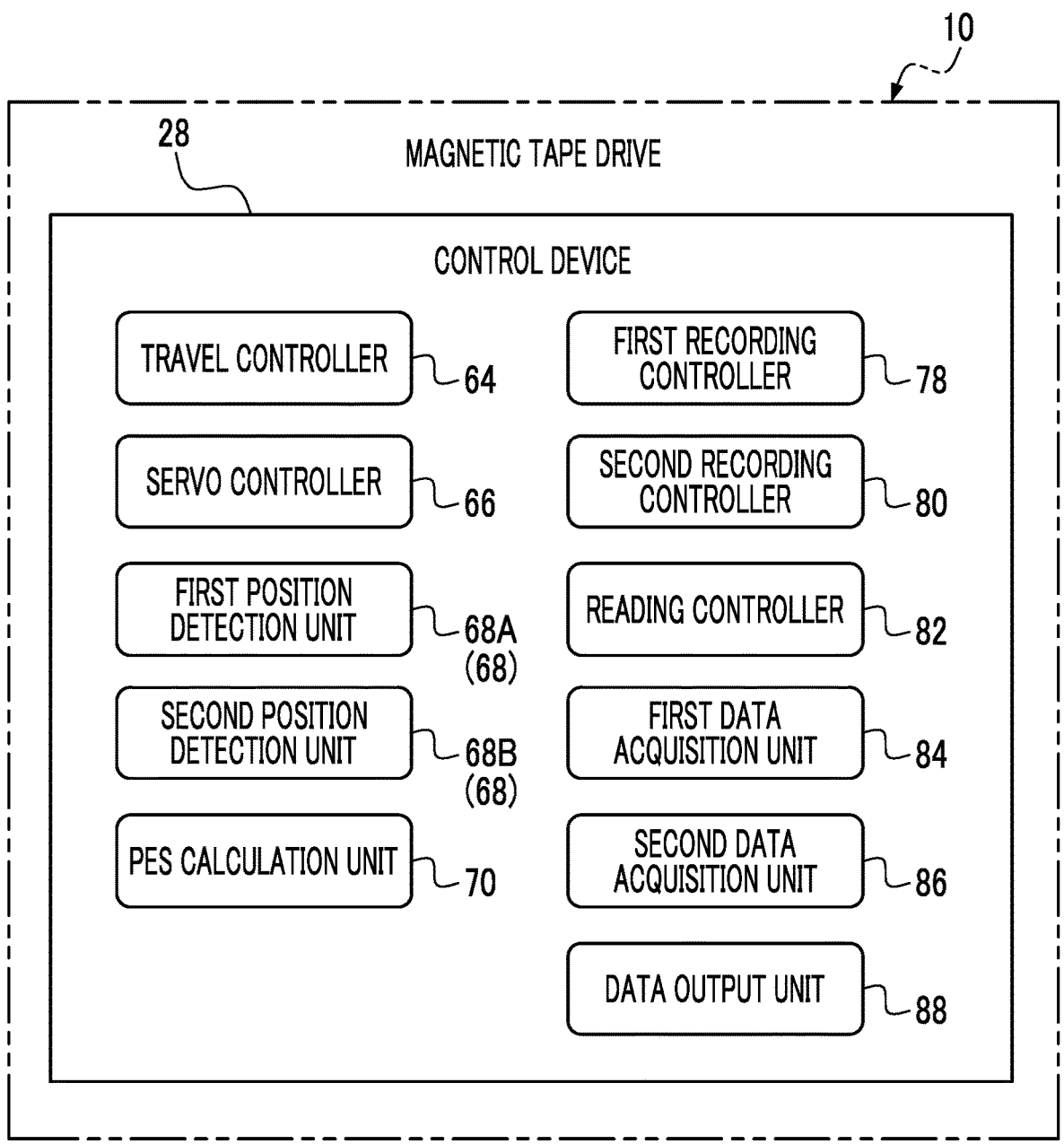
FIG. 12 is a block diagram showing an example of a function of a control device provided in a magnetic tape drive.

As an example, as shown in FIG. 12, the control device 28 includes a travel controller 64, a servo controller 66, a first position detection unit 68A, a second position detection unit 68B, a PES calculation unit 70, a first recording controller 78, a second recording controller 80, a reading controller 82, a first data acquisition unit 84, a second data acquisition unit 86, and a data output unit 88. It should be noted that, in the following, for convenience of description, in a case in which the distinction is not needed, the first position detection unit 68A and the second position detection unit 68B are referred to a "position detection unit 68".

Figure 13:
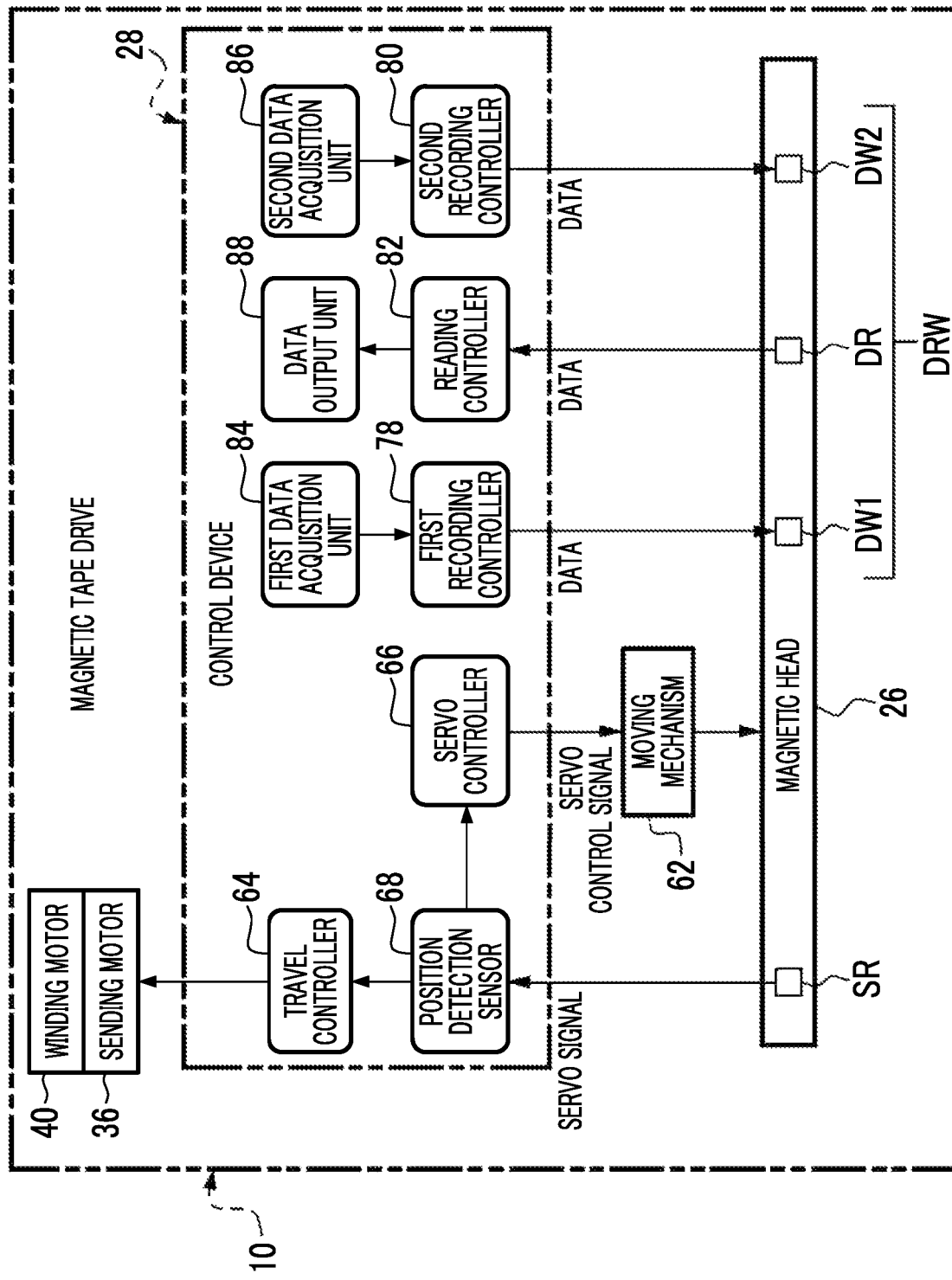
FIG. 13 is a block diagram showing an example of a processing content by the control device.

As an example, as shown in FIG. 13, the travel controller 64 selectively causes the magnetic tape MT to travel in the forward direction and the backward direction by controlling the drive of each of the sending motor 36 and the winding motor 40. The drive of the sending motor 36 is controlled in response to a sending motor control signal (not shown), and the drive of the winding motor 40 is controlled in response to a winding motor control signal (not shown). The sending motor control signal and the winding motor control signal are generated by the travel controller 64. The sending motor control signal is supplied to the sending motor 36 by the travel controller 64, and the winding motor control signal is supplied to the winding motor 40 by the travel controller 64.

For example, the travel controller 64 adjusts a traveling speed and the tension of the magnetic tape MT by controlling the rotation speed and the rotation torque of each of the sending motor 36 and the winding motor 40 in accordance with the command received by the UI system device 32 (see FIG. 3), the information stored in the storage 30 (see FIG. 3), the information acquired via the communication I/F 34 (see FIG. 3), and/or the information stored in the NVM 50 (see FIG. 5) of the cartridge memory 22.

Two types of servo signals based on the servo pattern 60 (see FIGS. 7, 8, and 10) read by the servo reading elements SR1 and SR2 are input to the position detection unit 68. The position detection unit 68 detects the position of the servo reading element SR1 in the servo band SB and the position of the servo reading element SR2 in the servo band SB, and calculates an average value of the detected positions. Moreover, the position detection unit 68 detects the position of the magnetic head 26 in the width direction WD (hereinafter, also referred to as a "magnetic head position") based on the calculated average value. The position detection unit 68 outputs the detected magnetic head position to the travel controller 64 and the servo controller 66.

The servo controller 66 compares the magnetic head position input from the position detection unit 68 with a target position of the magnetic head 26 in the width direction WD, generates a servo control signal in accordance with the comparison result, and outputs the generated servo control signal to the moving mechanism 62. The moving mechanism 62 is operated in response to the servo control signal input from the servo controller 66 to match the position of the magnetic head 26 to the target position.

The first data acquisition unit 84 acquires data to be recorded in the data band DB by the first data recording element DW1 of the magnetic head 26 (hereinafter, also referred to as "first recording data") from an external device (for example, the information processing apparatus 200) and/or the storage 30 (see FIG. 3). The first data acquisition unit 84 outputs the acquired first recording data to the first recording controller 78.

The first recording controller 78 encodes the first recording data input from the first data acquisition unit 84 into a digital signal. Moreover, the first recording controller 78 records the first recording data in the designated division data track in the data band DB by supplying a pulse current in response to the digital signal corresponding to the first recording data to the first data recording element DW1 of the magnetic head 26.

The second data acquisition unit 86 acquires data to be recorded in the data band DB by the second data recording element DW2 of the magnetic head 26 (hereinafter, also referred to as "second recording data") from a host computer (not shown) and/or the storage 30 (see FIG. 3). The second data acquisition unit 86 outputs the acquired second recording data to the second recording controller 80.

The second recording controller 80 encodes the second recording data input from the second data acquisition unit 86 into a digital signal. Moreover, the second recording controller 80 records the second recording data in the designated division data track in the data band DB by supplying a pulse current in response to the digital signal corresponding to the second recording data to the second data recording element DW2 of the magnetic head 26.

It should be noted that, here, the first data acquisition unit 84 and the second data acquisition unit 86 are described, but the technology of the present disclosure is not limited to this, and one data acquisition unit may be used. In this case, the data need only be output to the first recording controller 78 and the second data acquisition unit 86 in accordance with the traveling direction of the magnetic tape MT.

The reading controller 82 controls the operation of the data reading element DR of the magnetic head 26 to cause the data reading element DR to read the data from the designated division data track in the data band DB. The data read from the division data track by the data reading element DR is a pulsed digital signal. The reading controller 82 outputs the pulsed digital signal to the data output unit 88.

The data output unit 88 decodes the pulsed digital signal input from the reading controller 82. The data output unit 88 outputs the data obtained by decoding to a predetermined output destination (for example, a host computer (not shown), a display (not shown), and/or a storage device (for example, the storage 30 (see FIG. 3))).

Figure 14:
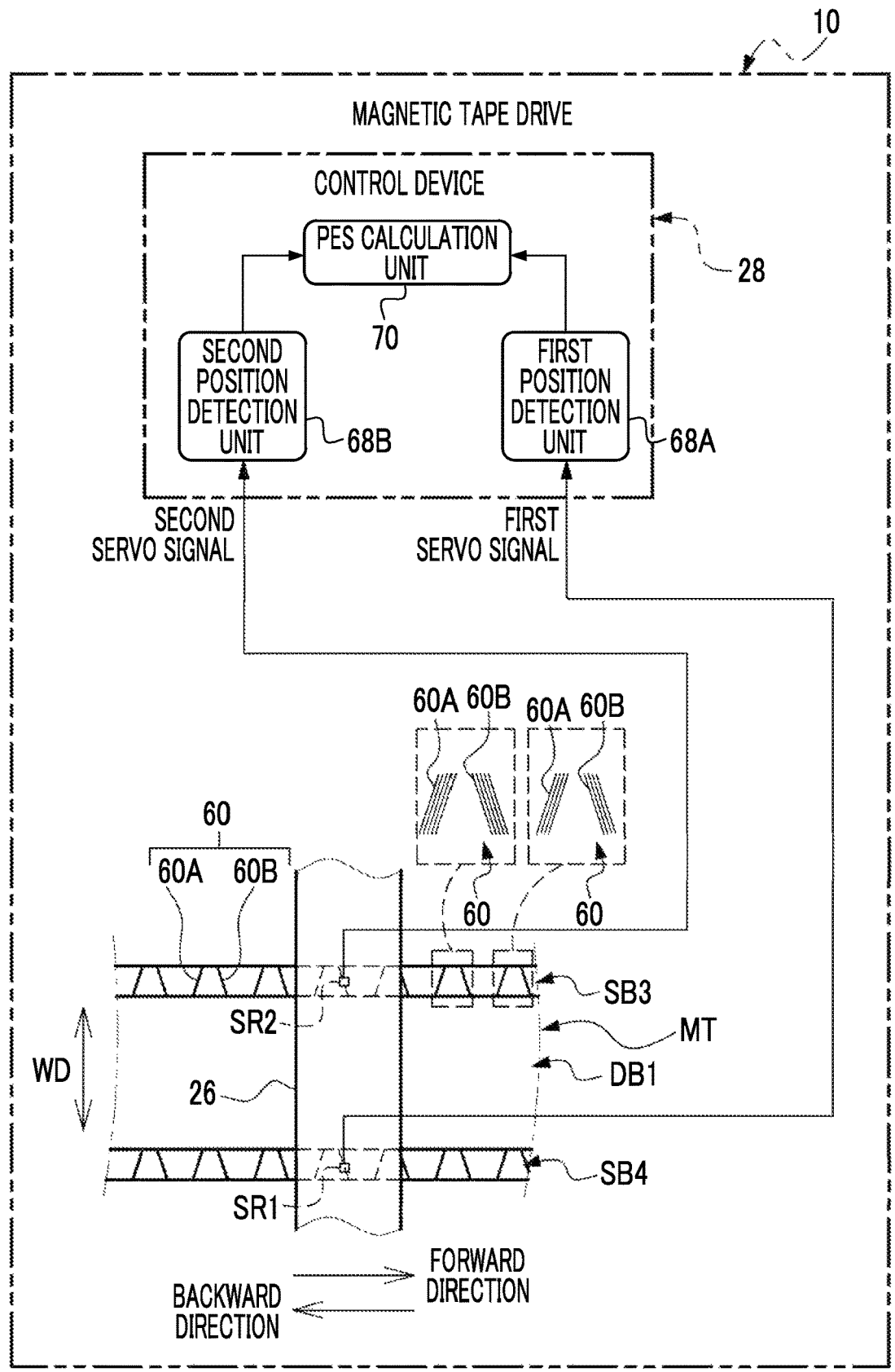
FIG. 14 is a conceptual diagram showing an example of processing contents of a first position detection unit, a second position detection unit, and a PES calculation unit.

As an example, as shown in FIG. 14, the magnetization region 60A included in the servo pattern 60 is a linear region tilted with respect to the virtual straight line along the width direction WD at a first predetermined angle (for example, an angle with respect to the width direction WD is 6 degrees), and the magnetization region 60B included in the servo pattern 60 is a linear region tilted with respect to the virtual straight line along the width direction WD at a second predetermined angle (for example, an angle with respect to the width direction WD is −6 degrees). As the magnetization region 60A, five linearly formed magnetization regions 60A and four linearly formed magnetization regions 60A are present. In addition, as the magnetization region 60B, five linearly formed magnetization regions 60B and four linearly formed magnetization regions 60B are present. That is, along the traveling direction of the magnetic tape MT (for example, from the upstream side to the downstream side in the forward direction), the five magnetization regions 60A, the five magnetization regions 60B, the four magnetization regions 60A, and the four magnetization regions 60B are disposed in this order. Each magnetization region 60A and each magnetization region 60B included in the servo pattern 60 are read by the servo reading element SR.

In a stage before the data is recorded in the data band DB, a first servo signal (for example, each or any of a plurality of servo signals based on the servo patterns 60 read by the first servo reading element SRa, the second servo reading element SRb, and the third servo reading element SRc included in the servo reading element SR1) based on the servo pattern 60 of the servo band SB4 read by the servo reading element SR1 is input to the first position detection unit 68A. The first servo signal is an intermittent pulse corresponding to the magnetization regions 60A and 60B of the servo band SB4. The first position detection unit 68A detects the position of the servo reading element SR1 on the servo band SB4 in the width direction WD based on an interval between the pulses of the first servo signal input from the servo reading element SR1, and outputs the detection result (for example, the detection result of each of the first servo reading element SRa, the second servo reading element SRb, and the third servo reading element SRc included in the servo reading element SR1 or the average value of the detection results thereof) to the PES calculation unit 70.

In a stage before the data is recorded in the data band DB (for example, a stage in which the magnetic tape cartridge 12 is adjusted to the product for shipment), a second servo signal (for example, each or any of a plurality of servo signals based on the servo patterns 60 read by the first servo reading element SRa, the second servo reading element SRb, and the third servo reading element SRc included in the servo reading element SR2) based on the servo pattern 60 of the servo band SB3 read by the servo reading element SR2 is input to the second position detection unit 68B. The second servo signal is an intermittent pulse corresponding to the magnetization regions 60A and 60B of the servo band SB3. The second position detection unit 68B detects the position of the servo reading element SR2 on the servo band SB3 in the width direction WD based on an interval between the pulses of the second servo signal input from the servo reading element SR2, and outputs the detection result (for example, the detection result of each of the first servo reading element SRa, the second servo reading element SRb, and the third servo reading element SRc included in the servo reading element SR2 or the average value of the detection results thereof) to the PES calculation unit 70.

Figure 15:
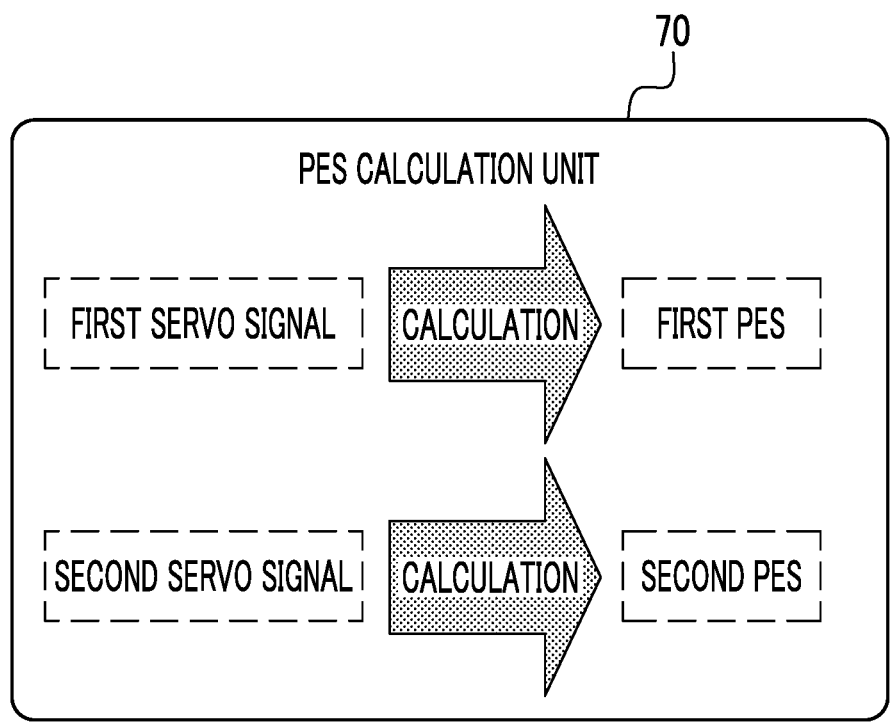
FIG. 15 is a conceptual diagram showing an example of the processing content of the PES calculation unit.

As an example, as shown in FIG. 15, the PES calculation unit 70 calculates a first PES and a second PES based on the detection result input from each of the first position detection unit 68A and the second position detection unit 68B. In the example shown in FIG. 15, the first PES refers to a signal indicating an amount of deviation of the servo reading element SR1 from the original position on the servo band SB4 along the width direction WD. The second PES refers to a signal indicating an amount of deviation of the servo reading element SR2 from the original position on the servo band SB3 along the width direction WD. In the following, in a case in which the distinction is not needed, the first PES and the second PES are referred to as a "PES".

PES is calculated using Expression (1).

$$\hat{y} = \frac{d}{2\tan(\alpha)}\left(\frac{1}{2} - \frac{\sum A_i}{\sum B_i}\right) \quad (1)$$

Figure 16:
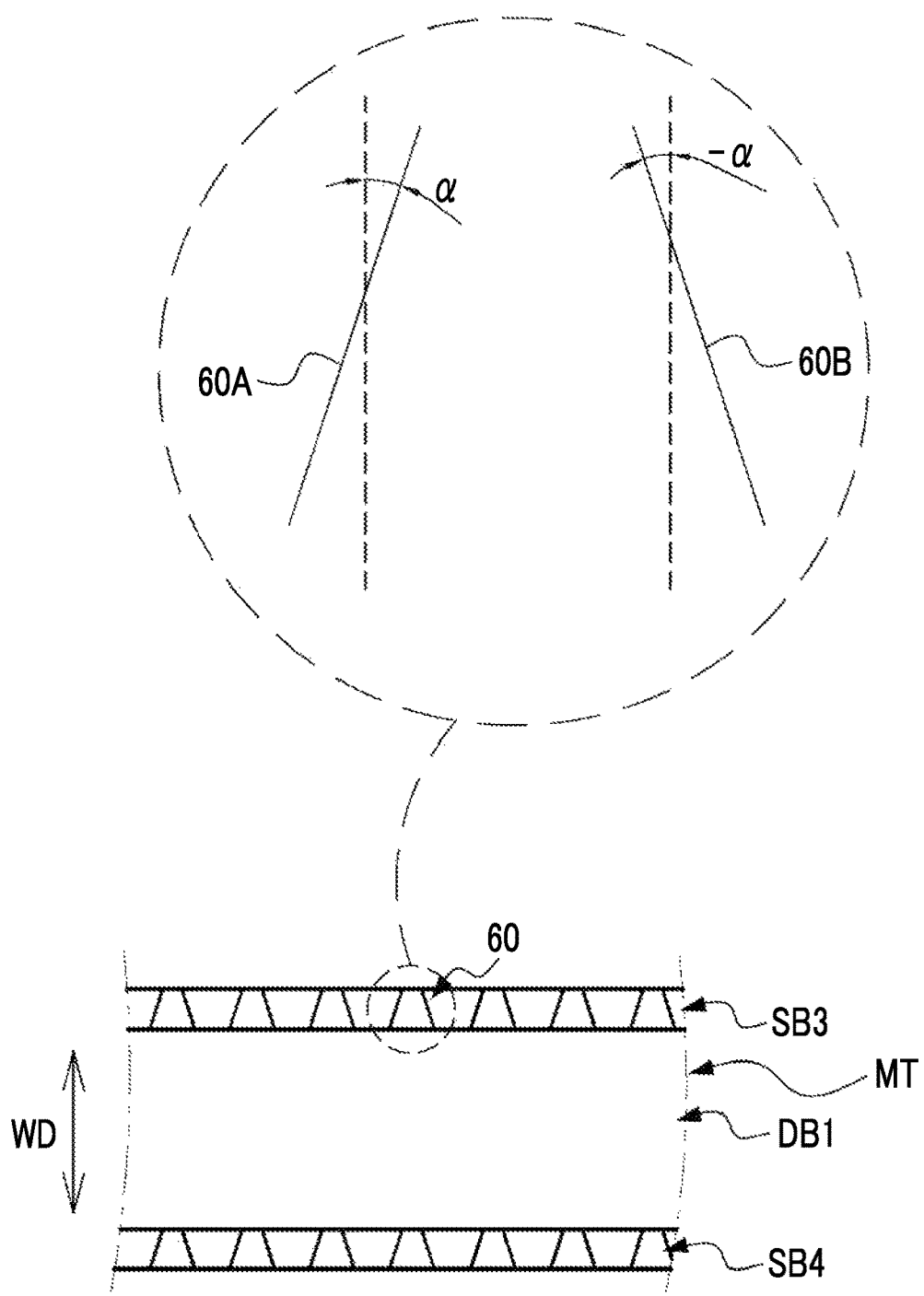
FIG. 16 is a conceptual diagram showing an example of an angle of a magnetization region.

-continued $\hat{y}$: PES $d$: Pitch width of servo pattern in traveling direction $\alpha$: Angle of magnetization region $A_1$: Second distance $B_i$: First distance As an example, as shown in FIG. 16, as "a" shown in Expression (1), the angle with respect to the virtual straight line along the width direction WD of the magnetization region 60A, that is, the first predetermined angle, and the angle with respect to the virtual straight line along the width direction WD of the magnetization region 60B, that is, the second predetermined angle are applied. The first predetermined angle is an angle formed by the virtual straight line (in the example shown in FIG. 16, a broken line intersecting the magnetization region 60A) along the width direction WD of the magnetization region 60A, and the second predetermined angle is an angle formed by the virtual straight line (in the example shown in FIG. 16, a broken line intersecting the magnetization region 60B) along the width direction WD of the magnetization region 60B. It should be noted that the magnetization region 60A shown in FIG. 16 is the magnetization region 60A on the most downstream side in the traveling direction (for example, the forward direction) among a plurality of magnetization regions 60A in one servo pattern 60. In addition, the magnetization region 60B shown in FIG. 16 is the magnetization region 60B on the most downstream side in the traveling direction (for example, the forward direction) among a plurality of magnetization regions 60B in one servo pattern 60.

In Expression (1), the second distance $A_i$ refers to, for example, a distance calculated from a result obtained by reading the magnetization region 60A (see also FIG. 15) on the most downstream side and the magnetization region 60B (see also FIG. 15) on the most downstream side in one servo pattern 60 by the servo reading element SR. The first distance refers to, for example, a distance calculated from a result obtained by reading the magnetization region 60A (see also FIG. 15) on the most downstream side in one servo pattern 60 among the servo patterns 60 adjacent to each other and the magnetization region 60A (see also FIG. 15) on the most downstream side in the other servo pattern 60 by the servo reading element SR.

It should be noted that, in the examples shown in FIGS. 14 to 16, an aspect example is shown the PES based on the servo pattern 60 of the servo band SB3 and the PES based on the servo pattern 60 of the servo band SB4 are calculated by the PES calculation unit 70. However, this is merely an example of a case in which the processing target data band is the data band DB1, and the PES based on the servo pattern 60 of the servo band SB1 (see FIG. 7) and the PES based on the servo pattern 60 of the servo band SB2 (see FIG. 7) are calculated by the PES calculation unit 70 in a case in which the processing target data band is the data band DB4 (see FIG. 7). In addition, in a case in which the processing target data band is the data band DB2 (see FIG. 7), the PES based on the servo pattern 60 of the servo band SB2 (see FIG. 7) and the PES based on the servo pattern 60 of the servo band SB3 (see FIG. 7) are calculated by the PES calculation unit 70. In addition, in a case in which the processing target data band is the data band DB3 (see FIG. 7), the PES based on the servo pattern 60 of the servo band SB4 (see FIG. 7) and the PES based on the servo pattern 60 of the servo band SB5 (see FIG. 7) are calculated by the PES calculation unit 70.

In a case in which the PES is calculated as described above, a servo pattern interval is calculated based on the PES. The servo pattern interval refers to an interval between the servo patterns 60 in the width direction WD (for example, an interval between the servo pattern 60 of the servo band SB3 and the servo pattern 60 of the servo band SB4). For example, by using the PES based on the servo pattern 60 of the servo band SB3 (that is, the second PES) and the PES based on the servo pattern 60 of the servo band SB4 (that is, the first PES), the servo pattern interval between the servo pattern 60 of the servo band SB3 and the servo pattern 60 of the servo band SB4 is calculated. In addition, by using the PES based on the servo pattern 60 of the servo band SB1 (that is, the second PES) and the PES based on the servo pattern 60 of the servo band SB2 (that is, the first PES), the servo pattern interval between the servo pattern 60 of the servo band SB1 and the servo pattern 60 of the servo band SB2 is calculated. In addition, by using the PES based on the servo pattern 60 of the servo band SB2 (that is, the second PES) and the PES based on the servo pattern 60 of the servo band SB3 (that is, the first PES), the servo pattern interval between the servo pattern 60 of the servo band SB2 and the servo pattern 60 of the servo band SB3 is calculated. In addition, by using the PES based on the servo pattern 60 of the servo band SB4 (that is, the second PES) and the PES based on the servo pattern 60 of the servo band SB5 (that is, the first PES), the servo pattern interval between the servo pattern 60 of the servo band SB4 and the servo pattern 60 of the servo band SB5 is calculated.

By the way, the magnetic tape MT is expanded and contracted in the width direction WD due to the pressure, temperature, humidity, deterioration with time, and the like of being wound around the cartridge reel 20. Therefore, in a case in which the magnetic tape MT is expanded in the width direction, the tension applied to the magnetic tape MT is increased, and in a case in which the magnetic tape MT is contracted in the width direction, the tension applied to the magnetic tape MT is reduced. As a result, the data magnetic element DRW can be positioned with respect to the processing target division data track among the plurality of division data tracks included in the data track DT.

The tension applied to the magnetic tape MT is determined in accordance with the servo pattern interval. That is, the width of the magnetic tape MT (hereinafter, also referred to as a "tape width") is estimated from the servo pattern interval, and predetermined tension is applied to the magnetic tape MT with respect to the estimated tape width to adjust the tape width.

The servo pattern interval is calculated in accordance with the information (for example, the first PES and the second PES) based on the reading results of the servo reading elements SR1 and SR2 for the servo pattern 60 as described above. In a case in which all the servo patterns 60 formed on the servo band SB have an ideal shape and are formed in uniform size and orientation, the tape width can be estimated with high accuracy from the servo pattern interval. However, as shown in FIG. 17 as an example, the actual servo pattern 60 is distorted as compared with the ideal servo pattern 60 (see FIG. 10). It is preferable that the servo pattern 60 be linearly recorded by a servo writer (not shown). However, as a matter of fact, the servo pattern 60 is not linearly recorded and is recorded in the servo band SB in a curved shape due to a manufacturing error of the servo writer (not shown), the misregistration of an installation portion of the servo writer, the variation in the strength of the magnetic field released from the servo writer, the dirt of the servo writer, the vibration applied to the magnetic tape MT during recording of the servo pattern 60, the expansion and contraction of the magnetic tape MT, the variation in the characteristics of a magnetic layer included in the servo band SB before the servo pattern 60 is recorded, and the like. It should be noted that, in the first and second examples of the servo pattern 60 shown in FIG. 17, for convenience of description, the distortion of the magnetization regions 60A and 60B is modeled in an easy-to-understand manner, and the distortion of the magnetization regions 60A and 60B is more emphasized than the actual distortion of the magnetization regions 60A and 60B.

Figure 18:
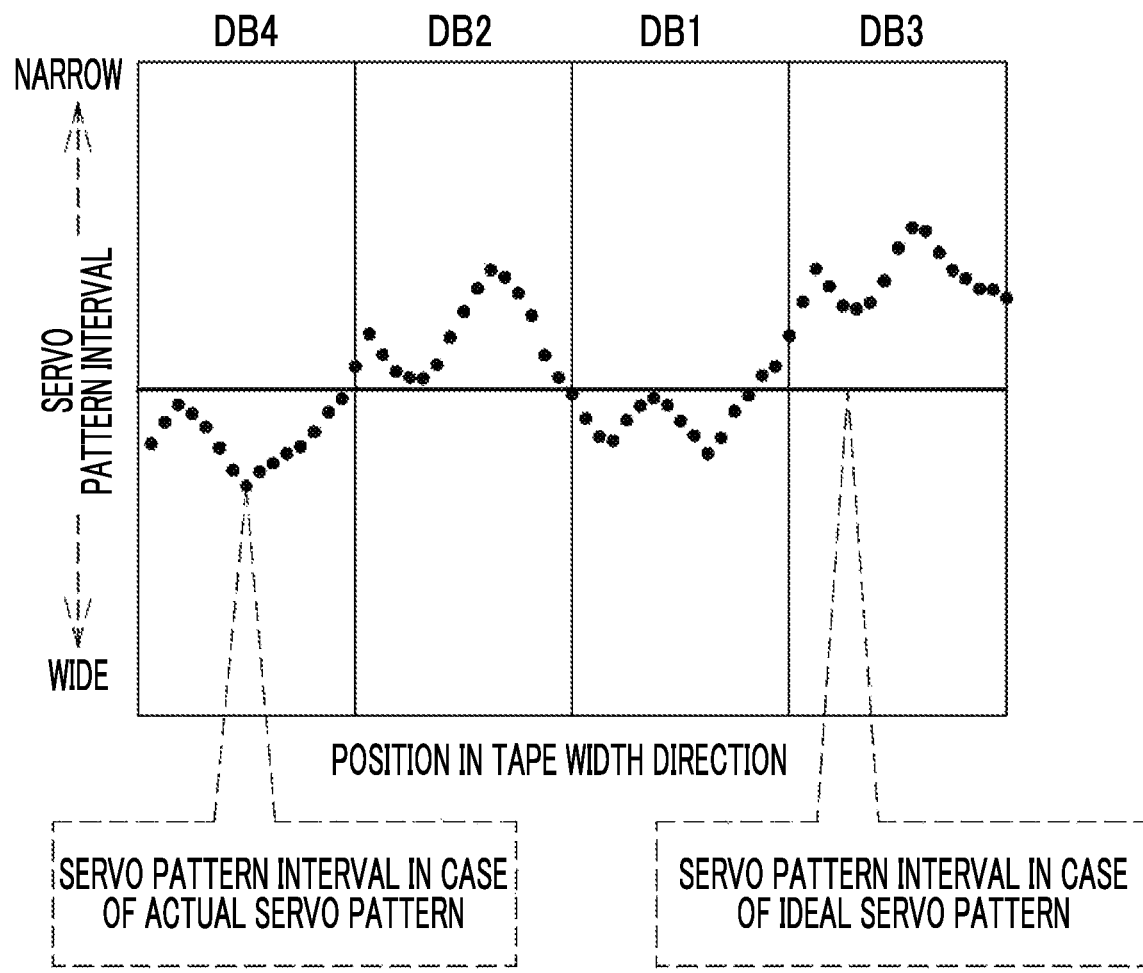
FIG. 18 is a conceptual diagram showing an example of a servo pattern interval obtained from a result of reading the ideal servo pattern, and an example of a servo pattern interval obtained from a result of reading the actual servo pattern.

As an example, as shown in FIG. 18, the servo pattern interval used in the tracking control in a case in which the magnetic processing is performed for each of the processing target division data tracks is always fixed regardless of the position of the processing target division data track for which the magnetic processing is performed, in a case in which the ideal servo pattern 60 is recorded in the servo band SB. However, as a matter of fact, the servo pattern 60 is not linearly recorded in the servo band SB. Therefore, due to the non-linearity of the servo pattern 60, the servo pattern interval used in the tracking control in a case in which the magnetic processing is performed on each of the processing target division data tracks varies between the positions of the processing target division data tracks for which the magnetic processing is performed.

Even under such circumstances, in order to accurately position the data magnetic element DRW with respect to the processing target division data track, a method can be considered in which the servo pattern interval used in the tracking control in a case in which the magnetic processing is performed on each division data track is stored in advance in a memory (for example, the storage 30 (see FIG. 3) or the NVM 50 (see FIG. 5) of the cartridge memory 22) for each division data track, and the tension applied to the magnetic tape MT is adjusted in accordance with the servo pattern interval stored in the memory. However, in a case in which the servo pattern interval is stored in the memory for each division data track, the storage capacity of the memory is compressed as the number of division data tracks in each data band is increased.

Figure 19:
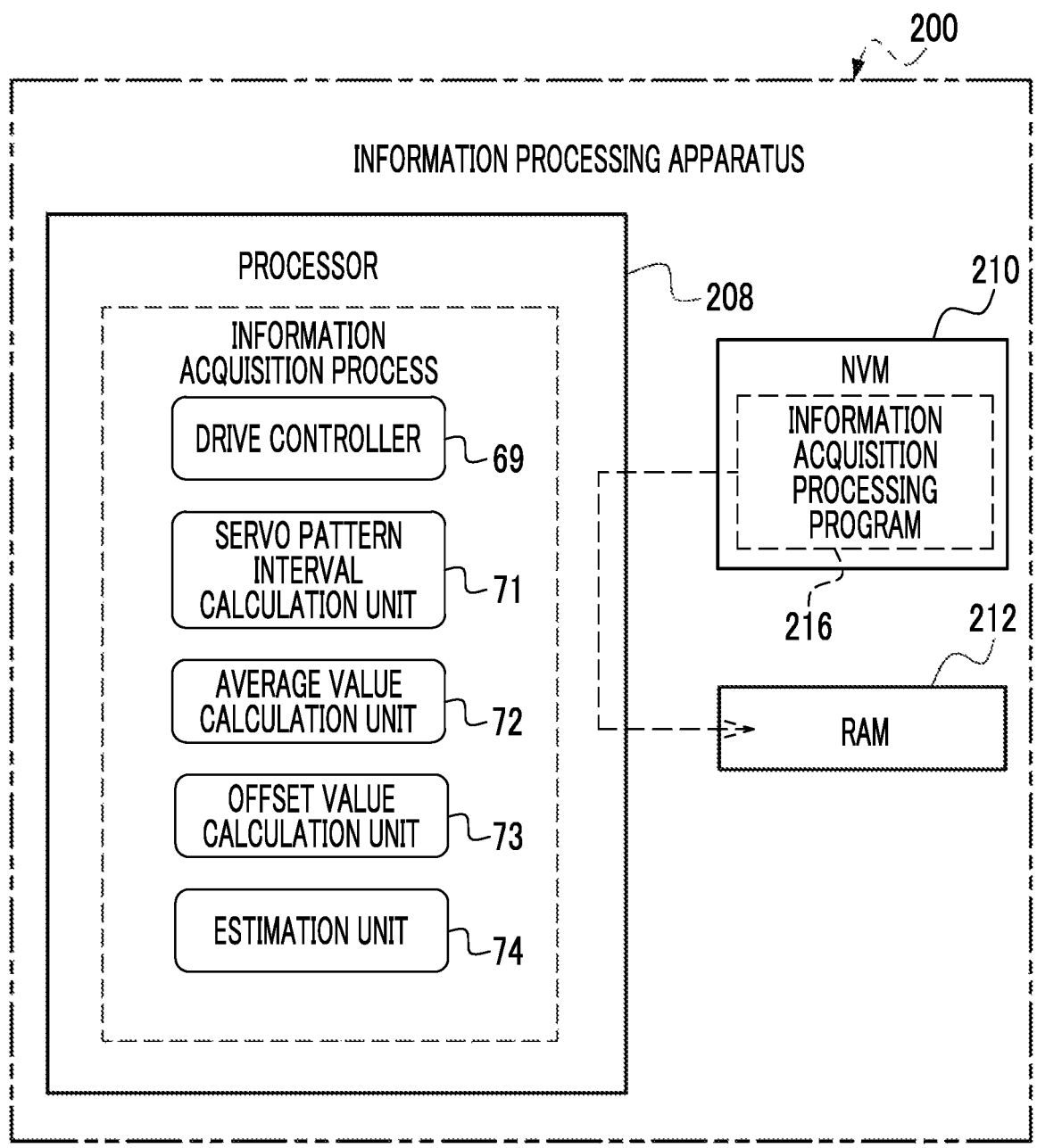
FIG. 19 is a block diagram showing an example of a main function of the information processing apparatus.

Therefore, in view of such circumstances, in the magnetic tape drive 10 according to the present embodiment, as shown in FIG. 19 as an example, an information acquisition process is executed by the processor 208 in accordance with an information acquisition processing program 216. In the NVM 210, the information acquisition processing program 216 is stored. The processor 208 reads out the information acquisition processing program 216 from the NVM 210, and executes the read out information acquisition processing program 216 on the RAM 212. The information acquisition process is realized by the processor 208 executing the information acquisition processing program 216 to be operated as a drive controller 69, a servo pattern interval calculation unit 71, an average value calculation unit 72, an offset value calculation unit 73, and an estimation unit 74.

Figure 20:
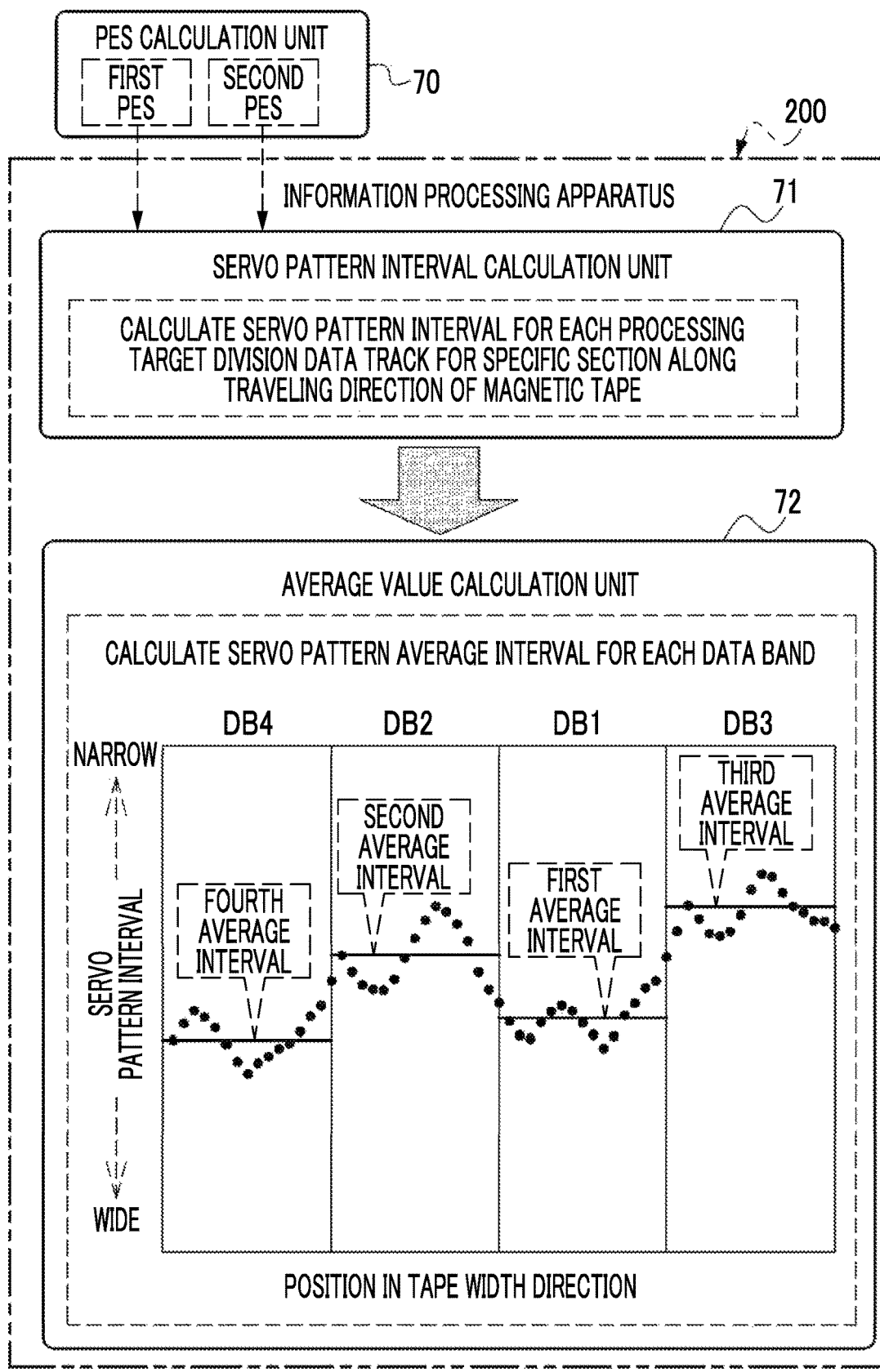
FIG. 20 is a conceptual diagram showing an example of processing contents of a servo pattern interval calculation unit and an average value calculation unit.

In the information acquisition process, first, in a stage before magnetic processing is performed on each of the processing target division data tracks (for example, a stage in which the magnetic tape cartridge 12 is adjusted to the product for shipment), the drive controller 69 controls the magnetic tape drive 10 to cause the magnetic tape MT to travel in one direction (for example, the forward direction or the backward direction) by the travel controller 64 at a fixed traveling speed in a state in which first tension is applied to the magnetic tape MT. Moreover, in this state, as shown in FIG. 20 as an example, the servo pattern interval calculation unit 71 acquires the first PES and the second PES from the PES calculation unit 70, and calculates the servo pattern interval by using the acquired first PES and the second PES. Here, the servo pattern interval used in the tracking control in a case in which the magnetic processing is performed on each of the processing target division data tracks is calculated for a specific section (hereinafter, also simply referred to as a "specific section") along the traveling direction of the magnetic tape MT, in a unit of the data band DB.

Here, the specific section refers to, for example, a part of sections the magnetic tape MT (that is, a part of sections along the traveling direction of the magnetic tape MT). Examples of a part of sections of the magnetic tape MT include a section included in the first half of the magnetic tape MT, a section included in the second half of the magnetic tape MT, a section included in the middle of the magnetic tape MT, and an intermittent section along the total length direction of the magnetic tape MT. The intermittent section refers to, for example, sections having an equal interval or sections having a non-equal interval. In addition, a time interval in which the servo pattern interval is calculated is, for example, a fixed time interval (for example, a sampling period determined in response to a clock frequency).

The average value calculation unit 72 calculates a statistical value of the calculation results by the servo pattern interval calculation unit 71. Here, the statistical value of the calculation results by the servo pattern interval calculation unit 71 refers to, for example, the average value. Here, the calculation result by the servo pattern interval calculation unit 71 is an example of a "result of measuring an interval between the first servo pattern and the second servo pattern for each division area in a case in which the magnetic tape to which first reference tension is applied is made to travel", a "results of measuring an interval between the first servo pattern and the second servo pattern in a part of sections of the division area along the traveling direction for each division area in a case in which the magnetic tape to which second reference tension is applied is made to travel", and a "result of measuring an interval between the first servo pattern and the second servo pattern for each division area in a case in which the magnetic tape to which third reference tension is applied is made to travel" according to the technology of the present disclosure.

The average value calculation unit 72 calculates a servo pattern average interval for each data band DB based on the calculation result by the servo pattern interval calculation unit 71 as the statistical value of the calculation results by the servo pattern interval calculation unit 71. The servo pattern average interval is an average value of the servo pattern intervals calculated by the servo pattern interval calculation unit 71 for each processing target division data track for the specific section. In addition, here, the servo pattern average interval is an example of an "average value of results of measuring the interval between the first servo pattern and the second servo pattern for each division area" according to the technology of the present disclosure.

The servo pattern average interval is an example of a representative interval between a first servo pattern, which is the servo pattern 60 in the first servo band (that is, one servo band SB) of the pair of the servo bands SB adjacent to each other via the data band DB, and a second servo pattern, which is the servo pattern 60 in the second servo band (that is, the other servo band SB) of the pair of the servo bands SB adjacent to each other via the data band DB.

In the example shown in FIG. 20, first to fourth average intervals are shown as examples of the servo pattern average interval calculated for each data band DB. The first average interval is an example of a representative interval between the servo pattern 60 in the servo band SB3 (see FIG. 7) and the servo pattern 60 in the servo band SB4 (see FIG. 7). The second average interval is an example of a representative interval between the servo pattern 60 in the servo band SB2 (see FIG. 7) and the servo pattern 60 in the servo band SB3 (see FIG. 7). The third average interval is an example of a representative interval between the servo pattern 60 in the servo band SB4 (see FIG. 7) and the servo pattern 60 in the servo band SB5 (see FIG. 7). The fourth average interval is an example of a representative interval between the servo pattern 60 in the servo band SB1 (see FIG. 7) and the servo pattern 60 in the servo band SB2 (see FIG. 7).

The average value calculation unit 72 calculates, as the first average interval, the servo pattern average interval which is the average value of the servo pattern intervals used in the tracking control in a case in which the magnetic processing is performed on each of the processing target division data tracks in the data band DB1 for the specific section. The first average interval is commonly used for the division data tracks included in the data band DB1, as the servo pattern interval used for adjusting the tape width in a case in which the magnetic processing is performed on each division data track included in the data band DB1 designated as the processing target data band.

The average value calculation unit 72 calculates, as the second average interval, the servo pattern average interval which is the average value of the servo pattern intervals used in the tracking control in a case in which the magnetic processing is performed on each of the processing target division data tracks in the data band DB2 for the specific section. The second average interval is commonly used for the division data tracks included in the data band DB2, as the servo pattern interval used for adjusting the tape width in a case in which the magnetic processing is performed on each division data track included in the data band DB2 designated as the processing target data band.

The average value calculation unit 72 calculates, as the third average interval, the servo pattern average interval which is the average value of the servo pattern intervals used in the tracking control in a case in which the magnetic processing is performed on each of the processing target division data tracks in the data band DB3 for the specific section. The third average interval is commonly used for the division data tracks included in the data band DB3, as the servo pattern interval used for adjusting the tape width in a case in which the magnetic processing is performed on each division data track included in the data band DB3 designated as the processing target data band.

The average value calculation unit 72 calculates, as the fourth average interval, the servo pattern average interval which is the average value of the servo pattern intervals used in the tracking control in a case in which the magnetic processing is performed on each of the processing target division data tracks in the data band DB4 for the specific section. The fourth average interval is commonly used for the division data tracks included in the data band DB4, as the servo pattern interval used for adjusting the tape width in a case in which the magnetic processing is performed on each division data track included in the data band DB4 designated as the processing target data band.

Figure 21:
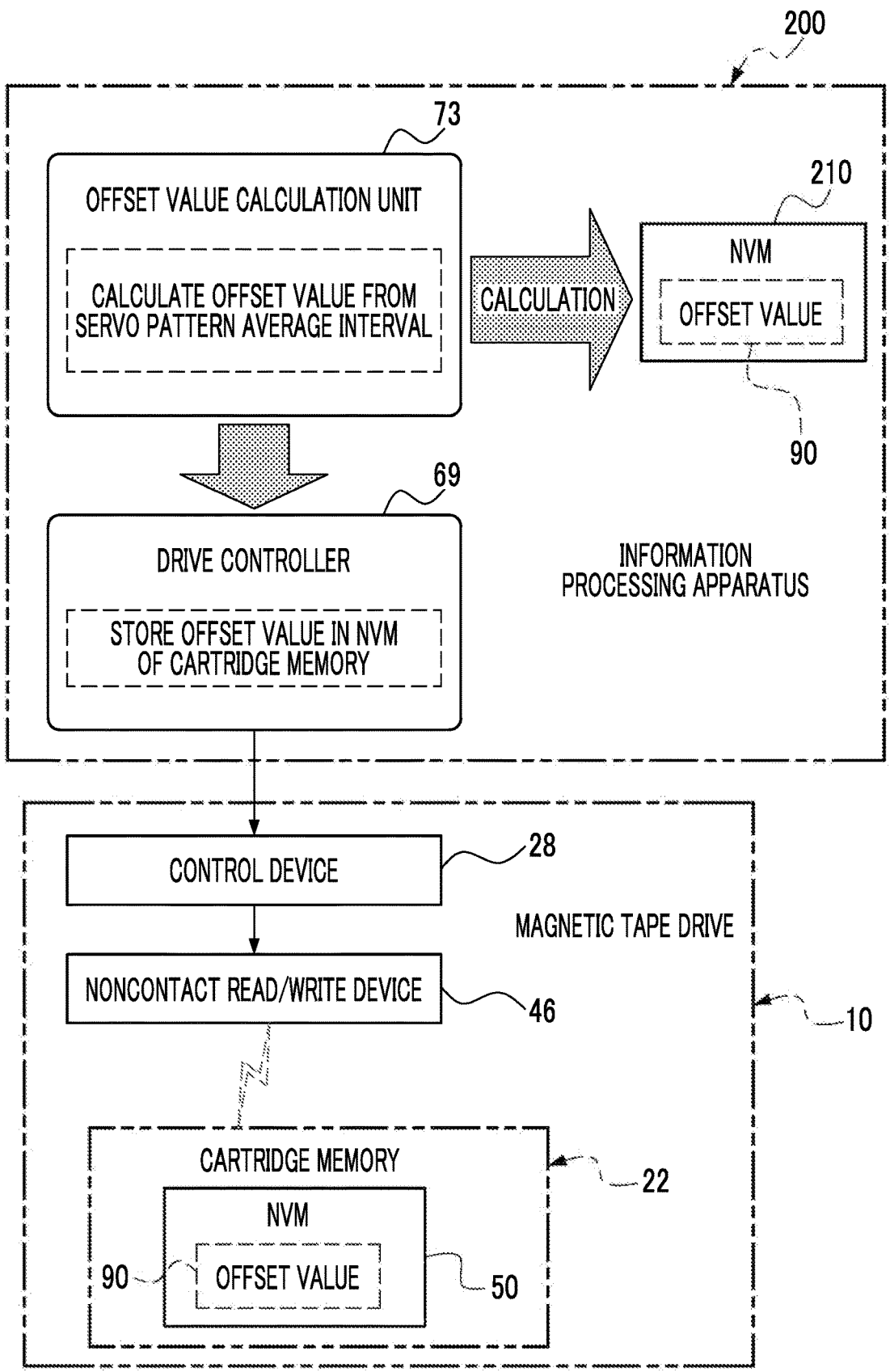
FIG. 21 is a conceptual diagram showing an example of processing contents of an offset value calculation unit and a drive controller.

As an example, as shown in FIG. 21, the offset value calculation unit 73 calculates an offset value 90 from the servo pattern average interval for each data band DB. That is, the offset value 90 is calculated for each data band DB. Here, the offset value 90 refers to a difference between the servo pattern average interval and a reference value. Examples of the reference value include a reference servo pattern interval calculated in advance by the servo pattern interval calculation unit 71 while the magnetic tape MT to which reference tension (for example, first tension and second tension described below, or designated tension different from the first tension and the second tension) is applied travels for the first time. The reference servo pattern interval refers to, for example, the servo pattern interval corresponding to one designated data band DB among the data bands DB1 to DB4. Therefore, in this case, the offset value 90 for the data band DB1 is a difference between the first average interval and the reference servo pattern interval. In addition, the offset value 90 for the data band DB2 is a difference between the second average interval and the reference servo pattern interval. In addition, the offset value 90 for the data band DB3 is a difference between the third average interval and the reference servo pattern interval. In addition, the offset value 90 for the data band DB4 is a difference between the fourth average interval and the reference servo pattern interval. The offset value 90 depends on the servo pattern average interval for each data band DB, and is used as information related to an offset average interval.

In addition, the present inventors have diligently examined the relationship between the range of variation of the position of the magnetic head 26 or the like on the surface 58 of the magnetic tape MT (for example, the position of the magnetic element unit 42 included in the magnetic head 26) and the preferable range of the offset value 90 by conducting tests or the like using an actual machine. As a result, the present inventors found that the range shown below is preferable as the range of values used as the offset value 90. That is, the offset value 90 is preferably a value in the range of from −500 nm (nanometers) to 500 nm, and more preferably a value in the range of from −300 nm to 300 nm.

The offset value calculation unit 73 stores the offset value 90 for each data band DB in the NVM 210. By controlling the magnetic tape drive 10, the drive controller 69 stores the offset value 90 in the cartridge memory 22 of the magnetic tape cartridge 12 loaded into the magnetic tape drive 10. In this case, for example, the drive controller 69 transmits the offset value 90 for each data band DB to the control device 28 of the magnetic tape drive 10. The control device 28 receives the offset value 90 for each data band DB and writes the offset value 90 to the NVM 50 of the cartridge memory 22 via the noncontact read/write device 46, thereby storing the offset value 90 for each data band DB in the NVM 50. It should be noted that, here, the difference between the first average interval and the reference servo pattern interval is described as the offset value 90 for the data band DB1, the difference between the second average interval and the reference servo pattern interval is described as the offset value 90 for the data band DB2, the difference between the third average interval and the reference servo pattern interval is described as the offset value 90 for the data band DB3, and the difference between the fourth average interval and the reference servo pattern interval is described as the offset value 90 for the data band DB4, but the offset value 90 stored in the memory (for example, the cartridge memory 22 and the NVM 210) is not limited thereto. For example, the offset value 90 stored in the memory, that is, the offset value 90 for each data band DB may be a difference calculated in the same manner as above by using a designated one average interval of the first to fourth average intervals as the reference value.

Figure 22:
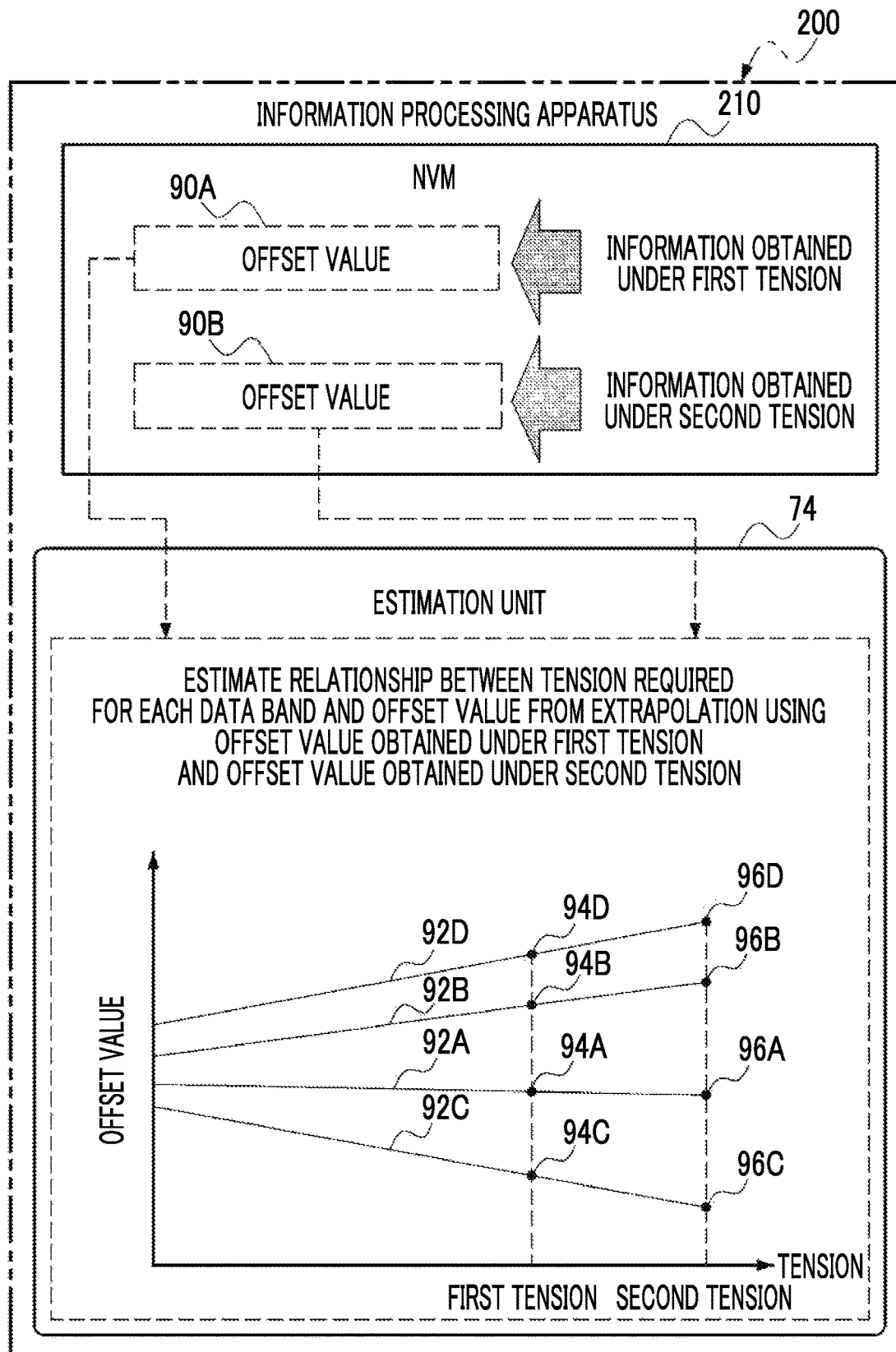
FIG. 22 is a conceptual diagram showing an example of a processing content of an estimation unit.

In the information acquisition process, next, in a stage before magnetic processing is performed on each of the processing target division data tracks, the drive controller 69 (see FIG. 19) controls the magnetic tape drive 10 to cause the magnetic tape MT to travel in one direction (for example, the forward direction or the backward direction) at a fixed traveling speed in a state in which second tension, which is different from the first tension, is applied to the magnetic tape MT. Moreover, in this state, the drive controller 69 controls the magnetic tape drive 10 and causes the PES calculation unit 70 to perform the same process as the process described above (that is, the process of calculating the first PES and the second PES), and the average value calculation unit 72, the offset value calculation unit 73, and the drive controller 69 perform the same process as the process described above (that is, processes shown in FIGS. 20 and 21). As a result, as shown in FIG. 22 as an example, in the storage 30, in addition to an offset value 90A which is the information obtained under the first tension, an offset value 90B which is the information obtained under the second tension is stored for each data band DB.

It should be noted that the first tension is an example of a "first reference tension", a "second reference tension", a "third reference tension", and a "fourth reference tension" according to the technology of the present disclosure, and the second tension is an example of a "first reference tension", a "second reference tension", a "third reference tension", and a "fifth reference tension" according to the technology of the present disclosure. In addition, the offset values 90A and 90B are examples of "servo pattern interval-related information" according to the technology of the present disclosure.

The estimation unit 74 estimates a relationship between the tension required in a case in which the magnetic processing is performed on each of the data bands DB1 to DB4, and the offset value 90, from the regression analysis using the offset value 90A obtained under the first tension and the offset value 90B obtained under the second tension. That is, the estimation unit 74 generates first to fourth approximate straight lines 92A to 92D indicating the correlation between the tension applied to the magnetic tape MT in a case in which the magnetic processing is performed, and the offset value 90, from the interpolation and the extrapolation using the offset value 90A and the offset value 90B. The first to fourth approximate straight lines 92A to 92D generated by the estimation unit 74 are the results of the regression analysis using the offset values 90A and 90B. In the following, for convenience of description, in a case in which the distinction is not needed, the first to fourth approximate straight lines 92A to 92D are referred to as an "approximate straight line 92".

Each of the first to fourth approximate straight lines 92A to 92D is obtained from the interpolation and the extrapolation using a first value 94 and a second value 96. The first value 94 is classified into first values 94A to 94D, and the second value 96 is classified into second values 96A to 96D.

The first value 94 is an example of a "value corresponding to a statistical value of results of measuring the interval between the first servo pattern and the second servo pattern for each division area in a case in which the magnetic tape to which the fourth reference tension is applied is made to travel", and a "value corresponding to an average value of results of measuring the interval between the first servo pattern and the second servo pattern for each division area in a case in which the magnetic tape to which the fourth reference tension is applied is made to travel" according to the technology of the present disclosure. The second value 96 is an example of a "value corresponding to a statistical value of results of measuring the interval between the first servo pattern and the second servo pattern for each division area in a case in which the magnetic tape to which the fifth reference tension is applied is made to travel", and a "value corresponding to an average value of results of measuring the interval between the first servo pattern and the second servo pattern for each division area in a case in which the magnetic tape to which the fifth reference tension is applied is made to travel" according to the technology of the present disclosure.

Each of the first values 94A to 94D is a value based on the result of measuring the servo pattern interval for each processing target division data track for the specific section in a case in which the magnetic tape MT to which the first tension is applied is made to travel, in a stage before the magnetic processing is performed on each processing target division data track. That is, the first value 94A is a value corresponding to the offset value 90A obtained for the data band DB1 under the first tension (for example, a value indicating the correlation between the offset value 90A and the first tension), the first value 94B is a value corresponding to the offset value 90A obtained for the data band DB2 under the first tension, the first value 94C is a value corresponding to the offset value 90A obtained for the data band DB3 under the first tension, and the first value 94D is a value corresponding to the offset value 90A obtained for the data band DB4 under the first tension.

Each of the second values 96A to 96D is a value based on the result of measuring the servo pattern interval for each processing target division data track for the specific section in a state in which the magnetic tape MT to which the second tension is applied is made to travel, in a stage before the magnetic processing is performed on each processing target division data track. That is, the second value 96A is a value corresponding to the offset value 90B obtained for the data band DB1 under the second tension (for example, a value indicating the correlation between the offset value 90B and the second tension), the second value 96B is a value corresponding to the offset value 90B obtained for the data band DB2 under the second tension, the second value 96C is a value corresponding to the offset value 90B obtained for the data band DB3 under the second tension, and the second value 96D is a value corresponding to the offset value 90B obtained for the data band DB4 under the second tension.

The first approximate straight line 92A is obtained from the interpolation and the extrapolation using the first value 94A and the second value 96A. The first approximate straight line 92A is an approximate straight line indicating the correlation between the tension applied to the magnetic tape MT in a case in which the magnetic processing is performed on the data band DB1, and the offset value 90, that is, an approximate straight line corresponding to the data band DB1, and is used in a case in which the data band DB1 is designated as the processing target data band.

The second approximate straight line 92B is obtained from the interpolation and the extrapolation using the first value 94B and the second value 96B. The second approximate straight line 92B is an approximate straight line indicating the correlation between the tension applied to the magnetic tape MT in a case in which the magnetic processing is performed on the data band DB2, and the offset value 90, that is, an approximate straight line corresponding to the data band DB2, and is used in a case in which the data band DB2 is designated as the processing target data band.

The third approximate straight line 92C is obtained from the interpolation and the extrapolation using the first value 94C and the second value 96C. The third approximate straight line 92C is an approximate straight line indicating the correlation between the tension applied to the magnetic tape MT in a case in which the magnetic processing is performed on the data band DB3, and the offset value 90, that is, an approximate straight line corresponding to the data band DB3, and is used in a case in which the data band DB3 is designated as the processing target data band.

The fourth approximate straight line 92D is obtained from the interpolation and the extrapolation using the first value 94D and the second value 96D. The fourth approximate straight line 92D is an approximate straight line indicating the correlation between the tension applied to the magnetic tape MT in a case in which the magnetic processing is performed on the data band DB4, and the offset value 90, that is, an approximate straight line corresponding to the data band DB4, and is used in a case in which the data band DB4 is designated as the processing target data band.

Figure 23:
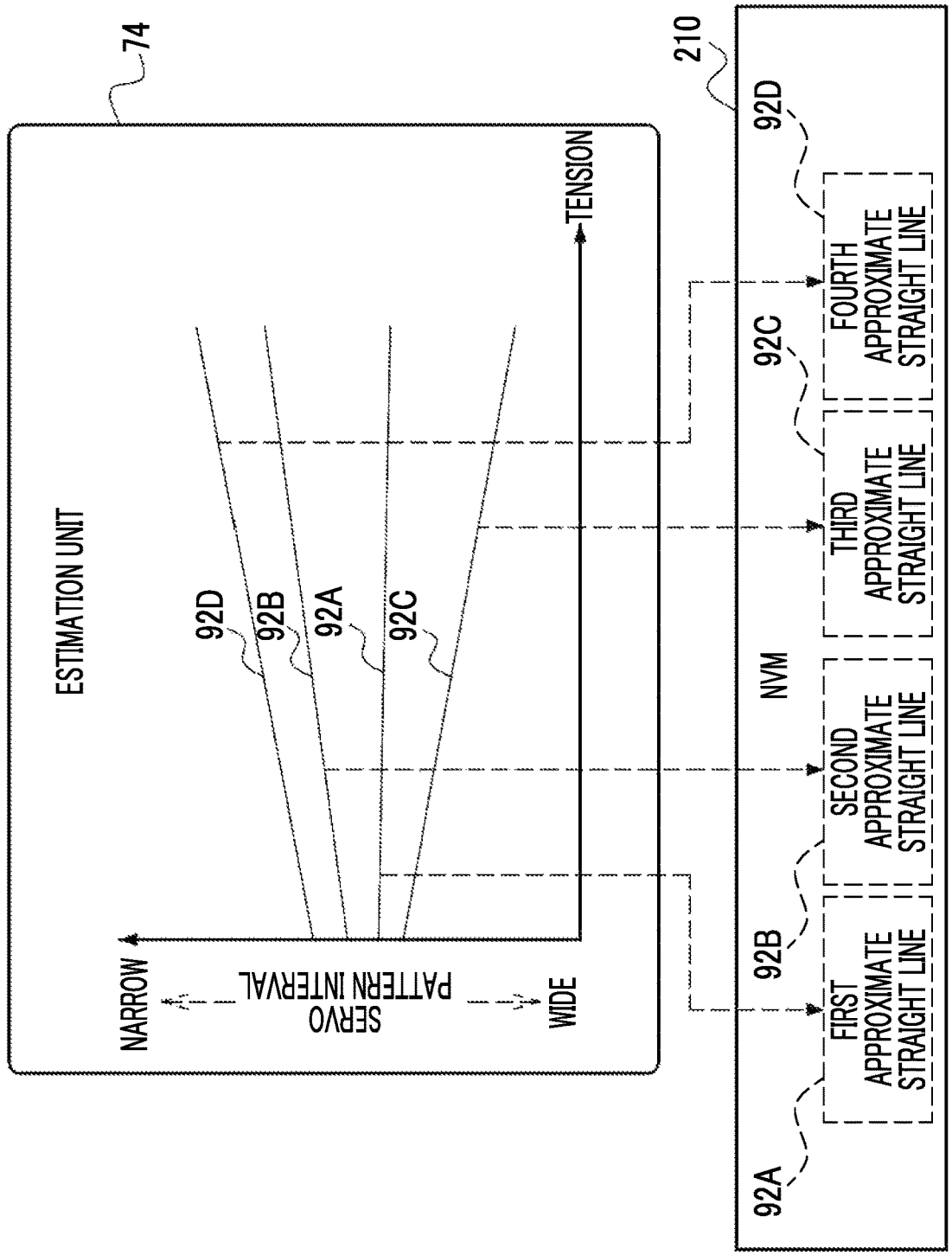
FIG. 23 is a conceptual diagram showing an example of first to fourth approximate straight lines.
Figure 24:
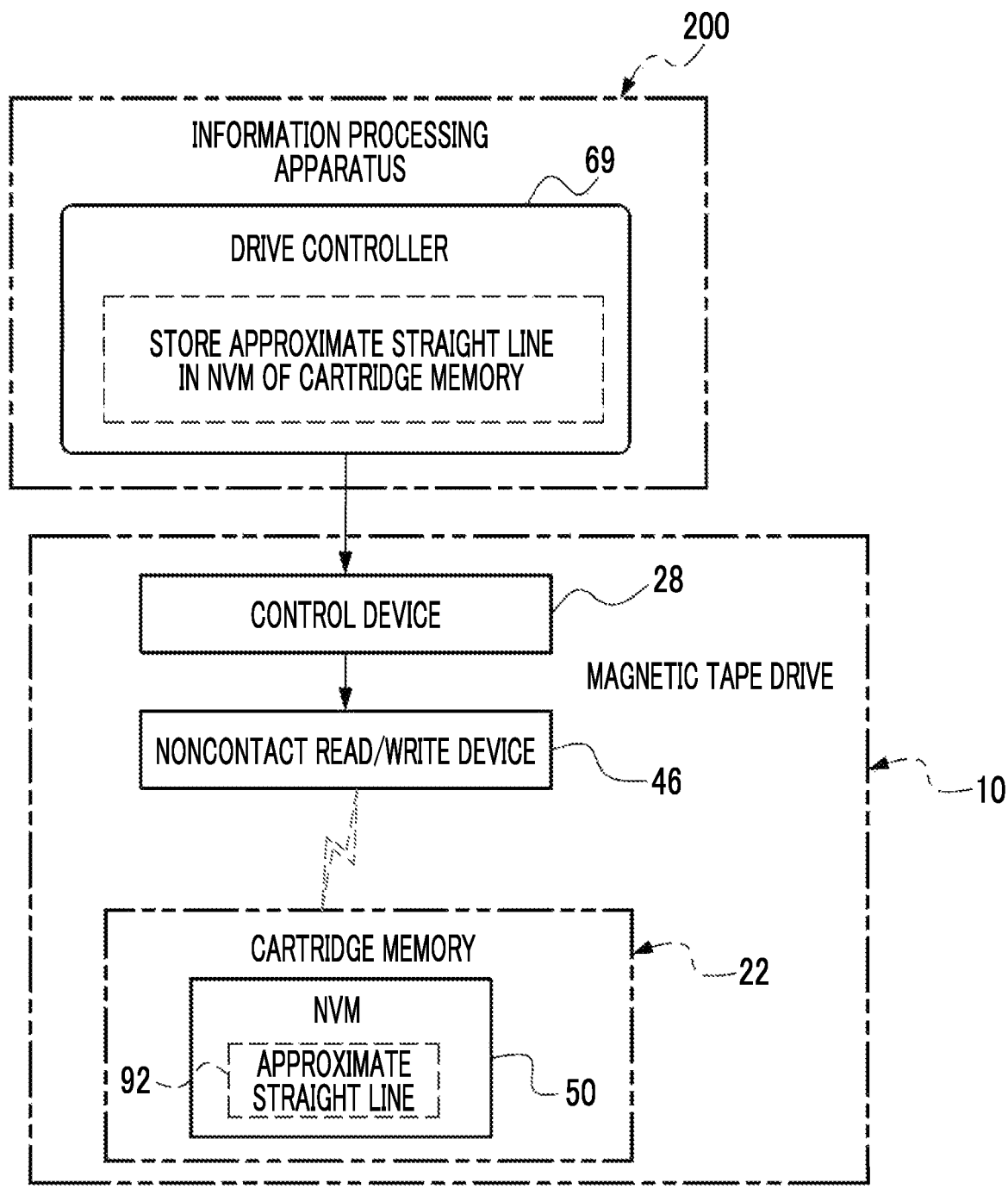
FIG. 24 is a conceptual diagram showing an example of an aspect in which the approximate straight line is stored in the cartridge memory.

As an example, as shown in FIG. 23, the estimation unit 74 stores the generated first to fourth approximate straight lines 92A to 92D in the NVM 210. In addition, as shown in FIG. 24 as an example, by controlling the magnetic tape drive 10, the drive controller 69 stores the first to fourth approximate straight lines 92A to 92D in the cartridge memory 22 of the magnetic tape cartridge 12 loaded into the magnetic tape drive 10. In this case, for example, the drive controller 69 transmits the first to fourth approximate straight lines 92A to 92D to the control device 28 of the magnetic tape drive 10. The control device 28 receives the first to fourth approximate straight lines 92A to 92D and writes the first to fourth approximate straight lines 92A to 92D to the NVM 50 of the cartridge memory 22 via the noncontact read/write device 46, thereby storing the first to fourth approximate straight lines 92A to 92D in the NVM 50.

Figure 25:
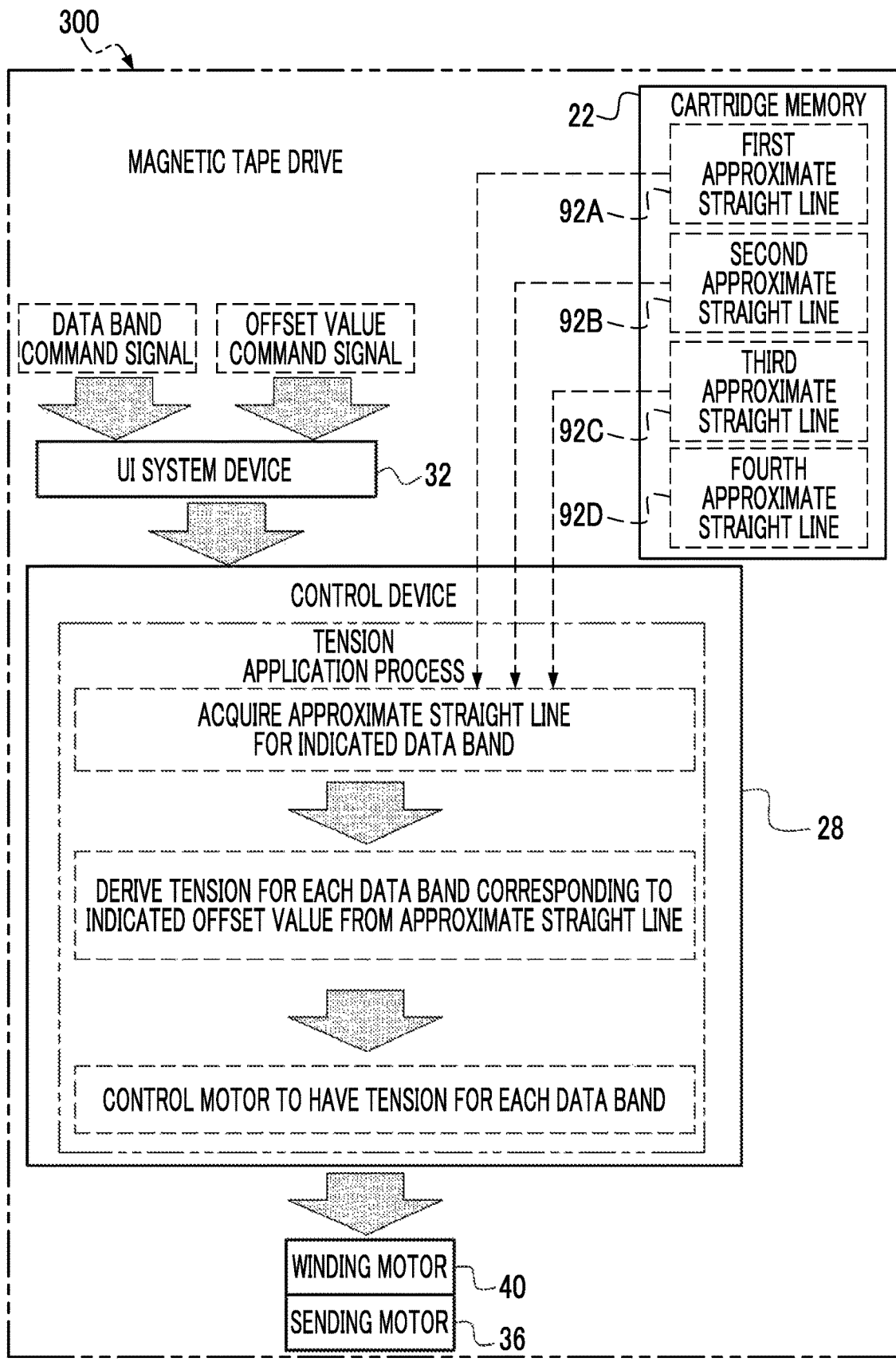
FIG. 25 is a conceptual diagram showing an example of the processing content of the control device.

The magnetic tape cartridge 12 in which the first to fourth approximate straight lines 92A to 92D are stored in the cartridge memory 22 as described above is loaded into the magnetic tape drive 300 and used. As an example, as shown in FIG. 25, in the magnetic tape drive 300, a tension application process is executed by the control device 28. In this case, in the magnetic tape drive 300, the UI system device 32 receives a data band command signal and an offset value command signal. The data band command signal is a signal indicating the processing target data band, and the offset value command signal is a signal indicating the offset value 90 (for example, the offset value 90 determined for the processing target data band indicated by the data band command signal).

In the magnetic tape drive 300, the control device 28 derives the tension for each data band in accordance with the offset value 90 determined for each data band DB for each of the data bands DB1 to DB4.

In this case, first, the control device 28 acquires the approximate straight line 92 corresponding to the processing target data band indicated by the data band command signal received by the UI system device 32 from the cartridge memory 22. For example, in a case in which the processing target data band indicated by the data band command signal is the data band DB1, the control device 28 acquires the first approximate straight line 92A from the cartridge memory 22. In addition, for example, in a case in which the processing target data band indicated by the data band command signal is the data band DB2, the control device 28 acquires the second approximate straight line 92B from the cartridge memory 22. In addition, for example, in a case in which the processing target data band indicated by the data band command signal is the data band DB3, the control device 28 acquires the third approximate straight line 92C from the cartridge memory 22. In addition, for example, in a case in which the processing target data band indicated by the data band command signal is the data band DB4, the control device 28 acquires the fourth approximate straight line 92D from the cartridge memory 22.

Next, the control device 28 derives the tension for each data band, which is the tension corresponding to the offset value 90 indicated by the offset value command signal received by the UI system device 32, from the approximate straight line 92 acquired from the cartridge memory 22.

In a case in which the magnetic processing is performed on the processing target data band indicated by the data band command signal received by the UI system device 32 (that is, in a case in which the magnetic processing is performed on the processing target division data track included in the processing target data band), the control device 28 (for example, the travel controller 64) causes the tension application mechanism (here, as an example, the sending motor 36 and the winding motor 40) to apply the tension for each data band derived from the approximate straight line 92 to the magnetic tape MT. That is, even in a case in which the magnetic processing is performed on any division data track included in the processing target data band indicated by the data band command signal received by the UI system device 32, the control device 28 controls the sending motor 36 and the winding motor 40 such that the tension applied to the magnetic tape MT is the tension for each data band derived from the approximate straight line 92. As a result, even in a case in which the magnetic processing is performed on any division data track included in the processing target data band indicated by the data band command signal received by the UI system device 32, the derived tension for each data band is applied to the magnetic tape MT by the control device 28 as the common tension. It should be noted that, here, a form example has been described in which the tension for each data band is derived from the approximate straight line 92 by the control device 28, but this is merely an example. For example, the tension for each data band may be derived by the offset value 90 (see FIG. 21) itself stored in the cartridge memory 22 in a unit of the data band DB, or by correcting the reference tension described above by an adjusted value of the offset value 90 (for example, a value obtained from a result of the regression analysis using the offset value 90 obtained under the first tension and the offset value 90 obtained under the second tension).

Next, an action of a part of the information processing system 2 according to the technology of the present disclosure will be described with reference to FIGS. 26 and 27.

First, with reference to FIG. 26, an example of a flow of the information acquisition process performed by the processor 208 of the information processing apparatus 200 will be described. It should be noted that the flow of the information acquisition process shown in FIG. 26 is an example of an "information acquisition method" according to the technology of the present disclosure.

Figure 26:
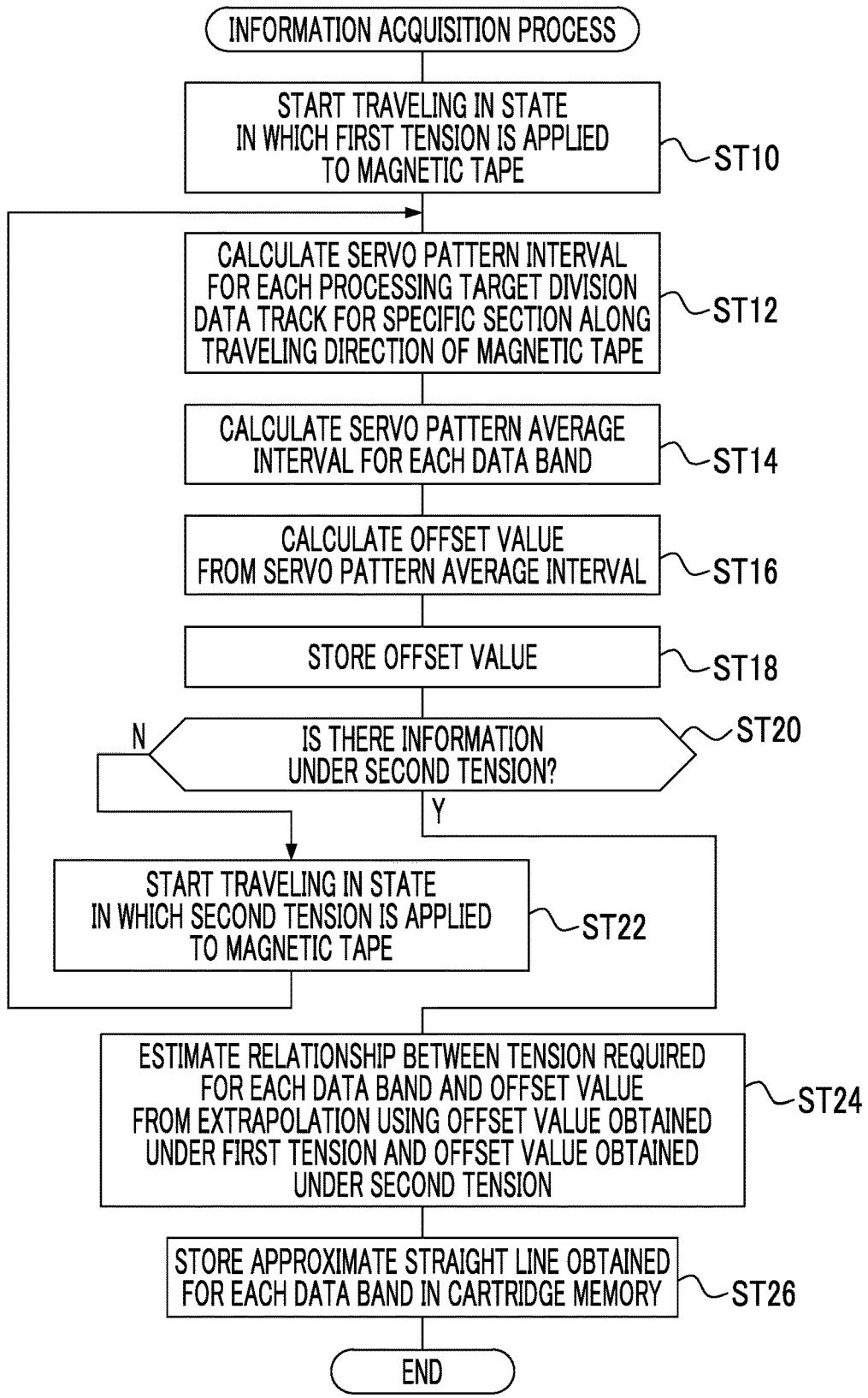
FIG. 26 is a flowchart showing an example of a flow of an information acquisition process.

In the information acquisition process shown in FIG. 26, first, in step ST10, the drive controller 69 controls the sending motor 36 and the winding motor 40 (see FIGS. 3 and 13) to start traveling of the magnetic tape MT along one direction (for example, the forward direction or the backward direction) of the magnetic tape MT at a fixed traveling speed in a state in which the first tension is applied to the magnetic tape MT. After the process of step ST10 is executed, the information acquisition process proceeds to step ST12.

In step ST12, the servo pattern interval calculation unit 71 calculates the servo pattern interval for each processing target division data track in each data track DT included in the data band DB for the specific section along the traveling direction of the magnetic tape MT by using the first PES and the second PES calculated by the PES calculation unit 70 of the magnetic tape drive 10, in a unit of the data band DB (see FIG. 20). After the process of step ST12 is executed, the information acquisition process proceeds to step ST14.

In step ST14, the average value calculation unit 72 calculates the servo pattern average interval for each data band DB from the calculation result in step ST12 (that is, the servo pattern interval for each processing target division data track in each data track DT included in the data band DB) (see FIG. 20). After the process of step ST14 is executed, the information acquisition process proceeds to step ST16.

In step ST16, the offset value calculation unit 73 calculates the offset value 90 for each data band DB from the servo pattern average interval calculated for each data band DB in step ST14 (see FIG. 21). After the process of step ST16 is executed, the information acquisition process proceeds to step ST18.

In step ST18, the offset value calculation unit 73 stores the offset value 90 for each data band DB in the NVM 210, and the drive controller 69 stores the offset value 90 for each data band DB in the cartridge memory 22 of the magnetic tape cartridge 12 loaded into the magnetic tape drive 10 (see FIG. 21). After the process of step ST18 is executed, the information acquisition process proceeds to step ST20.

In step ST20, the drive controller 69 determines whether or not the offset value 90 obtained under the second tension is stored in the NVM 210 and the cartridge memory 22. In step ST20, in a case in which the offset value 90 obtained under the second tension is not stored in the NVM 210 and the cartridge memory 22, a negative determination is made, and the information acquisition process proceeds to step ST22. In step ST20, in a case in which the offset value 90 obtained under the second tension is stored in the NVM 210 and the cartridge memory 22, a positive determination is made, and the information acquisition process proceeds to step ST24. The drive controller 69 controls the sending motor 36 and the winding motor 40 (see FIGS. 3 and 13) to start traveling of the magnetic tape MT along one direction (for example, the forward direction or the backward direction) of the magnetic tape MT at a fixed traveling speed in a state in which the first tension is applied to the magnetic tape MT.

In step ST22, the drive controller 69 controls the sending motor 36 and the winding motor 40 (see FIGS. 3 and 13) to start traveling of the magnetic tape MT along one direction (for example, the forward direction or the backward direction) of the magnetic tape MT at a fixed traveling speed in a state in which the second tension is applied to the magnetic tape MT. After the process of step ST22 is executed, the information acquisition process proceeds to step ST12.

In step ST24, the estimation unit 74 estimates the approximate straight line 92 indicating the relationship between the tension required for each data band DB (that is, the tension applied to the magnetic tape MT in a case in which the magnetic processing is performed on the data band DB), and the offset value 90 for each data band DB from the interpolation and the extrapolation using the offset values 90A and 90B (see FIG. 22). That is, in step ST24, the first to fourth approximate straight lines 92A to 92D (that is, the first to fourth approximate straight lines 92A to 92D indicating the correlation between the tension applied to the magnetic tape MT in a case in which the magnetic processing is performed, and the offset value 90) are estimated by the estimation unit 74. After the process of step ST24 is executed, the information acquisition process proceeds to step ST26.

In step ST26, the estimation unit 74 stores the approximate straight line 92 estimated for each data band DB in step ST24 in the NVM 210 (see FIG. 23), and the drive controller 69 stores the offset value 90 for each data band DB in the cartridge memory 22 of the magnetic tape cartridge 12 loaded into the magnetic tape drive 10 (see FIG. 24). After the process of step ST26 is executed, the information acquisition process ends.

Next, an example of a flow of the tension application process performed by the control device 28 of the magnetic tape drive 300 will be described with reference to FIG. 27.

Figure 27:
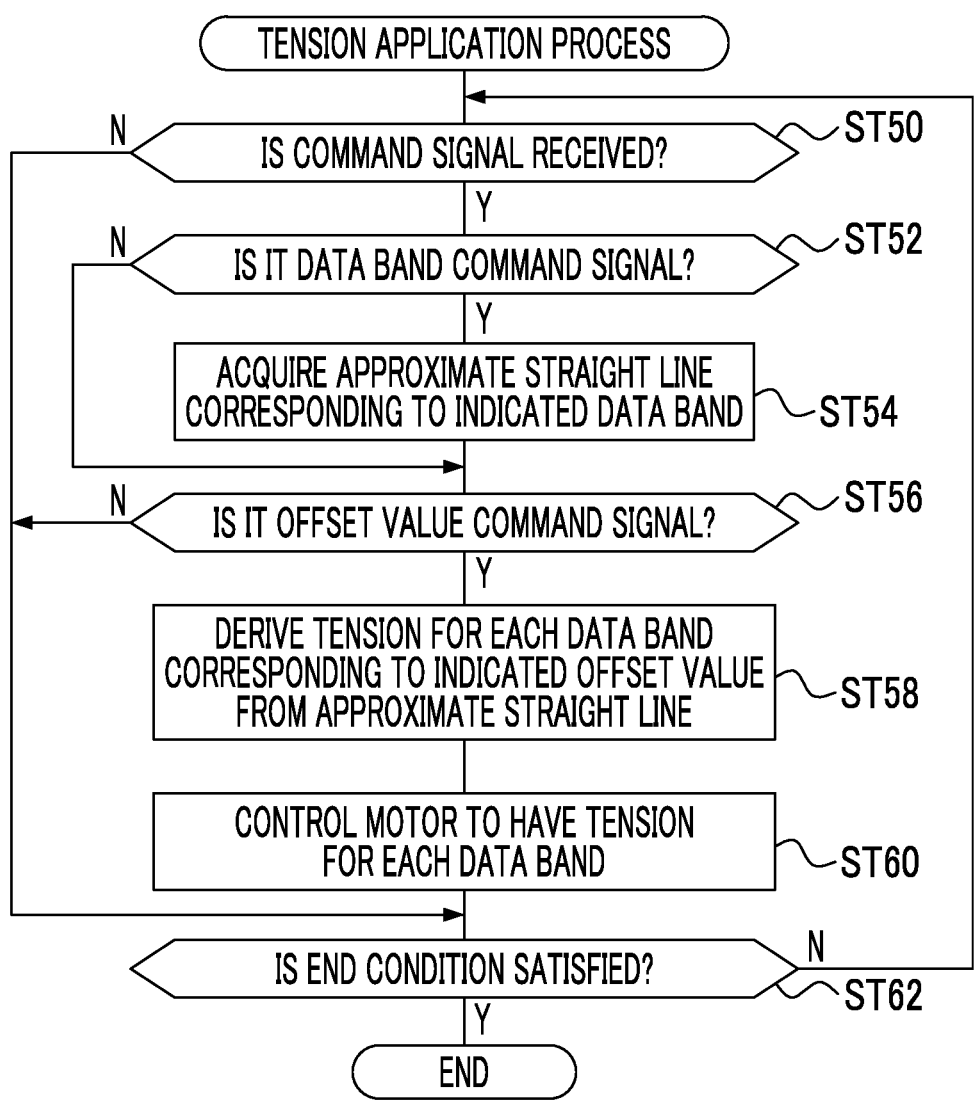
FIG. 27 is a flowchart showing an example of a flow of a tension application process.

In the tension application process shown in FIG. 27, first, in step ST50, the control device 28 determines whether or not the command signal is received by the UI system device 32. In step ST50, in a case in which the command signal is not received by the UI system device 32, a negative determination is made, and the tension application process proceeds to step ST62. In step ST50, in a case in which the command signal is received by the UI system device 32, a positive determination is made, and the tension application process proceeds to step ST52.

In step ST52, the control device 28 determines whether or not the command signal received by the UI system device 32 is the data band command signal. In step ST52, in a case in which the command signal received by the UI system device 32 is not the data band command signal, a negative determination is made, and the tension application process proceeds to step ST56. In step ST52, in a case in which the command signal received by the UI system device 32 is the data band command signal, a positive determination is made, and the tension application process proceeds to step ST54.

In step ST54, the control device 28 acquires the approximate straight line 92 corresponding to the data band DB indicated by the data band command signal received by the UI system device 32 from the cartridge memory 22 (see FIG. 25). After the process of step ST54 is executed, the tension application process proceeds to step ST56.

In step ST56, the control device 28 determines whether or not the command signal received by the UI system device 32 is the offset value command signal. In step ST56, in a case in which the command signal received by the UI system device 32 is not the offset value command signal, a negative determination is made, and the tension application process proceeds to step ST62. In step ST56, in a case in which the command signal received by the UI system device 32 is the offset value command signal, a positive determination is made, and the tension application process proceeds to step ST58.

In step ST58, the control device 28 derives the tension for each data band corresponding to the offset value 90 indicated by the offset value command signal received by the UI system device 32 from the approximate straight line acquired in step ST54 (see FIG. 25). After the process of step ST58 is executed, the tension application process proceeds to step ST60.

In step ST60, the travel controller 64 controls the sending motor 36 and the winding motor 40 such that the tension applied to the magnetic tape MT is the tension for each data band derived in step ST34 (see FIG. 25). After the process of step ST60 is executed, the tension application process proceeds to step ST62.

By executing the process of step ST60, the tension for each data band is applied to the magnetic tape MT. In a case in which the travel controller 64 causes the magnetic tape MT to travel in the forward direction in a state in which the tension for each data band is applied to the magnetic tape MT, the second recording controller 80 causes the second data recording element DW2 to record the second recording data in the processing target division data track, and the reading controller 82 causes the data reading element DR to read the data from the processing target division data track. In addition, in a case in which the travel controller 64 causes the magnetic tape MT to travel in the backward direction in a state in which the tension for each data band is applied to the magnetic tape MT, the first recording controller 78 causes the first data recording element DW1 to record the first recording data in the processing target division data track, and the reading controller 82 causes the data reading element DR to read the data from the processing target division data track.

In step ST62, the control device 28 determines whether or not a condition for ending the tension application process (hereinafter, referred to as an "end condition") is satisfied. Examples of the end condition include a condition that a command for ending the tension application process is given to the magnetic tape drive 300 from the outside via the UI system device 32 or the communication I/F 34. In step ST62, in a case in which the end condition is not satisfied, a negative determination is made, and the tension application process proceeds to step ST50. In step ST62, in a case in which the end condition is satisfied, a positive determination is made, and the tension application process ends.

As described above, in the information processing system 2 according to the present embodiment, the first to fourth approximate straight lines 92A to 92D are stored in the cartridge memory 22 of the magnetic tape cartridge 12 (see FIG. 24). In the magnetic tape drive 300 into which the magnetic tape cartridge 12 is loaded, the first to fourth approximate straight lines 92A to 92D stored in the cartridge memory 22 are used for deriving the tension for each data band. That is, by using the first to fourth approximate straight lines 92A to 92D, the tension for each data band in accordance with the information (here, as an example, the offset value 90) based on the servo pattern interval (for example, the servo pattern interval indicated by a servo pattern interval command signal) determined for each data band DB is derived for each of the plurality of data bands DB of the magnetic tape MT. Specifically, the tension for each data band is derived from the approximate straight line 92 indicating the correlation between the tension applied to the magnetic tape MT in a case in which the magnetic processing is performed on the data band DB, and the offset value 90 (see FIG. 25). Moreover, in a case in which the magnetic processing is performed on the processing target data band (for example, the data band DB indicated by the data band command signal) among the plurality of data bands DB, the derived tension for each data band is applied to the magnetic tape MT. In a case in which the tension for each data band is applied to the magnetic tape MT, the tape width is adjusted.

Here, in a case in which the tension is applied to the magnetic tape MT in accordance with the servo pattern 60 on the premise that the servo pattern 60 (see FIG. 10) having ideal geometric characteristics is recorded in the magnetic tape MT, the accuracy of positioning the magnetic element unit 42 with respect to the data band DB (for example, the accuracy of positioning the magnetic element unit 42 with respect to the division data track included in the data band DB) is reduced. This is because the actual servo pattern 60 (see FIG. 17) is distorted as compared with the ideal servo pattern 60 (see FIG. 10), and the shape varies between the servo patterns 60.

As a method of individually obtaining the tension applied to the magnetic tape MT each time the magnetic processing is performed on each division data track included in the data band DB, a method can be considered in which the servo pattern interval used in a case of determining the tension applied to the magnetic tape MT is stored in the memory (for example, the cartridge memory 22) for each division data track, the servo pattern interval corresponding to the division data track for which the magnetic processing is performed is acquired from the memory each time the magnetic processing is performed on the division data track, and the tension applied to the magnetic tape MT is obtained by using the acquired servo pattern interval. However, this method compresses the storage capacity of the memory.

Therefore, in the present embodiment, the servo pattern interval used in a case of determining the tension applied to the magnetic tape MT is commonly used for all the division data tracks in the data band DB, and the representative interval between the servo pattern 60 in one servo band SB of the pair of the servo bands SB adjacent to each other via the data band DB, and the servo pattern 60 in the other servo band SB is used. Moreover, the tension for each data band is derived from the first to fourth approximate straight lines 92A to 92D including the offset value 90, which is information related to the representative interval, and the derived tension for each data band is applied to the magnetic tape MT.

Therefore, with the present configuration, as compared with a case in which the magnetic element unit 42 (see FIGS. 7 and 11) is positioned with respect to the data band DB by applying the tension to the magnetic tape MT in accordance with the servo pattern 60 on the premise that the servo pattern 60 (see FIG. 10) having ideal geometric characteristics is recorded in the magnetic tape MT, even in a case in which the servo pattern 60 varies, it is possible to accurately position the magnetic element unit 42 with respect to the data band DB (position the magnetic element unit 42 with respect to the division data track included in the data band DB). In addition, with the present configuration, as compared with a method in which the servo pattern interval used in a case of determining the tension applied to the magnetic tape MT is stored in the memory (for example, the storage 30) for each division data track, the servo pattern interval corresponding to the division data track for which the magnetic processing is performed is acquired from the memory each time the magnetic processing is performed on the division data track, and the tension applied to the magnetic tape MT is obtained by using the acquired servo pattern interval, it is possible to reduce a degree of compression with respect to the storage capacity of the memory.

In addition, in the information processing system 2 according to the present embodiment, a value (for example, the average value) obtained by statistically obtaining the results of measuring the servo pattern interval for each division data track included in the data band DB, in a case in which the magnetic tape MT to which fixed tension (for example, the first tension or the second tension) is applied is made to travel in the stage before the magnetic processing is performed on the data band DB is the servo pattern interval used in a case of determining the tension applied to the magnetic tape MT. Therefore, with the present configuration, a data amount used for deriving the tension for each data band can be reduced as compared with a case in which an actual measurement value itself obtained by measuring the servo pattern interval for each division data track is used.

In addition, in the information processing system 2 according to the present embodiment, in the stage before the magnetic processing is performed on the data band DB, in a case in which the magnetic tape MT to which fixed tension (for example, the first tension or the second tension) is applied is made to travel, a value obtained by statistically obtaining the results of measuring the servo pattern interval for a part of sections of the magnetic tape MT along the traveling direction for each division data track included in the data band DB is the servo pattern interval used in a case of determining the tension applied to the magnetic tape MT. Therefore, with the present configuration, the data amount used for deriving the tension for each data band can be reduced as compared with a case in which the servo pattern interval is measured in all sections of the magnetic tape MT along the traveling direction.

In addition, in the information processing system 2 according to the present embodiment, the magnetic tape cartridge 12 is used by being loaded into the magnetic tape drive 300. In addition, in the magnetic tape drive 300, in a case in which the magnetic processing is performed for each data band DB, the sending motor 36 and the winding motor 40 are controlled by the travel controller 64, so that the tension for each data band in accordance with the servo pattern interval is applied to the magnetic tape MT. In the cartridge memory 22 of the magnetic tape cartridge 12, in the stage before the magnetic processing is performed for each data band DB (that is, the stage before the tension for each data band is applied to the magnetic tape MT), the approximate straight line 92 corresponding to the tension for each data band is stored in advance (see FIG. 24). The approximate straight line 92 is the information derived from the result of the regression analysis using the first value 94 based on the result of measuring the servo pattern interval for each division data track included in the data band DB in a case in which the magnetic tape MT to which the first tension is applied is made to travel in the stage before the magnetic processing is performed on the data band DB, and the second value 96 based on the result of measuring the servo pattern interval for each division data track included in the data band DB in a case in which the magnetic tape MT to which the second tension is applied is made to travel in the stage before the magnetic processing is performed on the data band DB. Therefore, with the present configuration, by measuring the servo pattern interval in a state in which the magnetic tape MT to which the tension other than the first tension and the second tension is applied is made to actually travel, it is possible to obtain, as the tension applied to the magnetic tape MT, the tension for each data band corresponding to the designated servo pattern interval from the approximate straight line 92 without associating the tension other than the first tension and the second tension with the servo pattern interval in advance. It should be noted that, in the present embodiment, the form example has been described in which the tension for each data band obtained from the approximate straight line 92 is applied to the magnetic tape MT by the magnetic tape drive 300, but this is merely an example, and the tension for each data band obtained from the approximate straight line 92 may be applied to the magnetic tape MT by the magnetic tape drive (for example, the magnetic tape drive 10) other than the magnetic tape drive 300.

In addition, in the information processing system 2 according to the present embodiment, the first value 94 is a value corresponding to the value (for example, the average value) obtained by statistically obtaining the results of measuring the servo pattern interval for each division data track included in the data band DB, in a case in which the magnetic tape MT to which the first tension is applied is made to travel in the stage before the magnetic processing is performed on the data band DB, and the second value 96 is a value corresponding to the value (for example, the average value) obtained by statistically obtaining the results of measuring the servo pattern interval for each division data track included in the data band DB, in a case in which the magnetic tape MT to which the second tension is applied is made to travel in the stage before the magnetic processing is performed on the data band DB. Therefore, with the present configuration, the data amount used for deriving the tension for each data band can be reduced as compared with a case in which the tension for each data band is derived by using the result of actually measuring the servo pattern interval for each division data track included in the data band DB (that is, the actual measurement value itself).

Further, in the information processing system 2 according to the present embodiment, in a state in which the tension for each data band is applied to the magnetic tape MT, while the magnetic tape MT travels in one direction, the magnetic element unit 42 records the first recording data or the second recording data in the processing target division data track as the magnetic processing, and the magnetic element unit 42 reads the data from the processing target division data track as the magnetic processing. Therefore, with the present configuration, as a compared with a case in which the first recording data or the second recording data is recorded in the processing target division data track and the data is read from the processing target division data track in a state in which the tension is applied to the magnetic tape MT in accordance with the servo pattern 60 on the premise that the servo pattern 60 (see FIG. 10) having ideal geometric characteristics is recorded in the magnetic tape MT, even in a case in which the geometric characteristic varies between the plurality of servo patterns 60 in the servo band SB, it is possible to accurately perform recording of the first recording data or the second recording data in the processing target division data track and reading of the data from the processing target division data track.

Further, in the information processing system 2 according to the present embodiment, the offset value 90 is used as information related to a representative interval between the servo pattern 60 in one servo band SB of the pair of servo band SB adjacent to each other via the data band DB and the servo pattern 60 in the other servo band SB. The offset value 90 is defined for each data band DB, and is the difference between the servo pattern average interval calculated for each data band DB and the reference value. Then, the tension for each data band is derived from the first to fourth approximate straight lines 92A to 92D including the offset value 90, and the derived tension for each data band is applied to the magnetic tape MT. Therefore, even if the servo pattern 60 varies, if the offset value 90 is stored in the memory (for example, the cartridge memory 22) in advance, by using the offset value 90 stored in the memory, the positioning of the magnetic element unit 42 with respect to the data band DB (for example, positioning of the magnetic element unit 42 with respect to the divided data track included in the data band DB) can be performed with high accuracy. In addition, the degree of pressure on the storage capacity of the memory can be reduced as compared with a case in which the servo pattern interval used to obtain the tension applied to the magnetic tape MT is stored in the memory for each divided data track.

The offset value 90 is preferably a value in the range of from −500 nm to 500 nm, and more preferably a value in the range of from −300 nm to 300 nm. These ranges correspond to the range of variation in the position of the data magnetic element DRW on the surface 58 of the magnetic tape MT. Therefore, even if the position of the magnetic head 26 or the like (for example, the magnetic element unit 42 included in the magnetic head 26) on the surface 58 of the magnetic tape MT varies in each of the data band DB, by using a value within the range of from −500 nm to 500 nm as the offset value 90, the positioning of the magnetic element unit 42 with respect to the band DB (for example, positioning of the magnetic element unit 42 with respect to the divided data track included in the data band DB) can be performed with high accuracy. Further, by using a value within the range of from −300 nm to 300 nm as the offset value 90, the positioning of the magnetic element unit 42 with respect to the data band DB can be performed more accurately.

It should be noted that, in the embodiment described above, the form example has been described in which the first data recording element group DWG1, the second data recording element group DWG2, and the data reading element group DRG are mounted on the magnetic head 26, but the technology of the present disclosure is not limited to this, and any one or two of the first data recording element group DWG1, the second data recording element group DWG2, or the data reading element group DRG may be mounted on the magnetic head 26.

In addition, in the embodiment described above, the form example has been described in which recording of the data by the first data recording element group DWG1 and reading of the data by the data reading element group DRG are performed in parallel and recording of the data by the second data recording element group DWG2 and reading of the data by the data reading element group DRG are performed in parallel, but the technology of the present disclosure is not limited to this, and recording of the data by the first data recording element group DWG1, recording of the data by the second data recording element group DWG2, or reading of the data by the data reading element group DRG may be performed.

In addition, in the embodiment described above, a part of sections of the magnetic tape MT along the traveling direction of the magnetic tape MT is described as the specific section, but the technology of the present disclosure is not limited to this. For example, the specific section may be all sections of the magnetic tape MT along the traveling direction of the magnetic tape MT. In this case, as a compared with a case in which the servo pattern interval is measured for a part of sections along the traveling direction of the magnetic tape MT, it is possible to accurately derive the tension for each data band used for adjusting the tape width in a case in which the magnetic processing is performed for all sections of the processing target division data track.

In addition, in the embodiment described above, the form example has been described in which the approximate straight line 92 is estimated from the interpolation and the extrapolation using the information under the first tension (that is, the offset value 90A) and the information under the second tension (that is, the offset value 90B), but the technology of the present disclosure is not limited to this.

For example, the approximate straight line may be generated only from the interpolation or the extrapolation. In addition, for example, the approximate straight line may be generated from the regression analysis using three or more servo pattern average intervals obtained under three or more different types of tension (for example, the regression analysis using the least squares method).

In addition, in the embodiment described above, the form example has been described in which the approximate straight line 92 is generated and stored in the storage 30, but the technology of the present disclosure is not limited to this. For example, instead of the approximate straight line 92, the offset value 90 obtained under a plurality of types of tension (the first tension and the second tension in the embodiment described above) may be stored in the cartridge memory 22 for each corresponding tension. In this case, for example, the control device 28 need only derive the tension corresponding to the offset value 90 indicated by the offset value command signal received by the UI system device 32 by performing the regression analysis (for example, linear interpolation, non-linear interpolation, and/or extrapolation) using the offset value 90 stored in the cartridge memory 22 for each tension. In addition, for example, the tension corresponding to the offset value 90 may be derived by the control device 28 only in a case in which the offset value 90 indicated by the offset value command signal received by the UI system device 32 is stored in the cartridge memory 22.

In the embodiment described above, the form example has been described in which the servo pattern average interval is calculated for each data band DB based on the calculation result by the servo pattern interval calculation unit 71 as the statistical value of the calculation result by the servo pattern interval calculation unit 71, but the technology of the present disclosure is not limited to this. For example, as the statistical value of the calculation results by the servo pattern interval calculation unit 71, a servo pattern median value interval or a servo pattern mode value interval may be calculated for each data band DB based on the calculation result by the servo pattern interval calculation unit 71, and the statistical value of the calculation results by the servo pattern interval calculation unit 71 need only be calculated as the representative value of the servo pattern interval. Here, the servo pattern median value interval refers to, for example, a median value of the servo pattern interval calculated by the servo pattern interval calculation unit 71 for each processing target division data track for the specific section. In addition, the servo pattern mode value interval refers to, for example, a mode value of the servo pattern interval calculated by the servo pattern interval calculation unit 71 for each processing target division data track for the specific section.

In addition, in the embodiment described above, the form example has been described in which the control device 28 derives the tension for each data band by using the approximate straight line 92 as it is, but the technology of the present disclosure is not limited to this. For example, the approximate straight line 92 may be corrected and used. For example, the approximate straight line 92 may be corrected based on a physical characteristic of the magnetic tape MT, use frequency of the magnetic tape MT, a temperature of an environment in which the magnetic tape drive 10 is installed, humidity of the environment in which the magnetic tape drive 10 is installed, and/or the specification of the magnetic tape drive 10, and the corrected approximate straight line 92 may be used by the control device 28. The correction of the approximate straight line 92 is realized by multiplying a correction coefficient determined in accordance with the physical characteristic of the magnetic tape MT, the use frequency of the magnetic tape MT, the temperature of the environment in which the magnetic tape drive 10 is installed, the humidity of the environment in which the magnetic tape drive 10 is installed, and/or the specification of the magnetic tape drive 10 by the approximate straight line 92.

In addition, in the embodiment described above, the form example has been described in which the offset value 90 is stored in the cartridge memory 22 in addition to the NVM 210 (see FIG. 21), but the technology of the present disclosure is not limited to this, for example, the offset value 90 need only be stored in the cartridge memory 22 or the NVM 210, and the offset value 90 need only be stored any memory such that the offset value 90 can be used for generating the approximate straight line 92.

In addition, in the embodiment described above, the form example has been described in which both the offset value 90 and the approximate straight line 92 for each data band DB are stored in the cartridge memory 22, but any one of the offset value 90 or the approximate straight line 92 may be stored in the cartridge memory 22. That is, in a case in which the approximate straight line 92 is stored in the cartridge memory 22 as shown in FIG. 24, the offset value 90 may not be stored in the cartridge memory 22, and in a case in which the approximate straight line 92 is not stored in the cartridge memory 22, the offset value 90 calculated for each of the plurality of types of tension and for each data band DB need only be stored in the cartridge memory 22.

In addition, in the embodiment described above, the form example has been described in which the offset value 90 and the approximate straight line 92 for each data band DB are stored in the cartridge memory 22, but the technology of the present disclosure is not limited to this. For example, at least one of the offset value 90 or the approximate straight line 92 for each data band DB may be recorded in a BOT region (not shown) provided at the beginning of the magnetic tape MT and/or in an EOT region (not shown) provided at the end of the magnetic tape MT.

It should be noted that the BOT region and the EOT region are merely examples, and for example, a two-dimensional bar code or a matrix-type two-dimensional code (for example, a QR code (registered trademark)) may be used as a storage medium in which at least one of the offset value 90 or the approximate straight line 92 for each data band DB is stored.

In addition, in the embodiment described above, the offset value 90 is calculated from the servo pattern average interval, but this is merely an example, the offset value 90 may not be calculated, and the servo pattern average interval (for example, the first average interval, the second average interval, the third average interval, and the fourth average interval) may be applied instead of the offset value 90 or together with the offset value 90. In addition, the average value is merely an example, and the statistical value, such as a mode value or a median value, may be used.

In addition, in the embodiment described above, the offset value 90A is described as an example of the information obtained under the first tension, and the offset value 90B is described as an example of the information obtained under the second tension, but the technology of the present disclosure is not limited thereto. For example, as shown in FIG. 28, servo pattern average interval information 90A1 (that is, information indicating the first average interval, information indicating the second average interval, information indicating the third average interval, and information indicating the fourth average interval) may be applied as the information obtained under the first tension, and servo pattern average interval information 90B1 (that is, information indicating the first average interval, information indicating the second average interval, information indicating the third average interval, and information indicating the fourth average interval) may be applied as the information obtained under the second tension.

In this case, first to fourth approximate straight lines 93A to 93D indicating the correlation between the tension applied to the magnetic tape MT in a case in which the magnetic processing is performed, and the servo pattern interval are generated from at least one of the interpolation or the extrapolation using the servo pattern average interval information 90A1 and the servo pattern average interval information 90B1. The first to fourth approximate straight lines 93A to 93D generated by the estimation unit 74 are the results of the regression analysis using the servo pattern average interval information 90A1 and the servo pattern average interval information 90B1. In the following, for convenience of description, in a case in which the distinction is not needed, the first to fourth approximate straight lines 93A to 93D are referred to as an "approximate straight line 93".

Figure 28:
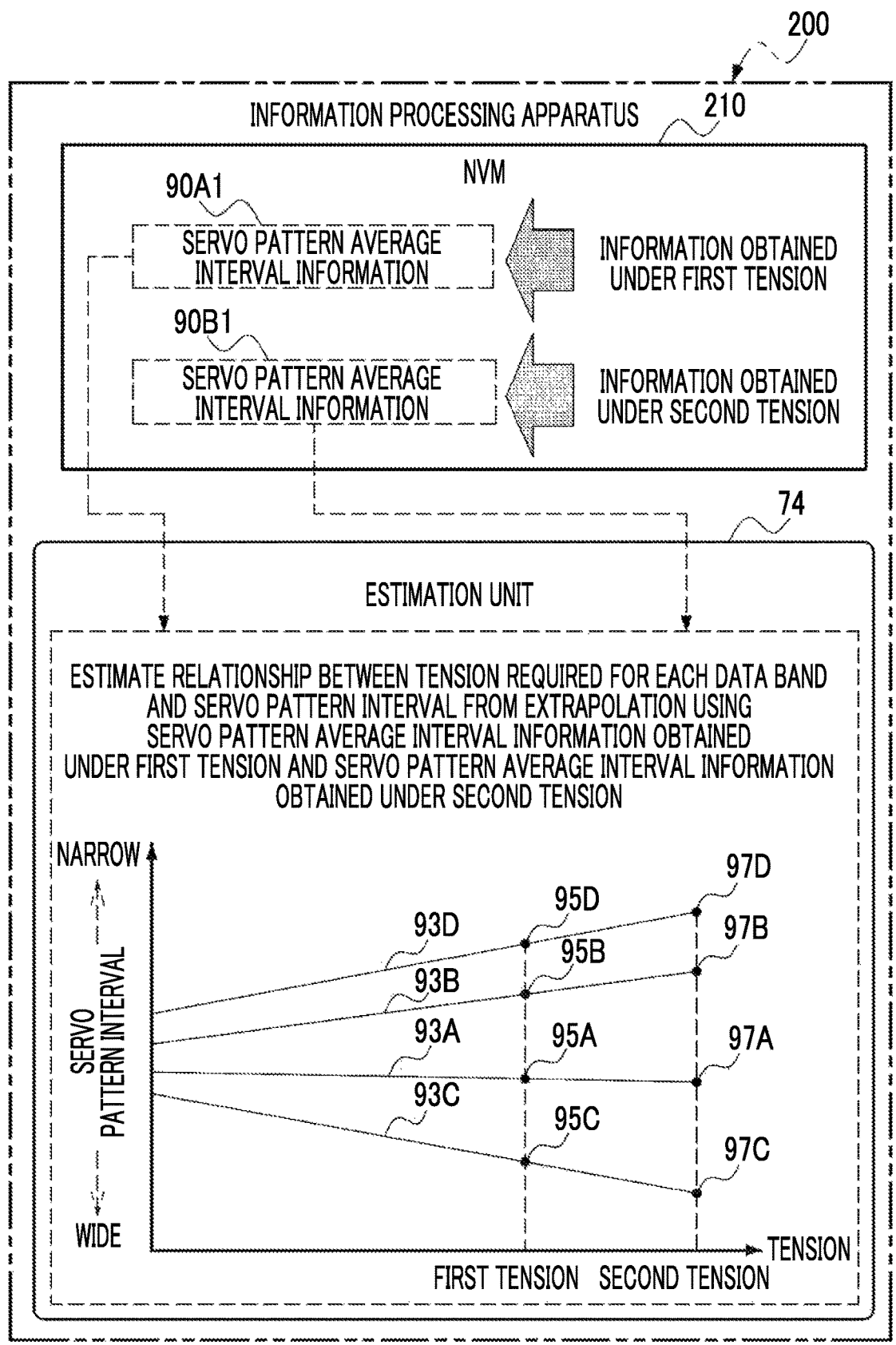
FIG. 28 is a conceptual diagram showing a modification example of the approximate straight line.

In the example shown in FIG. 28, each of the first to fourth approximate straight lines 93A to 93D is obtained from interpolation and the extrapolation using a first value 95 and a second value 97. The first value 95 is classified into first values 95A to 95D, and the second value 97 is classified into second values 97A to 97D.

The first value 95 is an example of a "first value", a "value corresponding to a statistical value of results of measuring the interval between the first servo pattern and the second servo pattern for each division area in a case in which the magnetic tape to which the fourth reference tension is applied is made to travel", and a "value corresponding to an average value of results of measuring the interval between the first servo pattern and the second servo pattern for each division area in a case in which the magnetic tape to which the fourth reference tension is applied is made to travel" according to the technology of the present disclosure. The second value 97 is an example of a "second value", a "value corresponding to a statistical value of results of measuring the interval between the first servo pattern and the second servo pattern for each division area in a case in which the magnetic tape to which the fifth reference tension is applied is made to travel", and a "value corresponding to an average value of results of measuring the interval between the first servo pattern and the second servo pattern for each division area in a case in which the magnetic tape to which the fifth reference tension is applied is made to travel" according to the technology of the present disclosure.

The first value 95A is a value corresponding to the first average interval obtained under the first tension (for example, a value indicating the correlation between the first average interval and the first tension). The first value 95B is a value corresponding to the second average interval obtained under the first tension (for example, a value indicating the correlation between the second average interval and the first tension). The first value 95C is a value corresponding to the third average interval obtained under the first tension (for example, a value indicating the correlation between the third average interval and the first tension). The first value 95D is a value corresponding to the fourth average interval obtained under the first tension (for example, a value indicating the correlation between the fourth average interval and the first tension). As described above, each of the first values 95A to 95D is a value based on the result of measuring the servo pattern interval for each processing target division data track for the specific section in a case in which the magnetic tape MT to which the first tension is applied is made to travel, in a stage before the magnetic processing is performed on each processing target division data track.

The second value 97A is a value corresponding to the first average interval obtained under the second tension (for example, a value indicating the correlation between the first average interval and the second tension). The second value 97B is a value corresponding to the second average interval obtained under the second tension (for example, a value indicating the correlation between the second average interval and the second tension). The second value 97C is a value corresponding to the third average interval obtained under the second tension (for example, a value indicating the correlation between the third average interval and the second tension). The second value 97D is a value corresponding to the fourth average interval obtained under the second tension (for example, a value indicating the correlation between the fourth average interval and the second tension). As described above, each of the second values 97A to 97D is a value based on the result of measuring the servo pattern interval for each processing target division data track for the specific section in a state in which the magnetic tape MT to which the second tension is applied is made to travel, in a stage before the magnetic processing is performed on each processing target division data track.

The first approximate straight line 93A is obtained from the interpolation and the extrapolation using the first value 95A and the second value 97A. The first approximate straight line 93A is an approximate straight line indicating the correlation between the tension applied to the magnetic tape MT in a case in which the magnetic processing is performed on the data band DB1, and the servo pattern interval, that is, an approximate straight line corresponding to the data band DB1, and is used in a case in which the data band DB1 is designated as the processing target data band.

The second approximate straight line 93B is obtained from the interpolation and the extrapolation using the first value 95B and the second value 97B. The second approximate straight line 93B is an approximate straight line indicating the correlation between the tension applied to the magnetic tape MT in a case in which the magnetic processing is performed on the data band DB2, and the servo pattern interval, that is, an approximate straight line corresponding to the data band DB2, and is used in a case in which the data band DB2 is designated as the processing target data band.

The third approximate straight line 93C is obtained from the interpolation and the extrapolation using the first value 95C and the second value 97C. The third approximate straight line 93C is an approximate straight line indicating the correlation between the tension applied to the magnetic tape MT in a case in which the magnetic processing is performed on the data band DB3, and the servo pattern interval, that is, an approximate straight line corresponding to the data band DB3, and is used in a case in which the data band DB3 is designated as the processing target data band.

The fourth approximate straight line 93D is obtained from the interpolation and the extrapolation using the first value 95D and the second value 97D. The fourth approximate straight line 93D is an approximate straight line indicating the correlation between the tension applied to the magnetic tape MT in a case in which the magnetic processing is performed on the data band DB4, and the servo pattern interval, that is, an approximate straight line corresponding to the data band DB4, and is used in a case in which the data band DB4 is designated as the processing target data band.

In addition, in the embodiment described above, the form example has been described in which the information acquisition process is performed by the processor 208 of the information processing apparatus 200, but the technology of the present disclosure is not limited to this, and at least a part of a plurality of processes included in the information acquisition process may be performed by the control device 28 of the magnetic tape drive 10.

In addition, in the embodiment described above, the form example has been described in which the servo pattern interval is calculated by using PES, but this is merely an example, and the control device 28 may calculate the servo pattern interval based on the detection result of the position detection unit 68 without calculating the PES.

Figure 29:
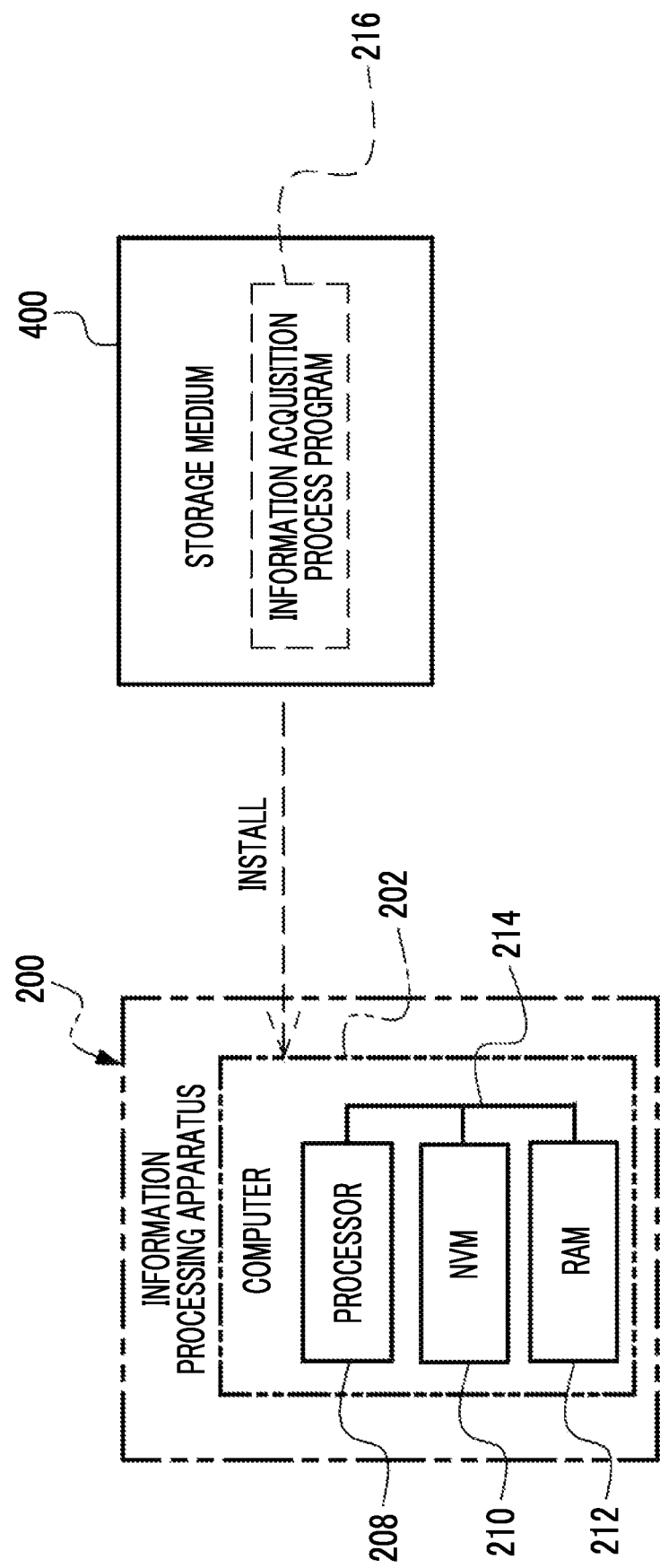
FIG. 29 is a conceptual diagram showing an example of an aspect in which an information acquisition processing program stored in a storage medium is installed in a computer of the information processing apparatus.

In addition, in the embodiment described above, the form example has been described in which the information acquisition processing program 216 is stored in the NVM 210, but the technology of the present disclosure is not limited to this. For example, as shown in FIG. 29, the information acquisition processing program 216 may be stored in a storage medium 400, such as an SSD or a USB memory. The storage medium 400 is a portable computer-readable non-transitory storage medium. The information acquisition processing program 216 stored in the storage medium 400 is installed in the computer 202. The processor 208 executes the information acquisition process in accordance with the information acquisition processing program 216.

In addition, the information acquisition processing program 216 may be stored in a storage device of another computer or server connected to the information processing apparatus 200 via a network (not shown), and the information acquisition processing program 216 may be downloaded in response to a request of the information processing apparatus 200 and installed in the computer 202.

It is not necessary to store the entire information acquisition processing program 216 in the storage device of another computer or server connected to the information processing apparatus 200, or the NVM 210, and a part of the information acquisition processing program 216 may be stored. It should be noted that the storage medium 400, the storage device, such as another computer or server connected to the information processing apparatus 200, and another external storage are positioned as a memory used by being directly or indirectly connected to the processor 208.

In addition, in the embodiment described above, although the processor 208, the NVM 210, and the RAM 212 of the information processing apparatus 200 are described as the computer, the technology of the present disclosure is not limited to this, and a device including the ASIC, the FPGA, and/or the PLD may be applied instead of the computer. In addition, instead of the computer, the hardware configuration and the software configuration may be used in combination.

The following various processors can be used as the hardware resource for executing the information acquisition process described in the embodiment described above. Examples of the processor include the CPU which is a general-purpose processor functioning as the hardware resource for executing the information acquisition process by executing software, that is, a program. In addition, examples of the processor include a dedicated electric circuit which is a processor having a circuit configuration designed to be dedicated to executing specific processing, such as the FPGA, the PLD, or the ASIC. The memory is incorporated in or connected to any processor, and any processor executes the information acquisition process by using the memory.

The hardware resource that executes the information acquisition process may be composed of one of these various processors, or a combination of two or more processors of the same type or different types (for example, a combination of a plurality of FPGAs, or a combination of a CPU and an FPGA). In addition, the hardware resource for executing the information acquisition process may be one processor.

As a configuring example of one processor, first, there is a form in which one processor is composed of a combination of one or more CPUs and software and the processor functions as the hardware resource for executing the information acquisition process. Second, as represented by a system-on-a-chip (SoC) or the like, a form of using a processor that implements, by one IC chip, a function of the entire system including a plurality of hardware resources for executing the information acquisition process is available. As described above, the information acquisition process is realized by using one or more of the various processors as the hardware resources.

As the hardware structure of these various processors, more specifically, it is possible to use an electric circuit in which circuit elements, such as semiconductor elements, are combined. In addition, the information acquisition process is merely an example. Therefore, it is needless to say that the deletion of an unnecessary step, the addition of a new step, and the change of a processing order may be employed within a range not departing from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

Regarding the embodiment described above, the following supplementary notes will be further disclosed.

(Supplementary Note 1)

A magnetic tape drive comprising a processor (for example, the control device 28), and a tension application mechanism that applies tension to a magnetic tape on which a plurality of servo bands and a plurality of data bands are formed, the servo bands being disposed at positions with the data band therebetween in a width direction of the magnetic tape, and servo patterns being recorded in the servo bands along a traveling direction of the magnetic tape, in which the processor derives tension for each data band in accordance with a servo pattern interval determined for each data band for each of the plurality of data bands of the magnetic tape, in a case in which magnetic processing by a magnetic element is performed on a processing target data band among the plurality of data bands, causes the tension application mechanism to apply the tension for each data band corresponding to the processing target data band, and the servo pattern interval is commonly used for a plurality of division areas obtained by dividing the data band in the width direction of the magnetic tape, and is a representative interval between a first servo pattern, which is the servo pattern in a first servo band of a pair of the servo bands adjacent to each other via the data band, and a second servo pattern, which is the servo pattern in a second servo band of the pair of the servo bands.

(Supplementary Note 2)

The magnetic tape drive according to Supplementary Note 1, in which the representative interval is obtained by statistics of results of measuring an interval between the first servo pattern and the second servo pattern for each division area in a case in which the magnetic tape to which first reference tension is applied is made to travel in a stage before the magnetic processing is performed.

(Supplementary Note 3)

The magnetic tape drive according to Supplementary Note 1 or 2, in which the representative interval is obtained by statistics of results of measuring an interval between the first servo pattern and the second servo pattern in a part of sections of the division area along the traveling direction for each division area in a case in which the magnetic tape to which second reference tension is applied is made to travel in a stage before the magnetic processing is performed.

(Supplementary Note 4)

The magnetic tape drive according to Supplementary Note 1 or 2, in which the representative interval is obtained by statistics of results of measuring an interval between the first servo pattern and the second servo pattern in all sections of the division area along the traveling direction for each division area in a case in which the magnetic tape to which second reference tension is applied is made to travel in a stage before the magnetic processing is performed.

(Supplementary Note 5)

The magnetic tape drive according to any one of Supplementary Notes 1 to 4, in which the representative interval is an average value of results of measuring an interval between the first servo pattern and the second servo pattern for each division area in a case in which the magnetic tape to which third reference tension is applied is made to travel in a stage before the magnetic processing is performed.

(Supplementary Note 6)

The magnetic tape drive according to Supplementary Note 1, in which the tension for each data band is derived from a result of regression analysis using a first value based on a result of measuring an interval between the first servo pattern and the second servo pattern for each division area in a case in which the magnetic tape to which fourth reference tension is applied is made to travel in a stage before the magnetic processing is performed, and a second value based on a result of measuring an interval between the first servo pattern and the second servo pattern for each division area in a case in which the magnetic tape to which fifth reference tension is applied is made to travel in a stage before the magnetic processing is performed.

(Supplementary Note 7)

The magnetic tape drive according to Supplementary Note 6, in which the first value is a value corresponding to a statistical value of results of measuring the interval between the first servo pattern and the second servo pattern for each division area in a case in which the magnetic tape to which the fourth reference tension is applied is made to travel in a stage before the magnetic processing is performed, and the second value is a value corresponding to a statistical value of results of measuring the interval between the first servo pattern and the second servo pattern for each division area in a case in which the magnetic tape to which the fifth reference tension is applied is made to travel in a stage before the magnetic processing is performed.

(Supplementary Note 8)

The magnetic tape drive according to Supplementary Note 7, in which the first value is a value corresponding to an average value of the results of measuring the interval between the first servo pattern and the second servo pattern for each division area in a case in which the magnetic tape to which the fourth reference tension is applied is made to travel in a stage before the magnetic processing is performed, and the second value is a value corresponding to an average value of results of measuring the interval between the first servo pattern and the second servo pattern for each division area in a case in which the magnetic tape to which the fifth reference tension is applied is made to travel in a stage before the magnetic processing is performed.

(Supplementary Note 9)

The magnetic tape drive according to any one of Supplementary Notes 1 to 8, in which processor performs, as the magnetic processing, at least one of recording first data (for example, the first recording data and the second recording data) for one of the plurality of division areas or reading second data (for example, data read from the processing target division data track by the data reading element DR) from one of the plurality of division areas, on the magnetic element while the magnetic tape travels in one direction.

(Supplementary Note 10)

An information processing apparatus (for example, the magnetic tape drive 10 into which the magnetic tape cartridge 12 is loaded, or the IC chip (for example, the IC chip mounted on the magnetic tape cartridge or the magnetic tape drive) including the memory and the processor) comprising a memory (for example, the cartridge memory 22 and/or the NVM 210) that stores servo pattern interval-related information related to a servo pattern interval indicating a servo pattern interval determined for each of a plurality of data bands included in a magnetic tape on which a plurality of servo bands and the plurality of data bands are formed, the servo bands are disposed at positions with the data band therebetween in a width direction of the magnetic tape, and servo patterns are recorded in the servo bands along a traveling direction of the magnetic tape, and a processor (for example, the processor 48 and/or 208) that executes processing using the servo pattern interval-related information stored in the memory, in which the servo pattern interval is commonly used for a plurality of division areas obtained by dividing the data band in the width direction of the magnetic tape, and is a representative interval between a first servo pattern, which is the servo pattern in a first servo band of a pair of the servo bands adjacent to each other via the data band, and a second servo pattern, which is the servo pattern in a second servo band of the pair of the servo bands.

(Supplementary Note 11)

The information processing apparatus according to Supplementary Note 10, in which the memory is a memory provided in a cartridge that accommodates the magnetic tape.

(Supplementary Note 12)

An operation method of a magnetic tape drive that applies tension to a magnetic tape on which a plurality of servo bands and a plurality of data bands are formed, the servo bands being disposed at positions with the data band therebetween in a width direction of the magnetic tape, and servo patterns being recorded in the servo bands along a traveling direction of the magnetic tape, the method comprising deriving tension for each data band in accordance with a servo pattern interval determined for each data band for each of the plurality of data bands of the magnetic tape, and in a case in which magnetic processing by a magnetic element is performed on a processing target data band among the plurality of data bands, causing the tension application mechanism to apply the tension for each data band corresponding to the processing target data band, in which the servo pattern interval is commonly used for a plurality of division areas obtained by dividing the data band in the width direction of the magnetic tape, and is a representative interval between a first servo pattern, which is the servo pattern in a first servo band of a pair of the servo bands adjacent to each other via the data band, and a second servo pattern, which is the servo pattern in a second servo band of the pair of the servo bands.

What is claimed is:

1. A magnetic tape cartridge comprising:
   a case that accommodates a magnetic tape on which a plurality of servo bands and a plurality of data bands are formed, the servo bands being disposed at positions with the data bands therebetween in a width direction of the magnetic tape, and servo patterns being recorded in the servo bands along a traveling direction of the magnetic tape; and
   a memory provided in the case,
   wherein the memory stores servo pattern interval-related information related to a servo pattern interval determined for each data band of the plurality of data bands included in the magnetic tape,
   wherein the servo pattern interval is commonly used for a plurality of division areas obtained by dividing the data band in the width direction of the magnetic tape, and is a representative interval between a first servo pattern, which is the servo pattern in a first servo band of a pair of the servo bands adjacent to each other via the data band, and a second servo pattern, which is the servo pattern in a second servo band of the pair of the servo bands, and
   wherein the representative interval is obtained by statistics of results of measuring an interval between the first servo pattern and the second servo pattern for each division area in a case in which the magnetic tape to which first reference tension is applied is made to travel.

2. The magnetic tape cartridge according to claim 1,
   wherein the servo pattern interval-related information is an offset value, and
   the offset value is a difference between the representative interval and a reference value.

3. The magnetic tape cartridge according to claim 2,
   wherein the offset value is a value within a range of from −500 nm to 500 nm.

4. The magnetic tape cartridge according to claim 3,
wherein the offset value is a value within a range of from −300 nm to 300 nm.

5. A magnetic tape cartridge, comprising:
a case that accommodates a magnetic tape on which a plurality of servo bands and a plurality of data bands are formed, the servo bands being disposed at positions with the data bands therebetween in a width direction of the magnetic tape, and servo patterns being recorded in the servo bands along a traveling direction of the magnetic tape; and
a memory provided in the case, wherein:
the memory stores servo pattern interval-related information related to a servo pattern interval determined for each data band of the plurality of data bands included in the magnetic tape,
the servo pattern interval is commonly used for a plurality of division areas obtained by dividing the data band in the width direction of the magnetic tape, and is a representative interval between a first servo pattern, which is the servo pattern in a first servo band of a pair of the servo bands adjacent to each other via the data band, and a second servo pattern, which is the servo pattern in a second servo band of the pair of the servo bands,
the magnetic tape cartridge is used by being loaded into a magnetic tape drive including a tension application mechanism and a magnetic element,
in the magnetic tape drive, in a case in which magnetic processing is performed by the magnetic element for each data band, the tension application mechanism applies tension for each data band to the magnetic tape in accordance with the servo pattern interval,
in the memory, tension information used by the magnetic tape drive is stored in advance, the tension information corresponding to the tension for each data band in a stage before the tension for each data band is applied to the magnetic tape by the tension application mechanism, and
the tension information is derived from a result of regression analysis using a first value based on a result of measuring an interval between the first servo pattern and the second servo pattern for each division area in a case in which the magnetic tape to which fourth reference tension is applied is made to travel, and a second value based on a result of measuring an interval between the first servo pattern and the second servo pattern for each division area in a case in which the magnetic tape to which fifth reference tension is applied is made to travel.

6. The magnetic tape cartridge according to claim 5,
wherein the first value is a value corresponding to a statistical value of results of measuring the interval between the first servo pattern and the second servo pattern for each division area in a case in which the magnetic tape to which the fourth reference tension is applied is made to travel, and
the second value is a value corresponding to a statistical value of results of measuring the interval between the first servo pattern and the second servo pattern for each division area in a case in which the magnetic tape to which the fifth reference tension is applied is made to travel.

7. The magnetic tape cartridge according to claim 6,
wherein the first value is a value corresponding to an average value of the results of measuring the interval between the first servo pattern and the second servo pattern for each division area in a case in which the magnetic tape to which the fourth reference tension is applied is made to travel, and
the second value is a value corresponding to an average value of results of measuring the interval between the first servo pattern and the second servo pattern for each division area in a case in which the magnetic tape to which the fifth reference tension is applied is made to travel.

8. An information acquisition method comprising:
based on a detection result obtained by detecting a servo pattern from a magnetic tape on which a plurality of servo bands and a plurality of data bands are formed, the servo bands being disposed at positions with the data bands therebetween in a width direction of the magnetic tape, and the servo patterns being recorded in the servo bands along a traveling direction of the magnetic tape, acquiring servo pattern interval-related information related to a servo pattern interval determined for each data band of the plurality of data bands included in the magnetic tape; and
storing the servo pattern interval-related information acquired in the acquisition step in a storage device,
wherein the servo pattern interval is commonly used for a plurality of division areas obtained by dividing the data band in the width direction of the magnetic tape, and is a representative interval between a first servo pattern, which is the servo pattern in a first servo band of a pair of the servo bands adjacent to each other via the data band, and a second servo pattern, which is the servo pattern in a second servo band of the pair of the servo bands, and
wherein the representative interval is obtained by statistics of results of measuring an interval between the first servo pattern and the second servo pattern for each division area in a case in which the magnetic tape to which first reference tension is applied is made to travel.

* * * * *